US010699349B2

(12) United States Patent
Roberts et al.

(10) Patent No.: US 10,699,349 B2
(45) Date of Patent: *Jun. 30, 2020

(54) COMPUTERIZED SYSTEM AND METHOD FOR DATA FIELD PRE-FILLING AND PRE-FILLING PREVENTION

(71) Applicant: HARTFORD FIRE INSURANCE COMPANY, Hartford, CT (US)

(72) Inventors: Lucas Raymond Roberts, Blacksburg, VA (US); Shane Eric Barnes, Avon, CT (US); Peter T. Bothwell, Windsor, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/817,495

(22) Filed: Nov. 20, 2017

(65) Prior Publication Data

US 2018/0075539 A1 Mar. 15, 2018

Related U.S. Application Data

(63) Continuation of application No. 14/271,252, filed on May 6, 2014, now Pat. No. 9,836,795, which is a
(Continued)

(51) Int. Cl.
*G06Q 40/08* (2012.01)
(52) U.S. Cl.
CPC .................................. *G06Q 40/08* (2013.01)
(58) Field of Classification Search
CPC ........ G06Q 10/00; G06Q 20/00; G06Q 30/00; G06Q 40/00
(Continued)

(56) References Cited

U.S. PATENT DOCUMENTS 5,855,005 A 12/1998 Schuler et al.
5,884,275 A 3/1999 Peterson et al.
(Continued)

FOREIGN PATENT DOCUMENTS

WO 2004088476 A2 10/2004

OTHER PUBLICATIONS

Robert Crone, "Big Data Veracity Assessment", Improving risk assessment by adding high veracity data to existing contents insurance models, Delft University of Technology, Faculty of Technology, Policy and Management, Management of Technology, Dec. (Year: 2016).*

(Continued)

*Primary Examiner* — Frantzy Poinvil
(74) *Attorney, Agent, or Firm* — Howard IP Law Group, PC

(57) ABSTRACT

Systems and methods are disclosed herein for processing data in connection with insurance information submissions. The system may be configured to receive entity data relating to an entity for which insurance coverage is sought, and query an interface of a third-party platform based on the entity data. The system may then be configured to receive third-party platform interface data from the third-party platform, analyze the data to determine a web site address for a web page on the third-party platform relating to the entity, and retrieve third-party platform web site data from the web page on the third-party platform indicative of content related to the entity. The system may be configured to pre-fill insurance forms relating to the entity based on the third-party platform data.

16 Claims, 33 Drawing Sheets

Related U.S. Application Data continuation-in-part of application No. 14/022,448, filed on Sep. 10, 2013, now Pat. No. 9,501,799.

(60) Provisional application No. 61/724,109, filed on Nov. 8, 2012.

(58) Field of Classification Search
USPC .................................................... 705/3–44
See application file for complete search history.

(56) References Cited

U.S. PATENT DOCUMENTS

| | | | |
|---|---|---|---|
| 6,026,364 A | 2/2000 | Whitworth | |
| 6,055,512 A | 4/2000 | Dean et al. | |
| 6,148,289 A | 11/2000 | Singh | |
| 6,349,290 B1 | 2/2002 | Horowitz et al. | |
| 7,319,970 B1* | 1/2008 | Simone | G06F 19/328 |
| | | | 705/4 |
| 7,349,894 B2 | 3/2008 | Barth et al. | |
| 7,376,618 B1 | 5/2008 | Anderson et al. | |
| 7,555,448 B2* | 6/2009 | Hsieh | G06Q 10/087 |
| | | | 705/35 |
| 7,613,687 B2 | 11/2009 | Nye | |
| 7,813,944 B1 | 10/2010 | Luk et al. | |
| 7,831,451 B1 | 11/2010 | Morse et al. | |
| 7,877,279 B1 | 1/2011 | Sturgis et al. | |
| 8,126,772 B1 | 2/2012 | LeFebvre | |
| 8,392,222 B1 | 3/2013 | Seybold et al. | |
| 8,433,617 B2 | 4/2013 | Goad et al. | |
| 8,543,462 B2* | 9/2013 | Allocca | G06Q 20/203 |
| | | | 705/26.1 |
| 8,554,584 B2 | 10/2013 | Hargroder | |
| 8,595,034 B2* | 11/2013 | Bauer | G06Q 40/02 |
| | | | 434/322 |
| 8,600,892 B2* | 12/2013 | Foster | G06Q 20/40 |
| | | | 705/44 |
| 8,660,864 B2 | 2/2014 | Krause et al. | |
| 8,682,924 B2* | 3/2014 | Tao | G06F 16/90324 |
| | | | 707/769 |
| 8,856,936 B2 | 10/2014 | Datta Ray et al. | |
| 8,892,452 B2 | 11/2014 | Virdhagriswaran | |
| 2002/0055862 A1 | 5/2002 | Jinks | |
| 2002/0065752 A1 | 5/2002 | Lewis | |
| 2002/0111835 A1 | 8/2002 | Hele et al. | |
| 2003/0031232 A1 | 2/2003 | Shi et al. | |
| 2003/0125990 A1 | 7/2003 | Rudy et al. | |
| 2003/0187703 A1 | 10/2003 | Bonissone et al. | |
| 2004/0024711 A1 | 2/2004 | Camping et al. | |
| 2005/0071168 A1 | 3/2005 | Juang et al. | |
| 2005/0288957 A1 | 12/2005 | Eraker et al. | |
| 2006/0224422 A1 | 10/2006 | Cohen | |
| 2007/0038485 A1 | 2/2007 | Yeransian et al. | |
| 2007/0239528 A1* | 10/2007 | Xie | G06Q 30/02 |
| | | | 705/14.55 |
| 2008/0183508 A1 | 7/2008 | Harker et al. | |
| 2010/0228573 A1 | 9/2010 | Quinlan et al. | |
| 2010/0332401 A1* | 12/2010 | Prahlad | G06F 3/0649 |
| | | | 705/80 |
| 2011/0137745 A1 | 6/2011 | Goad et al. | |
| 2012/0290330 A1 | 11/2012 | Coleman et al. | |
| 2012/0303389 A1 | 11/2012 | Friedman | |
| 2012/0310838 A1 | 12/2012 | Harris et al. | |
| 2013/0013345 A1 | 1/2013 | Wallquist et al. | |
| 2013/0232006 A1* | 9/2013 | Holcomb | G06F 16/951 |
| | | | 705/14.54 |
| 2014/0095354 A1 | 4/2014 | Hegarty et al. | |
| 2014/0114698 A1 | 4/2014 | Virdhagriswaran et al. | |
| 2014/0129261 A1* | 5/2014 | Bothwell | G06Q 40/08 |
| | | | 705/4 |
| 2014/0330594 A1* | 11/2014 | Roberts | G06Q 40/08 |
| | | | 705/4 |
| 2015/0106128 A1 | 4/2015 | Brady et al. | |
| 2015/0170241 A1 | 6/2015 | Jacobsen et al. | |
| 2015/0229664 A1 | 8/2015 | Hawthorne et al. | |
| 2015/0331903 A1 | 11/2015 | Blanco et al. | |
| 2015/0339780 A1* | 11/2015 | Collopy | G06Q 40/08 |
| | | | 705/4 |
| 2016/0125025 A1* | 5/2016 | Blanco | G06F 17/30392 |
| | | | 707/772 |
| 2017/0053355 A1* | 2/2017 | Shambach | G06Q 40/08 |

OTHER PUBLICATIONS

Pauly, et al., "Information Technology and Consumer Search for Health Insurance", Int. J. of the Economics of Business, vol. 13, No. 1, Feb. 2006, pp. 45-63 (Year: 2006).*

Rodriguez et al., "Rotation Forest: A New Classifier Ensemble Method", IEEE Transactions on Pattern Analysis and Machine Intelligence, vol. 28, No. 10, IEEE Computer Society, Oct. 2006, pp. 1619-1630.

* cited by examiner

Commercial Underwriting Program  _ □ ×

On which types of buildings do you install roofing?

602 — ◉ Residential: Single Unit   ◉ Residential: Multi-unit   ○ Commercial   ○ Industrial Which roofing materials do you use?

604 —
- ◉ Wood Shingles
- ○ Slate
- ○ Polyester
- ○ Metal Shingles
- ◉ Tile
- ○ Membrane Roofing
- ○ Asphalt Shingles
- ○ PTFE
- ○ Bitumen
- ○ Sheet Metal
- ○ PVC
- ○ Corrugated Iron

Commercial Underwriting Program

| SIC Code | Description | Confidence Level |
|---|---|---|
| 1761 | Roofing, Siding, and Sheet Metal Work | 90% |
| 1521 | General Contractors—Single-Family Homes | 15% |
| 1522 | General Contractors-Residential Buildings | 15% |
| 8741 | Management Services | 10% |
| 1743 | Terrazzo, Tile, Marble, and Mosaic Work | 5% |

JSON object returned from Third-Party Platform Interface:

[1] "{\"message\": {\"text\": \"OK\", \"code\": 0, \"version\": \"1.1.1\"}, \"businesses\": [{\"rating_img_url\": \"http://s3-media2.ak.thirdplatformcdn.com/assets/2/www/img/94628c34976e/ico/stars/v1/stars_4_half.png\", \"country_code\": \"US\", \"id\": \"CAZMby1NfGvKh697fo2oUQ\", \"is_closed\": false, \"city\": \"Carson City\", \"mobile_url\": \"http://m.thirdplatform.com/biz/joes-coffee-co-carson-city\", \"review_count\": 16, \"zip\": \"89701\", \"state\": \"NV\", \"rating_img_url_small\": \"http://s3-media2.ak.thirdplatformcdn.com/assets/2/www/img/a5221e66bc70/ico/stars/v1/stars_small_4_half.png\", \"address1\": \"411 S Carson St\", \"address2\": \"Ste 3\", \"address3\": \"\", \"phone\": \"7754613112\", \"state_code\": \"NV\", \"categories\": [{\"category_filter\": \"coffee\", \"search_url\": \"http://www.thirdplatform.com/search?cflt=coffee&find_desc=&find_loc=711+S+Carson+St%2C+Carson+City+89701\", \"name\": \"Coffee & Tea\"}, {\"category_filter\": \"bagels\", \"search_url\": \"http://www.thirdplatform.com/search?cflt=bagels&find_desc=&find_loc=711+S+Carson+St%2C+Carson+City+89701\", \"name\": \"Bagels\"}], \"photo_url\": \"http://media2.ak.thirdplatformcdn.com/bpthumb/AY7EKuPXbspDviQf6ZiGJw/ms\", \"distance\": 0.0, \"name\": \"Joes Coffee Co\", \"neighborhoods\": [], \"url\": \"http://www.thirdplatform.com/biz/joes-coffee-co-carson-city\", \"country\": \"USA\", \"avg_rating\": 4.5, \"nearby_url\": \"http://www.thirdplatform.com/search?find_desc=&find_loc=411+S+Carson+St%2C+Carson+City+89701\", \"reviews\": [{\"rating_img_url_small\": \"http://s3-media1.ak.thirdplatformcdn.com/assets/2/www/img/c7623205d5cd/ico/stars/v1/stars_small_5.png\",

FIG. 23

Parsed JSON object from Third-Party Platform Interface:

$businesses[[1]]$is_closed
[1] FALSE $businesses[[1]]$city
[1] "Carson City"

$businesses[[1]]$mobile_url
[1] "http://m.thirdplatform.com/biz/joes-coffee-co-carson-city"

$businesses[[1]]$review_count
[1] 16

$businesses[[1]]$zip
[1] "89701"

$businesses[[1]]$state
[1] "NV"

$businesses[[1]]$rating_img_url_small
[1] "http://s3-media2.ak.thirdplatformcdn.com/assets/2/www/img/a3398e66bc70/ico/stars/v1/stars_small_4_half.png"

$businesses[[1]]$address3
[1] ""

$businesses[[1]]$phone
[1] "7754613112"

$businesses[[1]]$state_code
[1] "NV"

FIG. 24

The Structured Data

| reviews | zip | state | address1 | name | state | country | is_claimed | category1 |
|---|---|---|---|---|---|---|---|---|
| 178 | 20001 | DC | 1905 9th St NW | 1905 Bistro | DC | USA | TRUE | American (New) |
| 1 | 75701 | TX | 1801 E SE Loop 323 | 323 Smoke Shop | TX | USA | TRUE | Tobacco Shops |
| 2 | 30341 | GA | 3640 Chamblee Tucker Rd | 3640 Dental Offices | GA | USA | FALSE | General Dentistry |
| 4 | 94014 | CA | 7204 Mission st | 800-Insurance | CA | USA | TRUE | Insurance |
| 8 | 93710 | CA | 6767 N Fresno St | A Beautiful Smile | CA | USA | FALSE | General Dentistry |

JSON object returned from Third-Party Platform Interface:

[1] "{\"message\": {\"text\": \"OK\", \"code\": 0, \"version\": \"1.1.1\"}, \"businesses\": [{\"rating_img_url\": \"http://s3-media1.ak.thirdplatformcdn.com/assets/2/www/img/f1def11e4e79/ico/stars/v1/stars_5.png\", \"country_code\": \"US\", \"id\": \"fHJ9E8i4cnHURqZsiHMTSQ\", \"is_closed\": false, \"city\": \"New York\", \"mobile_url\": \"http://m.thirdplatform.com/biz/john-Dentist-dds-new-york\", \"review_count\": 2, \"zip\": \"10075\", \"state\": \"NY\", \"rating_img_url_small\": \"http://s3-media1.ak.thirdplatformcdn.com/assets/2/www/img/c793847d5cd/ico/stars/v1/stars_small_5.png\", \"address1\": \"413 Park Ave\", \"address2\": \"\", \"address3\": \"\", \"phone\": \"2124619281\", \"state_code\": \"NY\", \"categories\": [{\"category_filter\": \"cosmeticdentists\", \"search_url\": \"http://www.thirdplatform.com/search?cflt=cosmeticdentists&find_desc=&find_loc=413+Park+Ave%2C+New+York+10075\", \"name\": \"Cosmetic Dentists\"}], \"photo_url\": \"http://media3.ak.thirdplatformcdn.com/bpthumb/VWzlqsGZC5ArVGa47Bqp7A/ms\", \"distance\": 0.0, \"name\": \"John Dentist, DDS\", \"neighborhoods\": [{\"url\": \"http://www.thirdplatform.com/search?exclude_start=True&find_desc=&find_loc=Upper+East+Side%2C+Manhattan%2C+NY\", \"name\": \"Upper East Side\"}], \"url\": \"http://www.thirdplatform.com/biz/john-Dentist-dds-new-york\", \"country\": \"USA\", \"avg_rating\": 5.0, \"nearby_url\": \"http://www.thirdplatform.com/search?find_desc=&find_loc=413+Park+Ave%2C+New+York+10075\", \"reviews\": [{\"rating_img_url_small\": \"http://s3-media1.ak.thirdplatformcdn.com/assets/2/www/img/c7623205d5cd/ico/stars/v1/stars_small_5.png\", \"user_photo_url_small\": \"http://s3-media4.ak.thirdplatformcdn.com/assets/2/www/img/39e262e5a324/default_avatars/user_xsmall_square.png\", \"rating_img_url\": \"http://s3-media1.ak.thirdplatformcdn.com/assets/2/www/img/f1def11e4e79/ico/stars/v1/stars_5.png\", \"rating\": 5, \"user_url\": \"http://www.thirdplatform.com/user_details?userid=D1gaAHvsdv-EAIZdQfHczw\", \"url\": \"http://www.thirdplatform.com/biz/john-Dentist-dds-new-york?hrid=MnONcq0ktwtB89jDBwm89A\", \"mobile_url\": \"/biz/john-Dentist-dds-new-york?full=True&hrid=MnONcq0ktwtB89jDBwm89A\", \"text_excerpt\": \" Dentist is truly a talented Dentist. He is patient, thorough, meticulous, knowledgeable and always does an excellent job. Dr. Dentist cares about...\", \"user_photo_url\":

FIG. 26

Parsed JSON object from Third-Party Platform Interface:

$message
$message$text
[1] "OK"

$message$code
[1] 0

$message$version
[1] "1.1.1"

$businesses
$businesses[[1]]
$businesses[[1]]$rating_img_url
[1] "http://s3-
media1.ak.thirdplatformcdn.com/assets/2/www/img/f1def675e4e74/ico/stars/v1/stars_5.png"

$businesses[[1]]$country_code
[1] "US"

$businesses[[1]]$id
[1] "fHJ9E8i4cnHURqZsiHMTSQ"

$businesses[[1]]$is_closed
[1] FALSE $businesses[[1]]$distance
[1] 0

FIG. 27

| Reviews | Zip | State | Address | Name | Category | Alert Words | Uninsurable Words | Additional Coverage Words |
|---|---|---|---|---|---|---|---|---|
| 178 | 20001 | DC | 1905 9th St. NW | 1905 Bistro | American | | | |
| 1 | 75701 | TX | 1801 E SE Loop 323 | 323 Smoke Shop | Tobacco Shops | Tobacco | Electronic Cigarette | |
| 4 | 19103 | PA | 1700 Market Street | Fred's Grill | Restaurant | | | Delivery |
| 11 | 07960 | NJ | 10 Main Street | Joe's Bar and Grill | Restaurant Bar | | Open 24 hours | Delivery |
| 6 | 06105 | CT | 15 Elm Street | The Clean Crew | Custodial | | | Repair |
| 15 | 19468 | PA | 10 Limerick Dr | Ed's Energy Co. | Industrial | Nuclear, Radiation | Nuclear, Radiation | |
| 22 | 75680 | TX | 15 Professional Way | Dr. John's Radiology | Radiologist | | | |

COMPUTERIZED SYSTEM AND METHOD FOR DATA FIELD PRE-FILLING AND PRE-FILLING PREVENTION

CROSS-REFERENCE TO RELATED APPLICATIONS

This application is a continuation of co-pending U.S. patent application Ser. No. 14/271,252, filed May 6, 2014, now U.S. Pat. No. 9,836,795, which is in turn a continuation-in-part of U.S. patent application Ser. No. 14/022,448 filed Sep. 10, 2013, now U.S. Pat. No. 9,501,799, which in turn claims the benefit of U.S. Provisional Patent Application No. 61/724,109, filed Nov. 8, 2012, the entirety of all of which are incorporated by reference herein for all purposes.

FIELD OF THE INVENTION

In general, the invention relates to a computerized system and method for retrieving data from third-party sources and using the data to pre-fill insurance forms for an entity. More specifically, the invention relates to a computerized system and method which uses third-party platform data to pre-fill data fields in insurance forms, which forms may then be processed to generate an insurance policy.

BACKGROUND OF THE INVENTION

The completion of insurance forms such as applications may be time-consuming for agents, requiring that numerous items of information be requested from applicants. Because of this, it has been found that incorrect data is sometimes entered for certain fields to avoid having to search for information about a potential client. For example, in many applications for insurance, it has been observed that the telephone number entered for an entity is the telephone number for the insurance agency preparing the application for the entity, rather than the actual telephone number for the entity. This typically occurs because the agency's telephone number is one that the agent has memorized and can enter quickly, while the entity's telephone number is one for which the agent would have to search either his or her files or the internet.

One of the data items requested in insurance forms, which data item is used in quoting and other insurance processes for insurance provided to businesses and non-profit entities, is the industrial classification of the entity. The industrial classification of an entity is an important factor in determining insurance risk. There are many standardized industrial classification systems, such as Standard Industrial Classification (SIC), North American Industrial Classification System (NAICS), Global Industry Classification System (GICS), Industrial Classification Benchmark (ICB), Thomson Reuters Business Classifications (TRBC), Statistical Classification of Economic Activities (NACE), Australian and New Zealand Standard Industrial Classifications (ANZSIC), and International Standard Industrial Classifications (ISIC). Many of these are multi-digit code systems, wherein each digit, reading from left to right, specifies an entity's sector more specifically. For example, in the four-digit ICB, the first digit indicates industry, the second digit plus the first digit specify a supersector, the first three digits indicates sector, and the full four digits specify a subsector. There are also numerous custom industrial classification systems used by entities, such as insurers.

Current methods for aligning entities with appropriate industries are error prone. In some cases, the operations of an entity are too varied to neatly fit into one or two industrial classifications, causing activities of the entity to be ignored when an insurance quote is being determined. In other cases, the industrial code assigned to an entity is too general for assigning an accurate risk factor. For large and established companies, a third-party data vendor may supply an industrial classification, or an industrial classification may be provided by an agent, but for new or small companies, third-party vendors may not have an industrial classification available. In these cases, the burden of classifying the industry falls onto the entity itself or the agent in completion of an insurance application form. The assigned industrial classification selected by the agent or entity may be incorrect or inadequate. Insurance companies produce hundreds of thousands of insurance quotes per year, so it is impossible for insurance companies to verify the accuracy of industrial classifications received from agents, insureds and third-party vendors for each entity they develop a quote for.

For these reasons, an industrial classification assigned to an entity may not accurately represent the entity's operation, leading to economic consequences for the insurance company. For example, a company that sells appliances may also employ an installation team to install the appliances. The activities involved in installation, from transporting the appliances to handling them in an unfamiliar setting, are much riskier than activities on a retail floor or in a warehouse. Furthermore, the entity may be liable for any accidents damaging the appliances or the installation site. While the entity may be truthfully classified as an appliance retailer, if the entity is paying an insurance premium that has been determined for an appliance retailer without taking into account the installation aspect of the business, the insurer of the appliance company runs the risk of the appliance company incurring greater losses than were expected or insured. In cases like this, the insurance company is typically still contractually bound to cover the losses under the policy.

SUMMARY

There is therefore a need in the insurance industry for a system and method for more accurately obtaining data for insurance forms. Electronic resources maintained by third-party platforms concerning entities, such as websites, social media pages and feeds, and other available resources, accessible through API interfaces or other data gathering methods, such as screen scraping, and gathering web page data relating to the entity, such as by screen scraping, can be used to solve this problem. The systems and methods disclosed herein leverage available electronic resources, such as API interface data and web pages relating to the entity, to obtain data that may be used to pre-fill data fields in insurance forms. The availability of a pre-fill function may assist agents in completing insurance forms such as applications, and may increase the accuracy of the data on such applications for insurance or other insurance forms.

Accordingly, systems and methods are disclosed herein for accessing of data relating to entities from one or more third party sources, and using the data to pre-fill insurance forms for the entity. The pre-filled forms may be presented to the entity or a representative of the entity, such as on a user interface, with a prompt or request for user input to confirm accuracy of data displayed on the pre-filled forms, or to input corrected information. Upon confirmation, the data from the pre-filled forms may be provided to one or more insurance company computer systems for processing for insurance workflow and determination purposes, including, by way of example, for determination of quotes for one or more insurance products and for issuing of one or more insurance policies.

In one or more embodiments, a computerized system for processing data in connection with insurance information submissions includes one or more data storage devices storing data relating to accessing of entity data, one or more computer processors in communication with the one or more data storage devices; a communications device in communication with the one or more computer processors and the one or more data storage device; and a memory, coupled to the one or more computer processors and storing program instructions. The program instructions, when executed by the one or more computer processors, cause the one or more computer processors to: receive entity data input at a user-accessible device in relation to a computer-implemented insurance form; query an interface of a third-party platform based on the entity data; responsive to the query, receive third-party platform interface data from the third-party platform; analyze the third-party platform interface data to determine a web site address for a web page on the third-party platform relating to the entity; retrieve third-party platform web site data from the web page on the third-party platform indicative of content related to the entity; pre-fill one or more data fields of the computer-implemented insurance form relating to the entity based at least in part on the third-party platform interface data and the third-party platform web site data; and output for display on the user-accessible device the insurance form including the pre-filled one or more data fields.

In one or more embodiments, the memory further stores instructions that, when executed, cause the one or more computer processors to: determine, based on the third-party platform interface data and the third-party platform web site data, an initial classification for the entity; and determine, based on the third-party platform interface data and the third-party platform web site data, veracity indicators. The pre-fill of the computer-implemented insurance form is further based on the initial classification and the veracity indicators.

In one or more embodiments, the memory further stores further instructions that, when executed, cause the one or more computer processors to display a warning indicator for the pre-filled data fields of the computer-implemented insurance form that were filled with data having a veracity indicator below a threshold value.

In one or more embodiments, the memory further stores instructions that, when executed, cause the one or more computer processors to determine whether the entity data input in relation to the computer-implemented insurance form comprises agency data relating to the agency inputting the data; and responsive to a determination that the entity data input comprises agency data, generate a display indicating that a pre-fill function will not operate because agency data was input into the computer-implemented insurance form. In embodiments, none of the data fields of the computer-implemented insurance form relating to the entity is pre-filled.

In one or more embodiments, the memory further stores instructions that, when executed, cause the one or more computer processors to output an accuracy confirmation prompt for display on the user-accessible device selectable by an agent or the entity to confirm the accuracy of the pre-filled one or more data fields; and responsive to receipt of the accuracy confirmation by the agent or the entity, generate, based at least in part on the pre-filled one or more data fields, an insurance quote for the entity.

In one or more embodiments, the memory further stores instructions that, when executed, cause the one or more computer processors to analyze the third-party platform web site data and identify a web site address for the entity's web site; responsive to identification of the entity's web site, retrieve entity web site data indicative of content related to the entity from the entity's web site; analyze one or both of the third-party platform web site data and the entity web site data and identify cross-platforms having web pages relating to the entity; and responsive to identification of one or more cross-platforms having web pages relating to the entity, retrieve, from the one or more cross-platforms having the web pages relating to the entity, cross-platform interface data and cross-platform web site data relating to the entity. The pre-fill of the one or more data fields of the computer-implemented insurance form relating to the entity may be further based at least in part on the third-party platform interface data and the third-party platform web site data.

In one or more embodiments, the memory further stores program instructions which, when executed by the one or more computer processors, cause the one or more computer processors to determine if the third-party platform interface data and the third-party platform web site data contain one or more of the alert terms; responsive to a determination that the third-party platform interface data and the third-party platform web site data contain one or more of the alert terms, transmit by the communications device an indication of the determined one or more alert terms to an underwriting computer with the first data indicative of at least one industrial classification associated with the entity; and responsive to a determination that the third-party platform interface data and the third-party platform web site data does not contain one or more of the alert terms: determine insurance premium pricing for the entity; and generate an insurance for the entity based on the determined insurance premium pricing for the entity.

In one or more embodiments, a computerized method for processing data in connection with insurance information submissions includes receiving, by one or more processors, entity data input at a user-accessible device in relation to a computer-implemented insurance form; querying by a communications device an interface of a third-party platform based on the entity data; responsive to the query, receiving, by the one or more processors, third-party platform interface data from the third-party platform; analyzing, by the one or more processors, the third-party platform interface data to determine a web site address for a web page on the third-party platform relating to the entity; retrieving, by the one or more processors, third-party platform web site data from the web page on the third-party platform indicative of content related to the entity; pre-filling one or more data fields of the computer-implemented insurance form relating to the entity based at least in part on the third-party platform interface data and the third-party platform web site data; and outputting for display on the user-accessible device the insurance form including the pre-filled one or more data fields.

In one or more embodiments, the computerized method further includes determining, based on the third-party platform interface data and the third-party platform web site data, an initial classification for the entity; and determining, based on the third-party platform interface data and the third-party platform web site data, veracity indicators. The pre-filling of the computer-implemented insurance form may be further based on the initial classification and the veracity indicators.

In one or more embodiments, the computerized method further includes displaying a warning indicator for the pre-filled data fields of the computer-implemented insurance form that were filled with data having a veracity indicator below a threshold value.

In one or more embodiments, the computerized method further includes determining whether the entity data input in relation to the computer-implemented insurance form includes agency data relating to the agency inputting the data; and responsive to a determination that the entity data input includes agency data, generating a display indicating that a pre-fill function will not operate because agency data was input into the computer-implemented insurance form. The pre-filling one or more data fields of the computer-implemented insurance form may include filling none of the data fields of the computer-implemented insurance form.

In one or more embodiments, the computerized method further includes outputting, by the one or more processors, an accuracy confirmation selection for display on the user-accessible device selectable by an agent or the entity to confirm the accuracy of the pre-filled one or more data fields; and responsive to receipt of the accuracy confirmation selection by the agent or the entity, generating, based at least in part on the pre-filled one or more data fields, an insurance quote for the entity.

In one or more embodiments, the computerized method further includes analyzing, by the one or more processors, the third-party platform web site data and identify a web site address for the entity's web site; responsive to identification of the entity's web site, retrieving entity web site data indicative of content related to the entity from the entity's web site; analyzing, by the one or more processors, one or both of the third-party platform web site data and the entity web site data and identify cross-platforms having web pages relating to the entity; and responsive to identification of one or more cross-platforms having web pages relating to the entity, retrieving, from the one or more cross-platforms having the web pages relating to the entity, cross-platform interface data and cross-platform web site data relating to the entity. The pre-fill of the one or more data fields of the computer-implemented insurance form relating to the entity may be further based at least in part on the third-party platform interface data and the third-party platform web site data.

In one or more embodiments, the computerized method further includes determining if the third-party platform interface data and the third-party platform web site data contain one or more of the alert terms; responsive to a determination that the third-party platform interface data and the third-party platform web site data contain one or more of the alert terms, transmitting by the communications device an indication of the determined one or more alert terms to an underwriting computer with the first data indicative of at least one industrial classification associated with the entity. The method may further include, responsive to a determination that the third-party platform interface data and the third-party platform web site data does not contain one or more of the alert terms, determining insurance premium pricing for the entity; and generating an insurance policy for the entity based on the determined insurance premium pricing for the entity.

In one or more embodiments, a computerized system for processing data in connection with property and casualty insurance information submissions includes one or more data storage devices storing data relating to classification of entities; one or more computer processors in communication with the one or more data storage devices; a communications device in communication with the one or more computer processors and the one or more data storage device; and a memory, coupled to the one or more computer processors, storing program instructions which, when executed by the one or more computer processors, cause the one or more computer processors to: receive entity data input at a user-accessible device in relation to a computer-implemented property and casualty insurance form; query an interface of one or more of a third-party business directory and a third party review site based on the entity data; responsive to the query, receive one or more of third-party business directory and third-party review site interface data from the third-party platform; analyze the received one or more of third-party business directory and third-party review site interface data to determine a web site address for a web page on the one or more of the third-party business directory and third-party review site relating to the entity; retrieve one or more of third-party business directory and third-party review site data from the web page on the one or more of third-party business directory and third-party review site indicative of content related to the entity; pre-fill one or more data fields of the computer-implemented property and casualty insurance form relating to the entity based at least in part on the one or more of the third-party business directory and third-party review site interface data; and output for display on the user-accessible device the property and casualty insurance form including the pre-filled one or more data fields.

In one or more embodiments, the memory further stores program instructions which, when executed by the one or more computer processors, cause the one or more computer processors to: determine if the one or more of the third-party business directory and third party review site interface data contain one or more of the alert terms; responsive to a determination that one or more of the third-party platform interface data and the third-party platform web site data contain one or more of the alert terms, transmit by the communications device an indication of the determined one or more alert terms to an underwriting computer with the first data indicative of at least one industrial classification associated with the entity. The instructions further cause, responsive to a determination that the third-party platform interface data and the third-party platform web site data does not contain one or more of the alert terms: the one or more computer processors to determine insurance premium pricing for the entity; and generate a property and casualty policy for the entity based on the determined insurance premium pricing for the entity.

In one or more embodiments, the memory further stores instructions that, when executed, cause the one or more computer processors to: output an accuracy confirmation selection for display on the user-accessible device selectable by an agent or the entity to confirm the accuracy of the pre-filled one or more data fields; output an inaccuracy confirmation selection for display on the user-accessible device selectable by an agent or the entity to confirm the inaccuracy of the pre-filled one or more data fields; responsive to receipt of the accuracy confirmation selection by the agent or the entity, generate, based at least in part on the pre-filled one or more data fields, a property and casualty insurance quote for the entity; and responsive to receipt of the inaccuracy confirmation selection by the agent or the entity, output for display an indication requesting the agent or the entity to correct the inaccurate pre-filled one or more data fields.

In one or more embodiments, the memory further stores instructions that, when executed, cause the one or more computer processors to: determine, based on one or more of third-party platform interface data and third-party platform web site data, veracity indicators for data corresponding to one or more data fields on the computer-implemented insurance form. The pre-fill of the computer-implemented insurance form may be further based on the veracity indicators.

In one or more embodiments, the memory further stores instructions that, when executed, cause the one or more computer processors to display a warning indicator for the pre-filled data fields of the computer-implemented property and casualty insurance form that were filled with data having a veracity indicator below a threshold value.

In one or more embodiments, the memory further stores instructions that, when executed, cause the one or more computer processors to: determine whether the entity data input in relation to the computer-implemented insurance form comprises agency data relating to the agency inputting the data; and responsive to a determination that the entity data input comprises agency data, generate a display indicating that a pre-fill function will not operate because agency data was input into the computer-implemented insurance form. None of the data fields of the computer-implemented insurance form relating to the entity may be pre-filled.

In embodiments, systems and methods are disclosed herein for determining and verifying an insurance evaluation based on an industrial classification or an insurance classification. In embodiments, a system for making an insurance evaluation includes a memory, coupled to one or more computer processors, storing program instructions which, when executed by the one or more computer processors, cause the one or more computer processors to: receive search data relating to the entity seeking insurance coverage; query an interface of a third-party platform based on the search data; responsive to the query, receive third-party platform interface data from the third-party platform; analyze the third-party platform interface data to determine a web site address for a web page on the third-party platform relating to the entity; retrieve third-party platform web site data from the web page on the third-party platform indicative of content related to the entity; output, based on the third-party platform interface data and the third-party platform web site data, first data indicative of at least one industrial classification associated with the entity; and, responsive at least to the output of the first data, determine an insurance workflow.

In embodiments, a computerized method for performing an insurance process includes: receiving, by one or more processors, search data relating to the entity seeking insurance coverage; querying by a communications device an interface of a third-party platform based on the search data; responsive to the query, receiving, by the one or more processors, third-party platform interface data from the third-party platform; analyzing, by the one or more processors, the third-party platform interface data to determine a web site address for a web page on the third-party platform relating to the entity; retrieving, by the one or more processors, third-party platform web site data from the web page on the third-party platform indicative of content related to the entity; outputting, by the one or more processors, based on the third-party platform interface data and the third-party platform web page data, first data indicative of at least one industrial classification associated with the entity; and, determining, by the one or more processors, an underwriting workflow based at least on the first data.

In some embodiments, a system for making an insurance evaluation includes a memory, coupled to one or more computer processors, storing program instructions which, when executed by the one or more computer processors, cause the one or more computer processors to: receive search data relating to the entity seeking insurance coverage; query an interface of a third-party platform based on the search data; responsive to the query, receive third-party platform interface data from the third-party platform; output, based on third-party platform interface data, first data indicative of at least one industrial classification associated with the entity; and, responsive at least to output of the first data, determine an insurance workflow.

In some embodiments, the memory further stores instructions that, when executed, cause the one or more computer processors to: generate an initial insurance classification indication based on the third-party platform interface data and the third-party platform web site data, wherein the output of the first data indicative of at least one industrial classification associated with the entity are further based on the initial insurance classification indication.

In some embodiments, the memory further stores instructions that, when executed, cause the one or more computer processors to: analyze the third-party platform web site data and identify a web site address for the entity's web site; responsive to identification of the entity's web site, retrieve entity web site data indicative of content related to the entity from the entity's web site; analyze one or both of the third-party platform web site data and the entity web site data and identify cross-platforms having web pages relating to the entity; and, responsive to identification of one or more cross-platforms having web pages relating to the entity, retrieve, from the one or more cross-platforms having the web pages relating to the entity, cross-platform interface data and cross-platform web site data relating to the entity; wherein the output of the first data indicative of at least one industrial classification associated with the entity is further based on the entity web site data, the cross-platform interface data, and the cross-platform web site data. In embodiments, both third-party data and first-party data (such as an entity's web page or data submitted by the entity in an insurance form such as an application) are retrieved and used to determine a classification for the entity.

In some embodiments, the one or more storage devices further stores alert terms indicative of insurance risk. In the embodiment, the memory further stores instructions that, when executed, cause the one or more computer processors to: determine if the third-party platform interface data and the third-party platform web site data contain one or more of the alert terms; and responsive to a determination that the third-party platform interface data and the third-party platform web site data contain one or more of the alert terms, transmit by the communications device an indication of the determined one or more alert terms to an underwriting computer with the first data indicative of at least one industrial classification associated with the entity.

In some embodiments, the one or more storage devices further stores terms indicative of an uninsurable entity. In the embodiment, the memory further stores instructions that, when executed, cause the one or more computer processors to: determine if the third-party platform interface data and the third-party platform web site data contain one or more of the terms indicative of an uninsurable entity; and responsive to a determination that the third-party platform interface data and the third-party platform web site data contain one or more of the terms indicative of an uninsurable entity, transmit by the communications device an indication of the determined one or more terms indicative of an uninsurable entity to an underwriting computer with the first data indicative of at least one industrial classification associated with the entity.

In some embodiments, the one or more storage devices further stores terms indicative of a need for additional coverage. In the embodiment, the memory further stores instructions that, when executed, cause the one or more computer processors to: determine if the third-party platform interface data and the third-party platform web site data contain one or more of the terms indicative of a need for additional coverage; and responsive to a determination that the application data, the third-party platform interface data and the third-party platform web site data contain one or more of the terms indicative of a need for additional coverage, transmit by the communications device an indication of the determined one or more terms indicative of a need for additional coverage to an underwriting computer with the first data indicative of at least one industrial classification associated with the entity.

In some embodiments, the memory further stores instructions that, when executed, cause the one or more computer processors to analyze third-party platform interface data and the third-party platform web site data relating to the entity for inconsistencies and determine veracity indicators based on the analysis; wherein second data indicative of a likelihood of the industrial classification being associated with the entity is based in part on the determined veracity indicators.

In some embodiments, the system further comprises: one or more underwriter computer storage devices storing underwriting rules; one or more underwriter computer processors in communication with the one or more underwriter computer storage devices; an underwriter communications device in communication with the one or more underwriter computer processors and the one or more underwriter computer storage devices; and an underwriter program memory. The underwriter program memory is coupled to the one or more underwriter computer processors, and stores program instructions which, when executed by the one or more underwriter computer processors, cause the one or more underwriter computer processors to: receive via the underwriter communications device underwriting data comprising the first data indicative of at least one industrial classification associated with the entity, the third-party platform interface data, and the third-party platform web site data; receive via the underwriter communications device any alert term indicators relating to the entity; process the underwriting data and the alert indicators relating to the entity using the underwriting rules; determine if processing of the underwriting data using the underwriting rules triggered a do not write rule; responsive to a determination that a do not write rule was triggered, generate a refusal to write and end the automated underwriting process; responsive to a determination that a do not write rule was not triggered: determine if additional data is needed to generate an underwriting decision; responsive to a determination that the additional data is needed, generate an inquiry for the additional data and monitor for receipt of the additional data; and responsive to a determination that the additional data is not needed, determine insurance premium pricing for the entity.

In some embodiments, the system include a memory, coupled to the one or more computer processors, that stores program instructions which, when executed by the one or more computer processors, cause the one or more computer processors to: receive entity data input in relation to a computer-implemented insurance form; query an interface of a third-party platform based on the entity data; responsive to the query, receive third-party platform interface data from the third-party platform; analyze the third-party platform interface data to determine a web site address for a web page on the third-party platform relating to the entity; retrieve third-party platform web site data from the web page on the third-party platform indicative of content related to the entity; and, pre-fill one or more data fields of the computer-implemented insurance form relating to the entity based at least in part on the third-party platform interface data and the third-party platform web site data. In some embodiments, the memory further stores instructions that, when executed, cause the one or more computer processors to: determine, based on the third-party platform interface data and the third-party platform web site data, an initial classification for the entity; and determine, based on the third-party platform interface data and the third-party platform web site data, veracity indicators; wherein the pre-fill of the computer-implemented insurance form is further based on the initial classification and the veracity indicators. In some embodiments, the memory further stores instructions that, when executed, cause the one or more computer processors to: determine whether the entity data input in relation to the computer-implemented insurance form comprises agency data relating to the agency inputting the data; and responsive to a determination that the entity data input comprises agency data, generate a display indicating that a pre-fill function will not operate because agency data was input into the computer-implemented insurance form;

In embodiments, a computerized method for performing an insurance process includes: receiving, by one or more processors, entity data input in relation to a computer-implemented insurance form; querying by a communications device an interface of a third-party platform based on the entity data; responsive to the query, receiving, by the one or more processors, third-party platform interface data from the third-party platform; analyzing, by the one or more processors, the third-party platform interface data to determine a web site address for a web page on the third-party platform relating to the entity; retrieving, by the one or more processors, third-party platform web site data from the web page on the third-party platform indicative of content related to the entity; and, pre-filling one or more data fields of the computer-implemented insurance form relating to the entity based at least in part on the third-party platform interface data and the third-party platform web site data.

In some embodiments, the system includes a content processor, a computerized predictive model, and a business logic processor. The content processor retrieves content from a website related to an entity seeking an insurance policy and extracts data from the website content. The computerized predictive model accepts the data extracted from the website content from the content processor, processes the extracted data, and outputs data indicative of at least one industrial classification associated with the entity. The business logic processor determines an insurance evaluation of the entity based on its industrial classification(s). The insurance evaluation may be at least one of an insurance risk, and insurance price, a level of underwriting necessary, and an actuarial class.

In some embodiments, the computerized predictive model has been trained on industrial classification data related to entities associated with the contents of a plurality of websites. The computerized predictive model may be further trained by industrial classification-related data extracted from the contents of an insurance claims database. The predictive model may determine a confidence rating or probability for each industrial classification representing how well each industrial classification describes the entity. The business logic processor may determine whether to output an industrial classification based on whether the confidence rating for the industrial classification is above a threshold value. A second predictive model may be use to determine the size of the entity from website content.

In some embodiments, the business logic processor identifies additional information to be obtained based on the at least one industrial classification returned. The business logic processor may determine a set of questions to ask an insurance applicant based on at least one confidence rating, and responses to the questions may be used to determine a suitable industrial classification for the entity.

In some embodiments, the website content comprises at least one image, and the content processor is configured to process the image to be accepted by the predictive model for processing and outputting an industrial classification.

In some embodiments, the business logic processor displays the at least one industrial classification using an insurance application processing system, outputs the at least one industrial classification to an underwriting system, or outputs the at least one industrial classification to a claims processing system. The business logic processor may adjust the price of an insurance premium for the entity based on the insurance evaluation of the entity as determined based on the entity's industrial classification. The business logic processor may compare an industrial classification indicated by the predictive model to a classification obtained from at least one of the entity, an agent, or a third-party.

According to another aspect, the invention relates to computerized methods for carrying out the functionalities described above.

BRIEF DESCRIPTION OF THE DRAWINGS

FIG. 6 is a diagram of a graphical user interface for obtaining additional data related to an entity for use in the insurance underwriting method of FIG. 4, according to an illustrative embodiment of the invention.

FIG. 7 is a diagram of a graphical user interface for displaying industrial classifications determined by a computerized predictive model, according to an illustrative embodiment of the invention.

FIG. 13 shows an exemplary screen shot relating to data usable in connection with embodiments of the invention.

FIG. 19 shows an excerpt of token counts extracted from an entity website.

FIG. 21 shows an excerpt of a decision tree used in an exemplary web-based industry classifier system.

FIG. 23 shows a JSON object that may be received in response to a query of a Third-Party Platform API.

FIG. 24 shows the JSON object of FIG. 23 parsed into a usable structure.

FIG. 26 shows a JSON object that may be received in response to a query of a Third-Party Platform API.

FIG. 27 shows the JSON object of FIG. 23 parsed into a usable structure.

FIG. 28 shows an excerpt of a data table that may be populated with alert terms, uninsurable terms, and additional coverage terms found in the data relating to an entity.

FIG. 32 shows a diagram of a graphical user interface with pre-filled or pre-populated data fields, according to an illustrative embodiment of the invention.

DESCRIPTION OF CERTAIN ILLUSTRATIVE EMBODIMENTS

To provide an overall understanding of the invention, certain illustrative embodiments will now be described, including systems and methods for web-based industrial classification. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

The term "predictive model" as used herein includes any rules or technique using statistical techniques for using a computer to determining a probable or most likely one of a set of possible outputs or values, based on input data. Predictive models are typically created by applying suitable algorithms to sets of data having known results, identified as training data, and then testing resulting predictive models against a set of similar data. Predictive models may be understood as heuristic techniques for determining classifications based on input data. Examples of predictive models include the rotation forest and random forest technique, other classification trees, and other classification model types, such as naïve Bayesian models, Bayesian network models, K-Nearest neighbor models and support vector machines.

Figure 1:
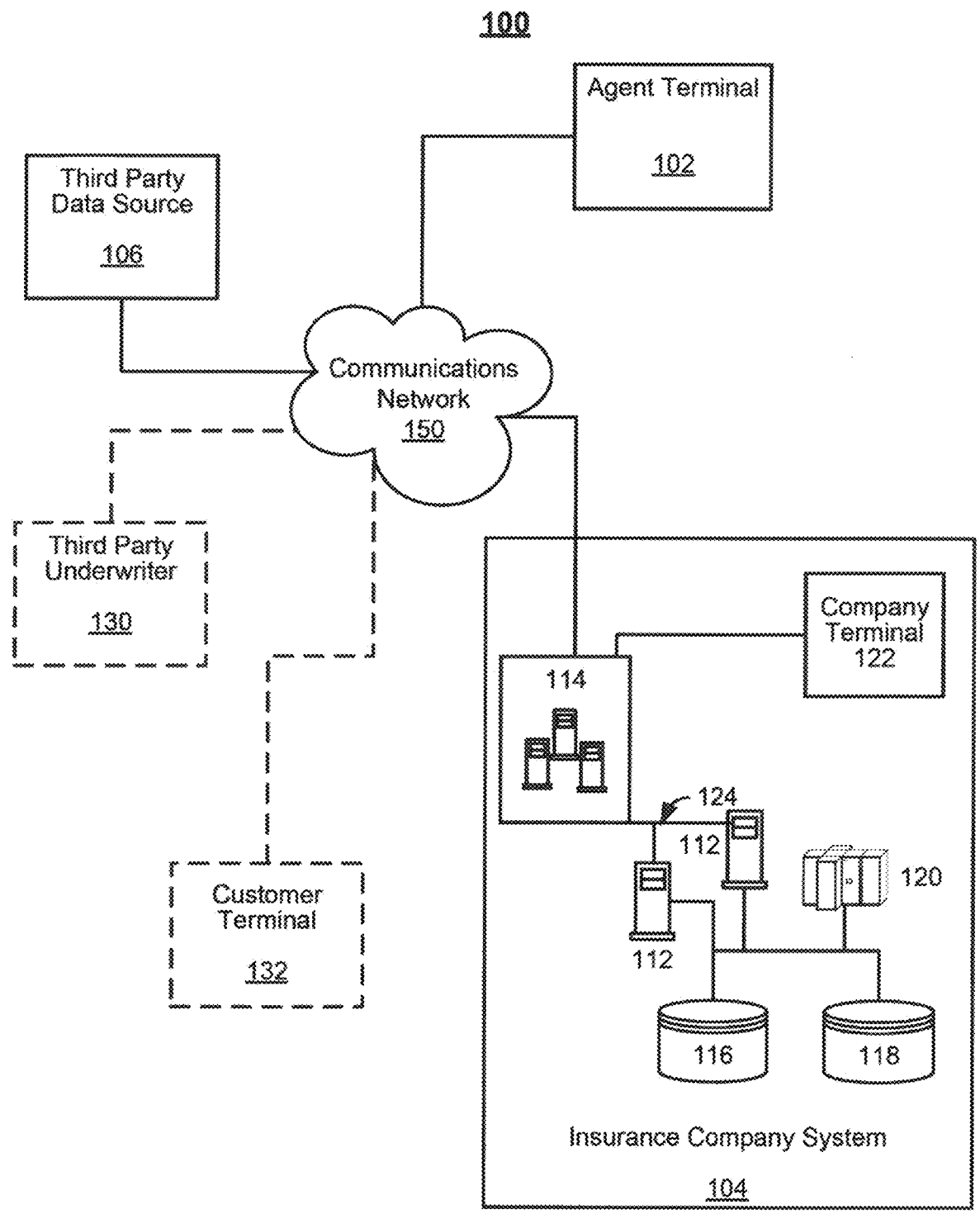
FIG. 1 is an architectural model of a system for determining an industrial classification by an insurance company, according to an illustrative embodiment of the invention.

FIG. 1 is a block diagram of a system 100 for making an insurance evaluation, including determining or verifying one or more likely industrial classifications of an entity by an insurance company, according to an illustrative embodiment. The insurance evaluation may relate to any type of insurance coverage or insurance policy, including, but not limited to, business property casualty insurance policies. Examples of business property casualty insurance include: business automobile; capital assets; crime and fidelity; electronic commerce; equipment breakdown; general liability; inland marine; management protection; professional liability; real and personal property; and workers compensation. The system 100 uses a computerized predictive model to identify at least likely one industrial classification of an entity seeking an insurance policy based on content related to the entity and retrieved from a website. The computerized predictive model is any model configured to try to best predict the probability of an outcome (i.e., one or more likely industrial classifications for the entity). An insurance company uses a determined industrial classification in an insurance determination relating to the entity. The insurance determination may include in embodiments determining whether to provide a quote, determining which risks to underwrite, setting or adjusting a price of an insurance premium, setting or adjusting premiums and other insurance quote and policy terms, and other insurance purposes. In embodiments, the insurance determinations may be determined by one or more computer systems. In other embodiments, one or more steps in the insurance determinations may be made by an insurance professional such as an underwriter; for example, a computer system may generate one or more insurance recommendations which may be adjusted or overridden by an underwriter, or an underwriter may determine one or more insurance determinations without a computer-generated recommendation. An underwriter may be an employee of an insurance company otherwise affiliated with or in a third-party arrangement with the insurance company.

In addition to identifying or verifying one or more likely industrial classifications for the entity, in an embodiment, the system 100 may output scores or rankings for the identified industrial classifications indicating how well they describe the entity. In embodiments, the output may alternatively or additionally include questions or data fields whose responses may be used for better identifying the industrial classification or providing more accurate risk analysis of the entity. In embodiments, the output may be provided to be displayed directly to a representative of the entity, to an insurance agent, or to another employee or contractor of the insurance company. The output may in embodiments alternatively or additionally be sent to a computer system of the insurance company or a third-party providing processing on behalf of the insurance company; such a system may be an underwriting or an insurance processing computer system.

In the embodiment illustrated in FIG. 1, the system 100 includes one or more insurance agent terminals 102 in communication with an insurance company system 104 over a communication network 150. Insurance agents typically collect information and work on behalf of an insurance company to sell insurance to an entity. Insurance agents may be employed by the insurance company, or they may be third-party individuals or employed by a third-party company and contracted by the insurance company to market insurance products. Insurance agents who are not directly employed by the insurance company but who market the insurance company's products are considered a part of the insurance company for the purposes of this application. Each insurance agent terminal 102, which may in an embodiment be part of an insurance agent company system, interacts with the insurance company system 104. The agent terminal 102 in embodiments stores and executes software via which an insurance agent may obtain information from, and sell insurance policies to, customers of the insurance agent. In one implementation, such software includes a web browser configured for receiving and displaying web page data from the insurance company system 104. In embodiments, the agent terminal software includes a thin or thick client that communicates with the insurance company system 104. In general, an agent terminal 102 can be any computing device known in the art, including for example, a personal computer, a laptop computer, netbook, smart phone, hand-held computer, or a personal digital assistant. In embodiments, at least a portion of the functionality of one or more agent terminals 102 is carried out by a computing device operated by the insurance company. In embodiments, the insurance company may offer a web site for direct customer interaction, for example to purchase a new insurance policy, update an insurance policy, receive a new insurance policy quote, or request renewal of an insurance policy.

In the embodiment illustrated in FIG. 1, the insurance company system 104 includes a plurality of application servers 112, a plurality of load balancing proxy servers 114, an insurance company database 116, a claims database 118, a processing unit 120, and company terminal 122. These computing devices are connected by a local area network 126.

The application servers 112 are responsible for interacting with the agent terminals 102. For example, the application servers 112 store and execute software for generating web pages for communication to the agent terminals 102. These web pages serve as user interfaces for insurance agents to interact with the insurance company system 104. In embodiments, alternatively, or in addition, one or more of the application servers 112 may be configured to communicate with thin or thick clients operating on the agent terminals 102. The load balancing proxy servers 114 operate to distribute the load among application servers 112.

The insurance company database 116 stores information about insurance policies sold by the insurance agents. For each insurance policy, the database 116 includes for example and without limitation, the following data fields: policy coverage, limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, or derivations thereof. Additionally, an insurance claims database 118 includes information related to claims of insurance policies, such as descriptions of events causing insurance claims to be made, information about the entities involved, police reports, and witness statements. A single database may be used for storing data from both the insurance company database 116 and the insurance claims database 118. A logical database may be stored in one or more physical data storage devices which may be co-located or located at different facilities.

The processing unit 120 is configured for determining or verifying one or more likely industrial classifications of an entity. The processing unit 120 may comprise multiple separate processors, such as a content processor, which retrieves content from client-related electronic resources such as websites and social media resources, over the communications network 150, current policy content from the insurance company database 116, and/or insurance claims content from the claims database 118. The processing unit 120 also includes a computerized predictive model processor which receives input from the content processor to determine or verify one or more likely industrial classifications for an entity. In an embodiment, the processing system 120 further includes a business logic processor, which, among other things, is configured to determine one or more insurance determinations, including determining a risk associated with an industrial classification and setting characteristics of an insurance policy based on that risk and/or the classification. The business logic processor may be configured to price an insurance policy and generate a quote. In an alternative embodiment, insurance quotes may be generated by a separate processor called a quote generation processor. An exemplary implementation of a computing device for use in the processing system 120 is discussed in greater detail in relation to FIG. 2.

The company terminals 122 provide various user interfaces to insurance company employees to interact with the processing system 120. The interfaces include, without limitation, interfaces to adjust, further train, or retrain the computerized predictive model; to retrieve data related to the computerized predictive model; to manually adjust identified industrial classifications; and to adjust insurance risks of industrial classifications. In some embodiments, different users may be given different access privileges. For example, marketing employees may only be able to retrieve information on entities and industrial classifications but not make any changes to databases or predictive models. Such interfaces may be integrated into one or more websites for managing the insurance company system 104 presented by the application servers 112, or they may be integrated into thin or thick software clients or stand alone software. The company terminals 122 can be any computing devices suitable for carrying out the processes described above, including personal computers, laptop computers, personal digital computers, smart phones, servers, and other computing devices.

The third-party data sources 106 provide data not generally available in the insurance company system 104. Third-party data can be obtained freely or by purchasing the data from third-party sources. The third-party data may be used for training the computerized predictive model or categorizing a particular entity seeking insurance. The third-party data sources include web pages published publicly on the Internet or secure websites that require login access. The third-party data sources may include data from advertising sources, such as yellowpages.com, services providing ratings, such as Angie's List and Yelp, and other sources. The content processor in processing system 120 can retrieve content from electronic resources accessible via networks including the Internet from, for example, the website of entities seeking insurance, social media pages and fees of such entities, or electronic resources of entities that publish reviews of the entity seeking insurance. Third-party data sources may also include industrial classifications from credit information vendors, such as Experian or Dun & Bradstreet, or other third-party entities that provide industrial classifications. These or similar companies may also provide company or organization profile information for categorizing an entity or training the predictive model.

In an embodiment, the system 100 includes an underwriter. The insurance company may include an underwriting service, which is part of or in communication with the insurance company system 104. In some cases, the insurance company may contract with one or more third-party underwriters 130, which are separate from the insurance company system 104. The underwriter evaluates the risks and exposures of the entity seeking insurance. The underwriter may also set the price of an insurance premium. In the case that underwriting analysis is performed outside of the insurance company system 104, the underwriter system may include one or more of the processing elements of processing unit 120. In embodiments, the underwriter system may include the content processor for retrieving and processing data related to an entity for classifying the entity, and the computerized predictive model for determining an industrial classification related to the entity. Alternatively, the insurance company system 104 may include these processing elements and send the results over the communication network 150 to the underwriter, which will use the industrial classification information to set the premium price. The underwriting system may also include one or more underwriter communications devices for communicating with the insurance company system 104, one or more underwriter computer storage devices, one or more underwriter computer processors, and underwriter program memory coupled to the one or more underwriter computer processors for storing program instructions.

Rather than shopping through an insurance agent, a customer may interact directly with the insurance company system 104 through customer terminal 132 over communications network 150. A representative of the entity directly enters data related to the entity for use in pricing an insurance policy for the entity. The representative also receives output from the insurance company via the customer terminal 132. The customer terminal 132 in embodiments stores and executes software via which a customer may obtain information on and purchase insurance policies. In embodiments, such software includes a web browser configured for receiving web page data from the insurance company system 104. In alternative embodiments, the software includes a thin or thick client that communicates with the insurance company system 104. The customer terminal 132 may be any computing device known in the art, including for example, a personal computer, a laptop computer, netbook, smart phone, hand-held computer, or a personal digital assistant.

Figure 2:
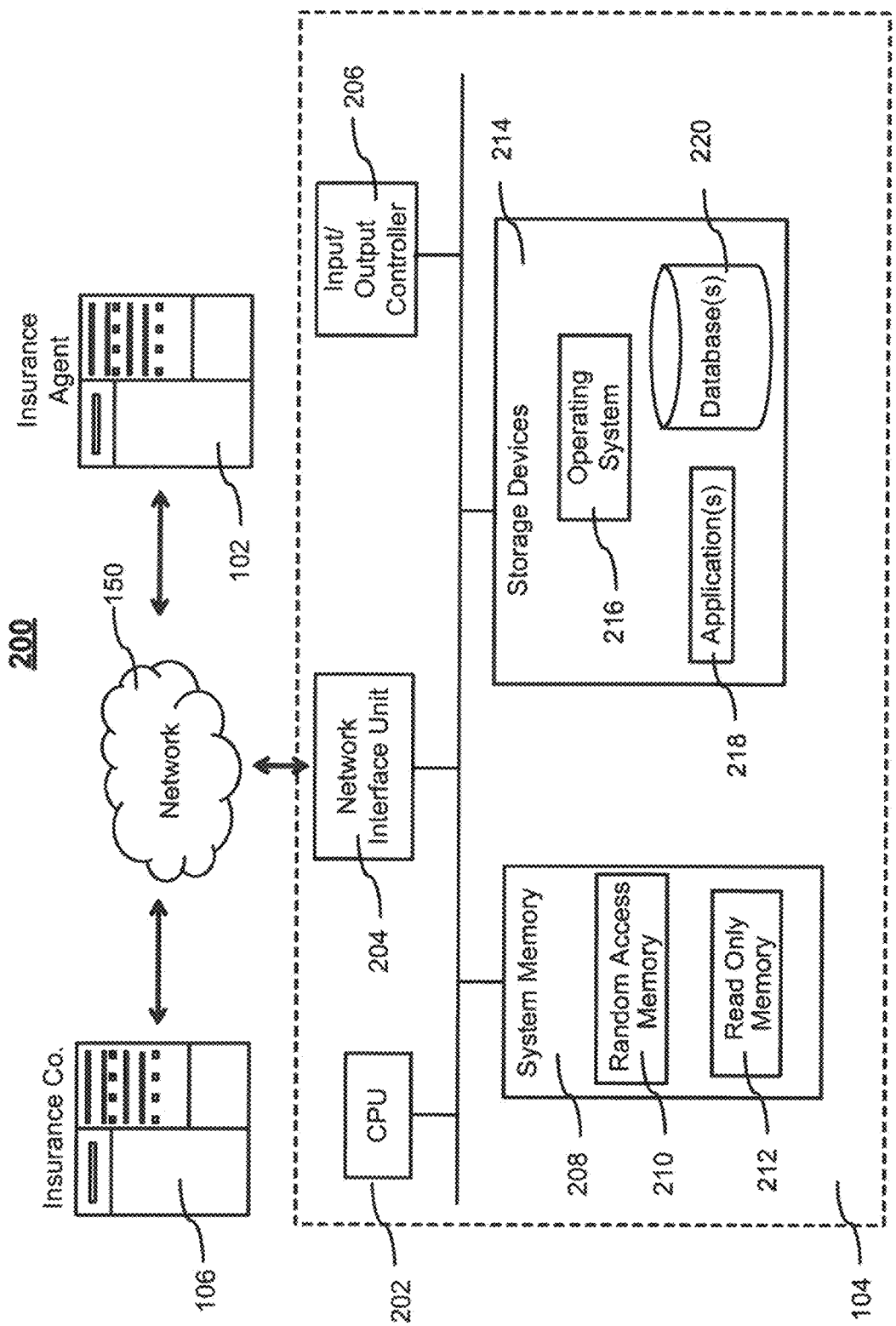
FIG. 2 is a block diagram of a computing system as used in FIG. 1, according to an illustrative embodiment of the invention.

FIG. 2 is a block diagram of a computing device 200 used for carrying out at least one of content processing, predictive model processing, and business logic processing described in relation to FIG. 1, according to an illustrative embodiment of the invention. The computing device comprises at least one network interface unit 204, an input/output controller 206, system memory 208, and one or more data storage devices 214. The system memory 208 includes at least one random access memory (RAM) 210 and at least one read-only memory (ROM) 212. All of these elements are in communication with a central processing unit (CPU) 202 to facilitate the operation of the computing device 200. The computing device 200 may be configured in many different ways. For example, the computing device 200 may be a standalone computer or alternatively, the functions of computing device 200 may be distributed across multiple computer systems and architectures. The computing device 200 may be configured to perform some or all of the content processing, predictive model processing, and business logic processing, or these functions may be distributed across multiple computer systems and architectures. In the embodiment shown in FIG. 1, the computing device 200 is linked, via network 150 or local network 124 (also described in FIG. 1), to other servers or systems housed by the insurance company system 104, such as the load balancing server 114, and the application servers 112.

The computing device 200 may be configured in a distributed architecture, wherein databases and processors are housed in separate units or locations. The computing device 200 may also be implemented as a server located either on site near the insurance company system 104, or it may be accessed remotely by the insurance company system 104. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured as a content processor. The content processor retrieves external data from, for example, the Internet and claims database 118. The content processor accesses the Internet, claims database 118, or other data source and extracts data for predictive model processing. The content processor may extract and manipulate data from text, images, or other formats delivered through HTML, SVG, Java applets, Adobe FLASH, Adobe SHOCKWAVE, Microsoft SILVERLIGHT, or other web formats or applications. The same computing device 200 or another similar computing device may be configured as a predictive model processor. The predictive model processor receives input from the content processor to determine one or more likely industrial classifications for an entity.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. In some embodiments, the database(s) 220 includes a database storing insurance company data and/or claims data used for training the predictive model or identifying the industrial classifications of entities. The database(s) 220 may include all or a subset of data stored in insurance company database 116 and/or claims database 118, described above with respect to FIG. 1, as well as additional data, such as formulas or manual adjustments, used in establishing the insurance risk of an entity and other insurance determinations.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing determinations of likely industrial classifications as described in relation to the following Figures. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
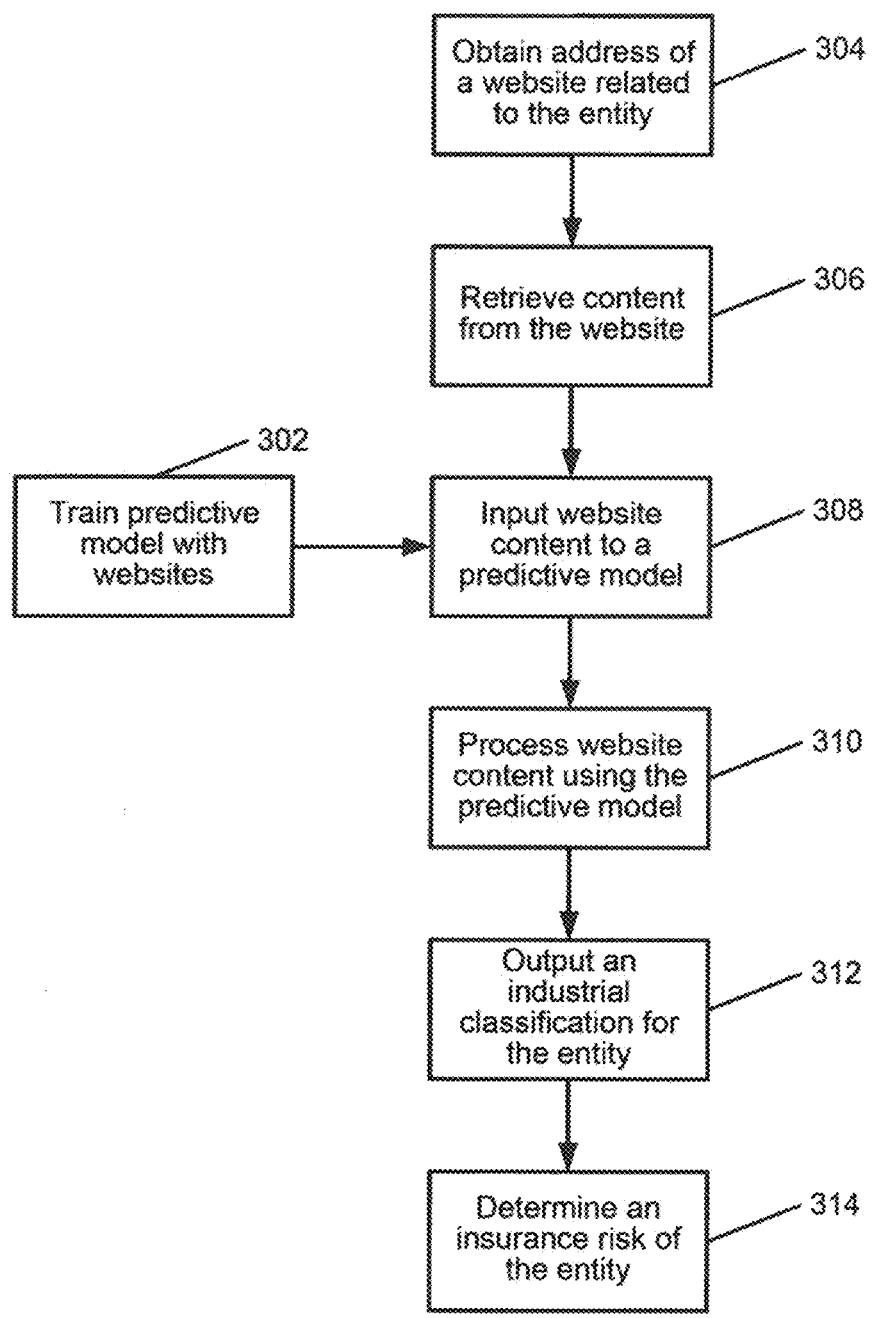
FIG. 3 is a flowchart for a method of determining the industrial classification and insurance risk of an entity, according to an illustrative embodiment of the invention.

FIG. 3 is a flowchart for a method 300 of determining the industrial classification and insurance risk of an entity, according to an illustrative embodiment of the invention. The method 300 comprises training a predictive model with websites (step 302), obtaining a web address related to an entity (step 304), retrieving content from the website (step 306), accepting processed web content (step 308), further processing the website content using a predictive model (step 310), outputting an industrial classification for the entity (step 312), and determining an insurance risk of the entity (step 314).

Before using the computerized predictive model, it must be trained on a set of training data (step 302). Training data includes content retrieved from websites, such as company websites; ratings websites such as ConsumerSearch, Epinions, and Yelp; and social networking sites, such as Facebook, Twitter or LinkedIn. Any website that includes information about an entity with a known industrial classification and/or employees of that entity may be used as training data. Any combination of techniques for web scraping, such as text grepping, HTTP programming, DOM parsing, HTML parsing, or use of web scraping software, may be used to retrieve web content. The content may comprise text, images, videos, animation, or any other website content. The content may be published on the website using HTML, SVG, Java applets, Adobe Flash, Adobe Shockwave, Microsoft Silverlight, or other web formats or applications. The content processor is configured for retrieving the website content in some or all of the aforementioned formats or any other format.

In order to train the computerized predictive model, the extracted electronic resource data is processed in order to identify indicators of a particular industrial class. For text data, natural language processing techniques may be used to organize the text. The content processor may filter stop words, such as articles or prepositions, from the text. In one embodiment, the content processor may only retain words of a certain part of speech, such as nouns and/or verbs. The remaining words may be reduced to their stem, base, or root form using any stemming algorithm. Additional processing of the website content may include correcting spelling errors, identifying synonyms of words, performing coreference resolution, and performing relationship extraction. Once the words have been processed, they may be counted and assigned word frequencies or ratios.

In addition to website content, each entity is assigned at least one industrial classification, typically from a standardized industrial classification system such as the Standard Industrial Classification (SIC) system or North American Industrial Classification System (NAICS). The industrial classifications may be provided by a third-party, such as a vendor like Experian or Dun and Bradstreet, and/or assigned by the insurance company. If the industrial classifications are provided by a third-party, the insurance company may review the assigned classifications and confirm or adjust them. More than one industrial classification may be assigned to an entity. For example, a bakery may fall under at least SIC codes 2050 (Bakery Products) and 2052 (Cookies and Crackers) if the bakery makes cookies as well as cakes and pies.

The computerized predictive model is trained to classify an entity's website content as indicative of one or more industrial classifications, for example, using the word count or word frequency data described above. Because of the large amount of data and large amount of potential industrial classifications, Bayesian classifiers, particularly Naïve Bayes classifiers and hierarchical Bayesian models, are very suitable. One Bayesian model that is particularly suitable is the Latent Dirichlet allocation model, which is a topic model that allows sets of observations to be explained by unobserved groups that explain why some parts of the data are similar. The text of a website or group of websites is viewed as a mixture of various topics, and learning the topics, their word probabilities, topics associated with each word, and topic mixtures of documents is a problem of Bayesian inference. The Latent Dirichlet allocation model is described in detail in the paper "Latent Dirichlet allocation" by David M. Blei, Andrew Y. Ng, and Michael I. Jordan (Journal of Machine Learning Research 3: pp. 993-1022, January 2003), incorporated herein by reference. Suitable statistical classification methods also include random forests, random naïve Bayes, Averaged One-Dependence Estimators (AODE), Monte Carlo methods, concept mining methods, latent semantic indexing, k-nearest neighbor algorithms, or any other suitable multiclass classifier. The selection of the classifier can depend on the size of the training data set, the desired amount of computation, and the desired level accuracy.

For classifying an entity using a trained predictive model, the industrial classification system first obtains a web address related to the entity (step 304). The web address may be input through an application on the agent terminal 102 or customer terminal 132 from FIG. 1. The web address may be received from a third-party data source, such as a vendor that collects and distributes information on entities. Alternatively, the web address may be retrieved from the insurance company database 116, which may store the web addresses of insured entities' websites. The system may include or be in connection with another database or data store to supply a web address. For example, a system memory may store web addresses of popular ratings or review websites, such as ConsumerSearch, Epinions, Yelp, etc., which can be searched to obtain a web address of a web page with published reviews and other information related to the entity. Similarly, the processing unit 120 may automatically search the Internet using, for example, Google, Bing, Yahoo!, etc. and inputting the entity's name, possibly along with other information, such as location. Such a search can return addresses of the entity's website and/or addresses of other websites related to the entity. In another embodiment, the processing unit 120 may search social networking sites, such as Facebook or LinkedIn, that include information about the entity and/or employees of the entity. Employee information of interest for identifying an industrial classification includes education, past positions, and current job title. In embodiments, the obtained data may include data from any accessible electronic resources under the control of the customer. In social networking sites or social networking services, the resources searched may include pages or other portions of resources maintained by or on behalf of a customer on social networking services such as the FACEBOOK®, MYSPACE® and TWITTER® social networking services, as well as communications, such as status updates and tweets, generated on behalf of the entity to subscribers or followers. In embodiments, data generated by third parties not under the control of the entity, such as wall posts and retweets, but associated with the entity in a social networking site, may also be obtained. Data not generated by or on behalf of the entity may be tagged or identified as such to provide for differential processing in the model, such as by providing a lower weight to such data.

Next, the content processor retrieves content from the website (step 306). The content may comprise text, images, videos, animation, or any other website content. The content may be published on the website using HTML, SVG, Java applets, Adobe Flash, Adobe Shockwave, Microsoft Silverlight, or other web formats or applications. The content processor is configured for retrieving the website content in some or all of the aforementioned formats or any other format. The content processor is further configured to convert the content to a format suitable for the computerized predictive model as necessary, according to, for example, the methods described above. In some embodiments, the content from multiple websites (e.g. a company website and one or more ratings websites) is obtained, or multiple pages on or linked from a company's website are obtained. Once the website content has been gathered and processed as necessary, it is then sent to the computerized predictive model processor (step 308). In one embodiment, the content processing element and computerized predictive model are located on the same physical processor. The content processor may flag certain words, such as "nuclear", "explosives", "obstetrician", or "midwife", that indicate that an entity might be particular risky and should be subject to further review.

Upon receiving the website content, the computerized predictive model processes the content according to the classification method being used to determine at least one industrial classification for the entity (step 310). The industrial classification may be a standardized classification code, such as a NAICS, SIC, or ICB code. Depending on available data and desired resolution, the computerized predictive model may return industry, supersector, sector, or subsector classifications. The computerized predictive model may first select one or more industries, then select one or more supersectors within the selected industries, and so forth, collecting additional data to achieve more specific classifications. The computerized predictive model may also calculate a value, such as a confidence level or likelihood, indicating how well a particular industrial classification describes the entity. The computerized predictive model may also return an estimation error.

The one or more industrial classes identified by the computerized predictive model are then output to a business logic processor. From the output of the computerized predictive model, the business logic processor determines an insurance risk of the entity (step 314). The business logic processor may look up an insurance risk of a particular entity in a table. The insurance risk may be further based on additional information related to the entity, for example and without limitation, the company size, a geographic region in which the company operates, materials used or stored by the company, or the business cycle of the entity.

If the model outputs more than one classification for an entity, the business logic processor can calculate an aggregate risk rating. The insurance risks associated with the industrial classifications may be weighted by the confidence level or likelihood of each industrial classification and summed. Alternatively, the insurance risks may be weighted according to the rankings of the confidence level. There may be a set lower threshold of confidence of likelihood below which industrial classifications are not considered. In other implementations, the insurance risk is simply the insurance risk of the entity that has the highest insurance risk, or alternatively the insurance risk of the most likely industrial classification. The insurance risk may depend on the type of coverage sought. In this case, each industrial classification may have different insurance risks for different types of coverage.

In some embodiments, the business logic processor is located on an underwriter's computer system 130, which receives the output of the computerized predictive model processor over the network 150. In other embodiments one or both of the computerized predictive model processor and the content processor are located on the underwriter's computer system 130 as well.

In addition, in certain embodiments, the insurance company can either augment the predictive model using other available data related to entities or build additional stand-alone predictive models from additional data. For example, data obtained from web scraping can be augmented with claims data by applying similar data scraping techniques to the claims database 118, discussed above in relation to FIG. 1. The claims database 118, which includes descriptions of events causing insurance claims to be made, information about the entities involved, police reports, and/or witness statements, includes information that is highly relevant to losses entities may incur. Therefore, words identified in the claims database may be assigned heavier weights in the model as they may be more indicative of the types of claims that would be received from an entity. In another example, upon receiving a claim from an entity, the insurance company may reevaluate the industrial classification of the entity to determine if it needs to be changed in the future. In this case, the insurance company system determines the industrial classification by processing the claim data with a standalone predictive model trained on the claims database 118 or a predictive model trained on both claim and web data.

In addition to industrial classification, the computerized predictive model or a second computerized predictive model may be used to determine additional information about the entity. For example, the website content may be analyzed by the same or another similarly trained computerized predictive model to determine, for example, the company size, a geographic region in which the company operates, materials used or stored by the company, the business cycle of the entity, and/or any other data relevant to analyzing insurance risk.

Figure 4:
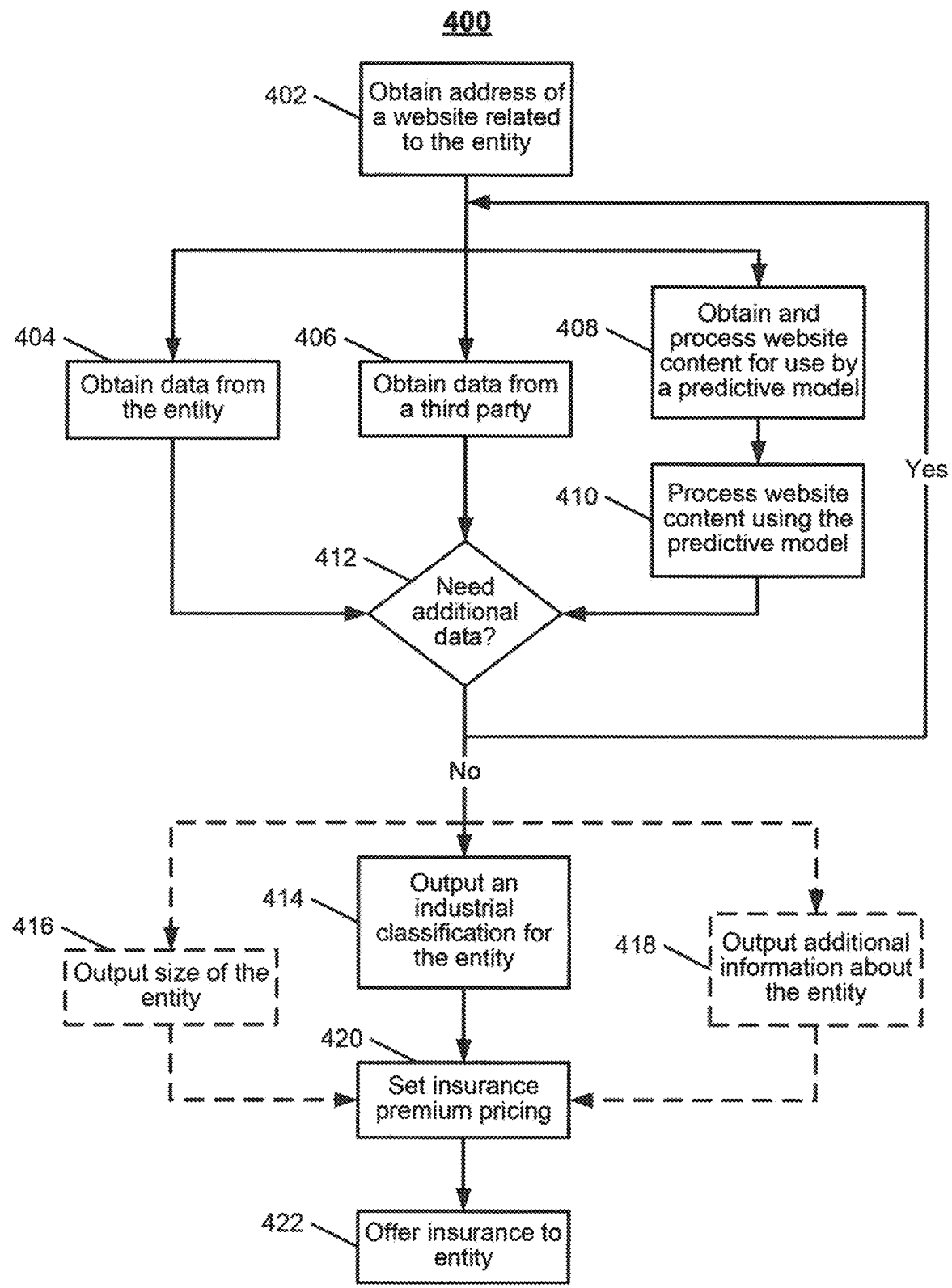
FIG. 4 is a flowchart of a method for determining and using the industrial classification and insurance risk of an entity within an insurance underwriting process, according to an illustrative embodiment of the invention.

FIG. 4 is a flowchart of a method 400 for determining and using the industrial classification and insurance risk of an entity in an insurance underwriting process, according to an illustrative embodiment of the invention. The method 400 is used in an agent-assisted and/or computer application-assisted system for gathering information on an entity and determining an insurance premium price for the entity. The method begins with obtaining the address of a website related to an entity (step 402). Once the website address is obtained, the method includes a loop for obtaining data related to the entity from the entity (step 404), a third-party (step 406), and websites (steps 408 and 410). Once it has been determined that no more additional data is needed (decision 412), computerized predictive models and/or other processing elements output information related to the entity (steps 414, 416, and 418), and an insurance price is set (step 420). Finally, the insurance at the determined premium price is offered to the entity (step 422).

First, the website related to the entity is obtained (step 402), similarly to obtaining the web address in step 302 from FIG. 3. Preferably, a representative of the entity or agent inputs a URL related to the entity. If the entity does not have a website or the representative does not volunteer a website, the web searching techniques discussed with respect to step 302 of FIG. 3 may be used to find a website published by the entity or containing information related to the entity. If the representative or agent does provide a website, the searching techniques may still be used to confirm the website provided and/or find additional websites with information related to the entity.

Once the website is obtained (step 402) three actions are performed in parallel. The agent or computer application obtains additional data from the entity (step 404). At the same time, a processor seeks additional data from a third-party (step 406), and the content processor and computerized predictive model scrape website data and determine at least an initial industrial classification for the entity (steps 408 and 410). The agent or computer program may obtain basic information related to the entity, such as its name and contact information, before obtaining the entity's web address. However, it is useful to obtain the web address early in the process, so that while the agent or computer application are collecting information from the representative, the system can determine the entity's insurance risk, determine if additional information should be collected, and even determine what questions to direct to the entity based on the industrial classification and third-party data. This streamlines the insurance application process by dynamically adjusting the line of questioning as new information is gathered from the entity and outside sources and reducing the number of questions that the representative of the entity needs to answer.

The data is obtained from the entity (step 404) in a computer-readable format. For example, representative of the entity or the insurance agent may enter text, select radio buttons, select a position on a number line, choose a response from a drop-down menu, or use any other form of graphical user input in a response to questions or requests from a computer application. The representative or agent may answer questions over a telephone or into a microphone and his voice processed with voice recognition software. Any other known form of user input may be used. An exemplary application for data collection is discussed below in relation to FIGS. 5 and 6.

A processor, such as CPU 202, seeks third-party data for use in categorizing and assessing the entity (step 406). In some cases, website content may be processed directly without the use of a computerized predictive model. Third-party data includes data from the websites discussed with respect to FIG. 3. Third-party data may also be retrieved from an information vendor, such as those discussed above in relation to FIG. 1, which return an industrial classification or other data related to the entity. The method for obtaining and processing data from at least one website (step 408) and processing it with a computerized predictive model (step 410) are similar to steps 306, 308, and 312 discussed above in relation to FIG. 3.

Once data has been collected from the entity, data has been collected from any third parties, and/or data has been obtained and processed using a predictive model, the results are analyzed to determine if additional data should be collected (step 412). Several examples of scenarios in which additional data may be useful are described below.

In one example, the insurance system has established that the entity's industry is food production, the entity is located in Boston, and the entity employs 15 people. The industrial class and other entity information can be more specific, e.g. what kind of food is produced, which neighborhood is the entity located, and how many hours are worked by the employees. Therefore, the business logic processor determines what or how much additional data the computerized predictive model needs to determine a more specific industrial classification. In another example, the computerized predictive model has established that the entity's most likely industrial classification is bakery products, but only with 60% confidence. Because the confidence level is low, it is preferable to obtain more data to try to improve the confidence level. If it is determined that more data should be collected, the business logic processor determines whether other questions should be asked of the representative of the entity, and whether additional data should be requested from third parties.

In another example, a third-party vendor returns the industrial classification for "General Contractor", but the computerized predictive model has returned the industrial classification "Painter." A disagreement between the two industrial classifications triggers a review process, wherein additional data may be sought from websites to be inputted into the computerized predictive model, additional questions may be generated and asked of the representative of the entity, and/or additional data may be sought from third parties. If the discrepancy cannot be resolved, the entity may be flagged for future review by an agent, an employee of the insurance company, or a human underwriter. Once the data of interest has been gathered, it is again analyzed to determine if additional data should be collected (step 412), and whether it is possible to obtain the desired information with additional data collection. If sufficient data has been received or the computerized predictive model returns a high enough confidence level in the classification, then it is determined that additional data is not needed, and the process proceeds to steps 416, 418, and 420.

Steps 416, 418, and 420 relate to outputting entity characteristics. The industrial classification is output to interested parties such as the agent, the representative, or an underwriter, and/or a business logic processor (step 414). In addition, the size of the entity, measured by, for example, annual income, number of employees, payroll, tax bracket, or another means (step 416) or any additional information about the entity, such as the location of the entity (step 418) may be output to the interested parties and/or the business logic processor. If not output directly to the business logic processor or another risk analysis module, the industrial classification and any other information may be stored until the representative or agent submits the insurance application, and they may be output to the agent, representative, or another knowledgeable party for confirmation.

The industrial classification and other application information, such as entity's name, contact information, size, location(s), type of insurance sought, and any industry-specific information is then sent to a business logic processor for setting the price of an insurance premium (step 420). The price and/or coverage are set based on risks associated with the industrial classification and any other characteristics of the entity. Once an offer of insurance is generated by the business logic processor, the offer is delivered to the entity via the agent or computer application (step 422). At this point, the representative of the entity can purchase the quote, save the quote for a later decision, request a revised quote, or turn down the quote.

The method 400 may be used not only to evaluate an entity applying for a new insurance policy, but also to reevaluate the industrial classification of a current policy holder. From time to time, particularly when an entity's policy is up for renewal, the insurance company may reevaluate the premium pricing using method 400. The insurance company may use an abbreviated but similar method since it may not be necessary to retrieve and/or confirm all of the information for an existing customer.

Figure 5:
FIG. 5 is a diagram of a graphical user interface for obtaining data related to an entity for use in the insurance underwriting method of FIG. 4, according to an illustrative embodiment of the invention.

FIG. 5 is a diagram of a graphical user interface 500 of a computer application for obtaining data related to an entity for use in insurance underwriting, according to an illustrative embodiment of the invention. The graphical user interface 500 is configured so a representative of an entity can enter information about the entity, or so an agent can ask questions to the representative and fill in the answers. The first entry screen (not shown) of the computer application includes basic information on the entity, e.g. name, phone number, representative name, representative address, and representative email address. Graphical user interface 500, as shown, is a suitable second entry screen, still focused on general questions not specific to the industry. The web address is requested early, allowing the industrial classification and third-party data requests to run in the background while the user is answering questions.

The graphical user interface 500 includes a text box 502 in which the user enters the entity's website address. The graphical user interface 500 includes additional basic questions about the size and the location of the company. The size of the company is entered using radio buttons 504. If the user selects 1000+ employees, a later screen may ask the same question with larger answer choices. Alternatively, the number of employees may be answered by using a text box or by selecting a position along a number line. The city is typed into text box 506, and the state selected using drop-down menu 508. A Home button 510, a Back button 512, and a Next button 514 are used for navigation within the application. Home button 510 returns the user to a home screen, Back button 512 returns the user to a previous entry screen, and Next button 514 moves the user to the next entry screen. Hitting the Home button 510 may automatically save the responses so that the agent and/or representative may return to the application. Alternatively, the computer application may include a separate save function. The user is permitted to go back to previous entry screens to change answers, and the user can move ahead without answering all of the questions on an entry screen.

FIG. 6 is a diagram of a graphical user interface 600 for obtaining additional data related to an entity for use in insurance underwriting, according to an illustrative embodiment of the invention. FIG. 6 is a graphical user interface that may be displayed after the computerized predictive model has determined that the entity is in the roofing industry. The graphical user interface 600 asks questions specific to the roofing industry to determine what types of buildings the entity works on and which roofing materials are used in roofing projects. Different roofing projects and/or roofing materials may pose different levels of health or accident hazard and are associated with different industrial classifications. Thus, when pricing a policy including, for example, workers compensation insurance to a roofing contractor, the precise type of roofing being done by the roofers is important in establishing risk.

Both questions in FIG. 6 are answered using radio buttons 602 and 604. The navigation buttons 610, 612, and 614 are the same as navigation buttons 510, 512, and 514 from FIG. 5.

FIG. 7 is a diagram of a graphical user interface 700 for displaying industrial classifications determined by a predictive model, according to an illustrative embodiment of the invention. The industrial classification descriptions 704, listed in order from most suitable to least suitable, are presented in a table with their Standard Industrial Classification (SIC) codes 702 and confidence levels 706. The industrial classification(s) chosen for display may be based on a maximum number of allowable results or based on which classifications have been assigned a confidence level greater than a minimum confidence level. Rather than using the SIC system, other industrial classification code systems, such as North American Industrial Classification System (NAICS) classifications, Global Industry Classification System (GICS) classifications, Industrial Classification Benchmark (ICB) classifications, Thomson Reuters Business Classifications (TRBC), Statistical Classification of Economic Activities (NACE), Australian and New Zealand Standard Industrial Classifications (ANZSIC), or International Standard Industrial Classifications (ISIC) may be used. The computerized predictive model may be trained on one industrial classification system and store one or more lookup tables to translate to different industrial classification systems. This allows for compatibility with newer industrial classification systems if developed.

The graphical user interface 700 may allow the user to select the industrial classification or multiple industrial classifications that they believe are the most suitable. The navigation buttons 710, 712, and 714 are the same as navigation buttons 510, 512, and 514 from FIG. 5.

Figure 8:
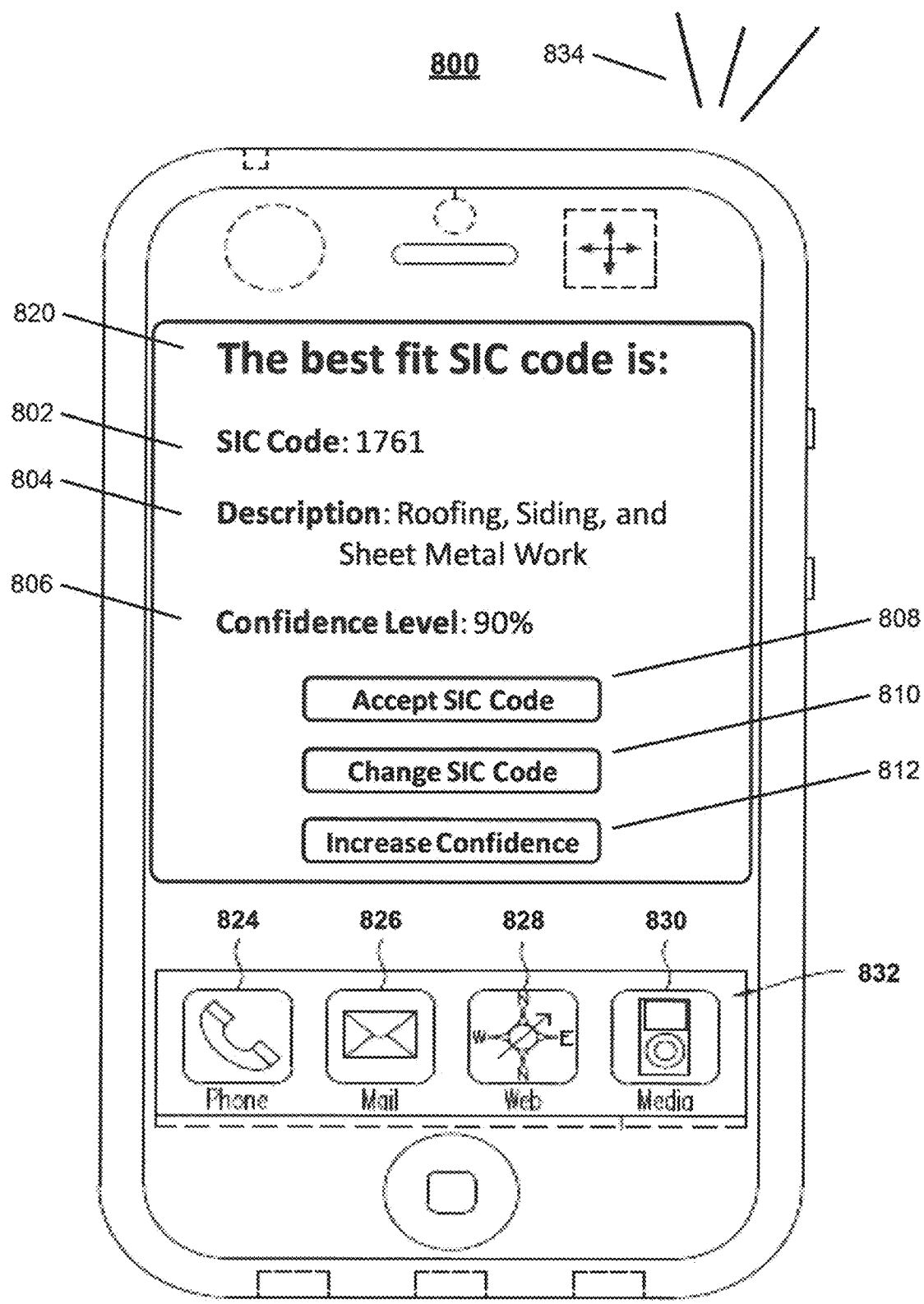
FIG. 8 is a diagram of a mobile device for executing an application for presenting an industrial classification of an entity, according to an illustrative embodiment of the invention.

FIG. 8 is a diagram of a mobile device 800 for executing an application for presenting an industrial classification of an entity, according to an illustrative embodiment of the invention. An insurance agent who travels may use an application on his mobile phone to fill out an application for an entity. For example, if an insurance agent needs to inspect facilities, assets, or behaviors of an entity for the insurance application, he uses the mobile device 800 to gather information about the entity while he is on-site. The mobile phone is in communication with the insurance company system 104 via antenna 834. The insurance company system 104 may perform any or all of the processing functions needed by methods 300 and 400 and return the results to the mobile device 800 for display.

As shown, the mobile device can launch one or more applications by selecting an icon associated with an application program. As depicted, the mobile device 800 has several primary application programs 832 including a phone application (launched by selecting icon 824), an email program (launched by selecting 826), a web browser application (launched by selecting icon 828), and a media player application (launched by selecting 830). Those skilled in the art will recognize that mobile device 800 may have a number of additional icons and applications, and that applications may be launched in other manners as well. In the embodiment shown, an application, such as insurance risk application, is launched by the user tapping or touching an icon displayed on the touch screen interface of the mobile device 800.

The graphical user interface 820 displayed on the mobile device 800 shows the output of the computerized predictive model. The graphical user interface 820 shows the selected SIC code, the description of the industrial classification, and the confidence level of the selected industrial classification. If the user agrees with the SIC code, then the user presses Accept SIC Code button 808. If the user does not think the SIC code is correct and wants to change it by, for example, choosing a different SIC code from a list of other selected industrial classifications with lower confidence levels, choosing a different SIC code from a list of all SIC codes, or manually entering a different SIC code, the user presses Change SIC Code button 810. If the user is unsure about the SIC code and wants to try to improve the confidence level, the user can press the Increase Confidence button 812, which will generate additional questions and/or perform additional analysis of third-party data and website content to try to be more certain about the SIC code. In some implementations, the graphical user interface 820 can display multiple SIC codes, some or all of which may be suitable for the entity.

Figure 9:
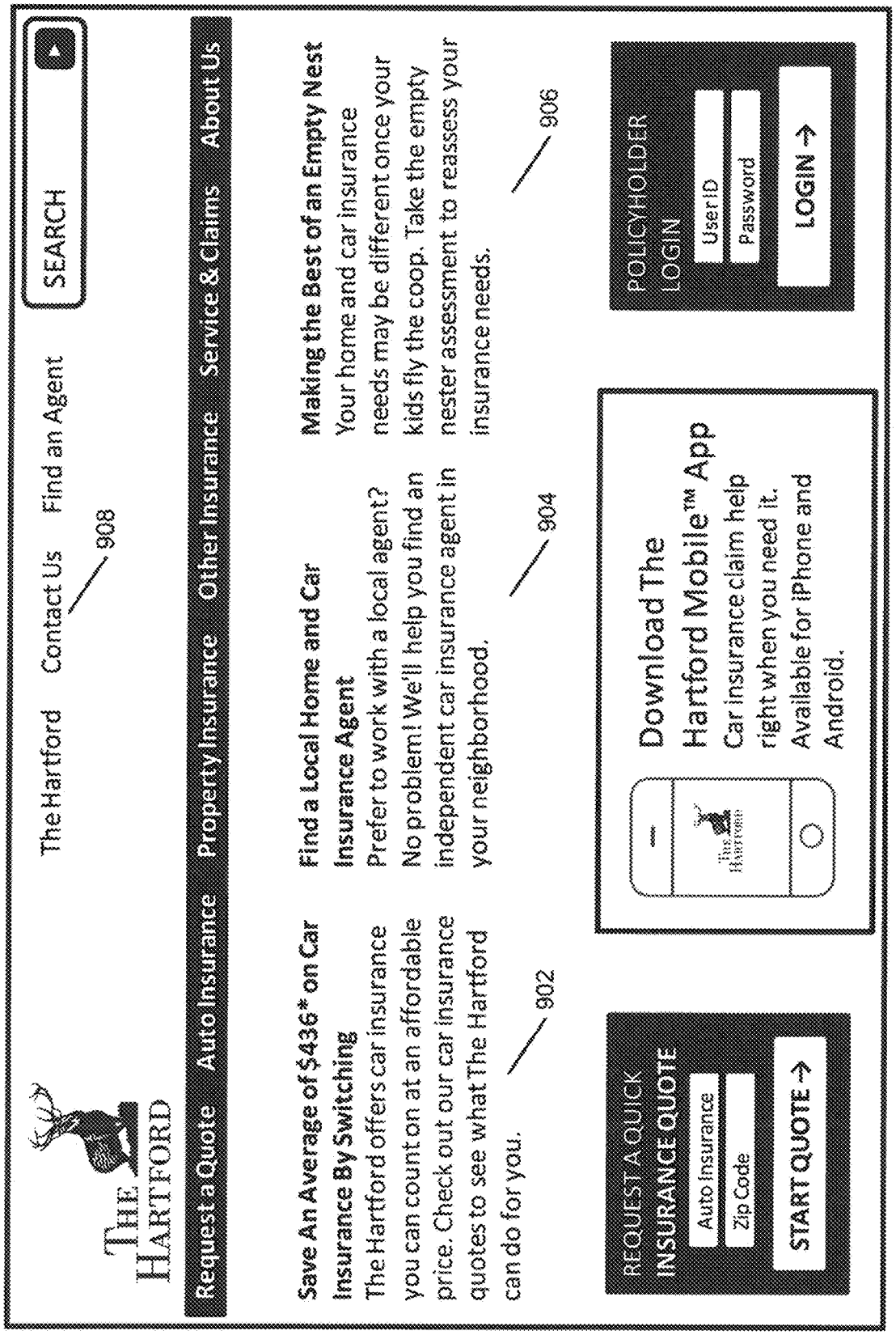
FIG. 9 is a simplified web page, illustrating a type of web page that would be analyzed for determining the industrial classification of an entity, according to an illustrative embodiment of the invention.

FIG. 9 is a simplified web page illustrating a type of web page that would be analyzed for determining the industrial classification of an entity, according to an illustrative embodiment of the invention. To classify The Hartford Financial Services Group, Inc., the industrial classification system may first navigate to the company's home page, a simplified version of which is shown in FIG. 9. The web page includes images, text, text input boxes, buttons, and links to other web pages. The content processor scrapes text from, for example, text segments 902, 904, and 906, which include text that is related to the entity. The content processor then processes the text, for example, counting seven instances of the root "insur-", six instances of the word "car", five instances of words related to "home" ("nest", "nester", "coop", and two instances of "home"), two instances of the word "agent", and two instances of the word "quote" in text boxes 902-906. The predictive model then processes the text information from the content processor to determine that industrial classifications for The Hartford include auto insurance services and property insurance services, possibly among other identified industrial classifications.

Figure 10:
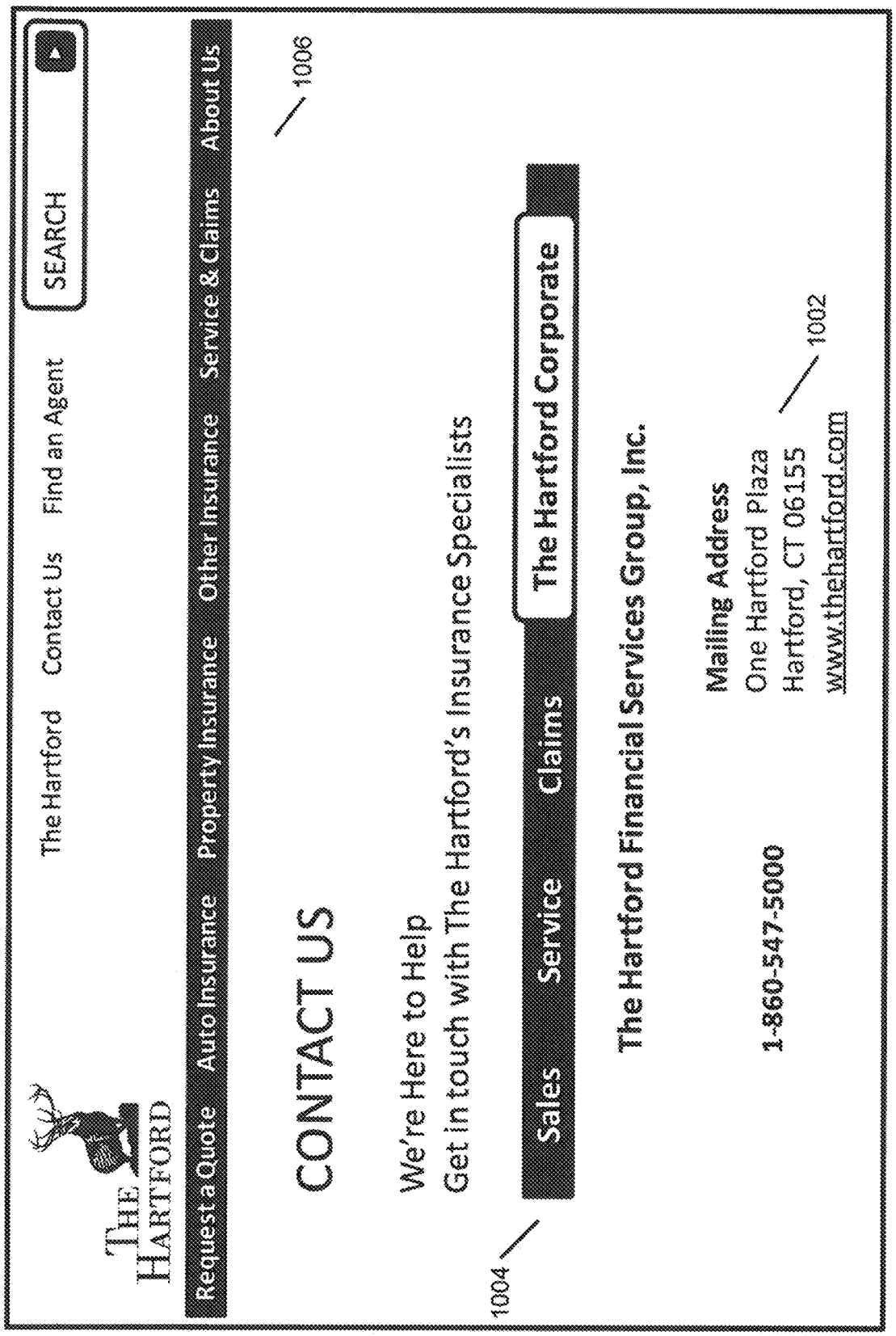
FIG. 10 is a simplified web page linked from the simplified web page of FIG. 9, illustrating another type of a web analyzed for determining the industrial classification of an entity, according to an illustrative embodiment of the invention.

The content processor may also be configured to follow the links from the homepage to find additional text and seek out additional information. As an example, the content processor may be configured to seek a location, such as an address of the corporate headquarters, of the entity. The content processor is configured to follow links with titles such as "Contact Us" or "Contact Information" to find an address for the entity. From the web page of FIG. 9, the content processor navigates to the "Contact Us" web page, a simplified version of which is shown in FIG. 10, using the "Contact Us" link 908 at the top of the web page of FIG. 9.

In the web page of FIG. 10, the content processor identifies that the lines of text below "Mailing Address" give the mailing address 1002 for the corporate headquarters of The Hartford Financial Services Group, Inc. The content processor may also scrape addresses for the Sales, Service, and Claims groups of The Hartford by navigating to these web pages using the tabs 1004. As described in relation to FIGS. 3 and 4, the content processor may continue to seek additional text or other information about the entity using the links in navigation bar 1006.

Figure 11:
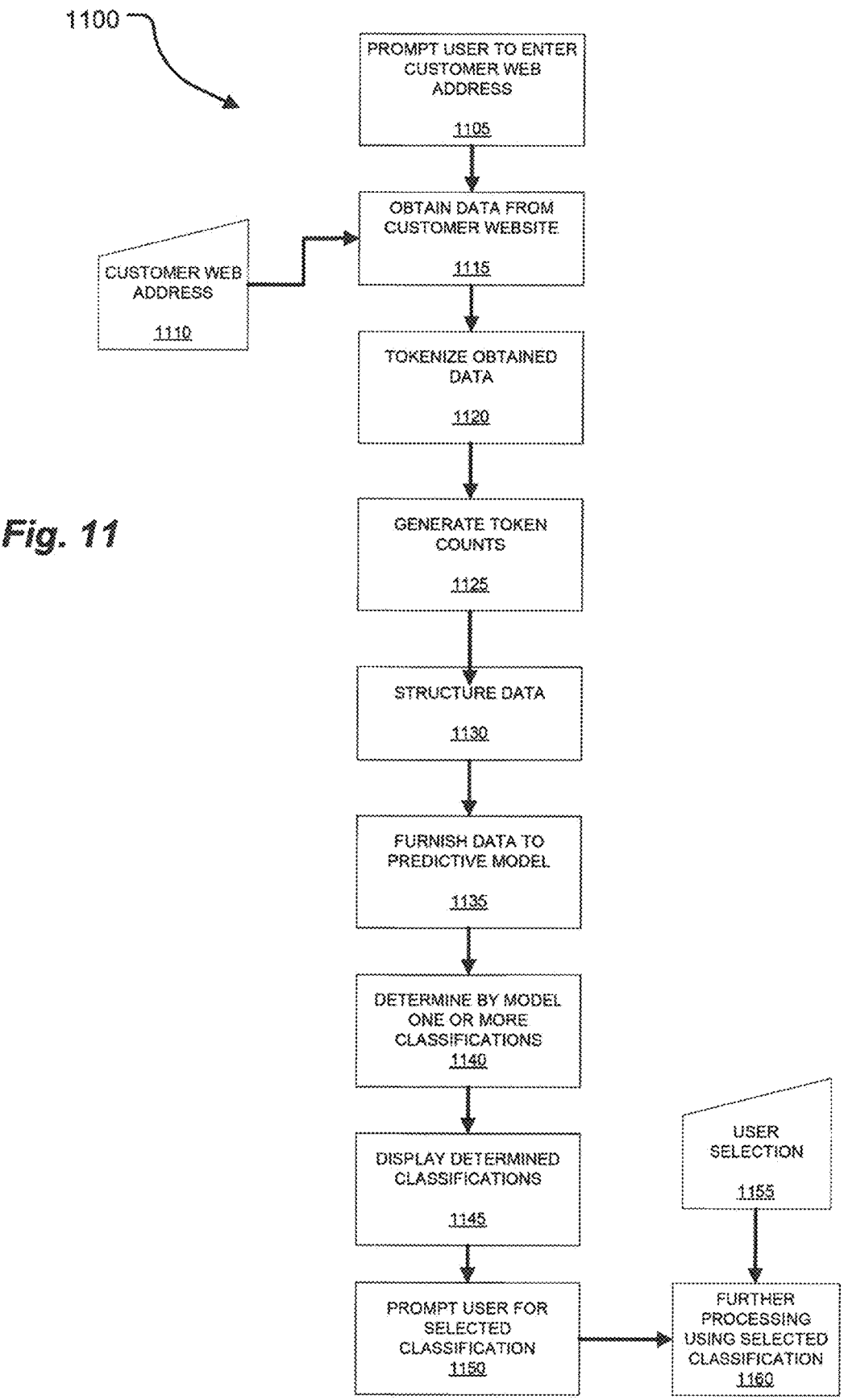
FIG. 11 is a process flow 1100 of an embodiment of a method of determining industrial classification of an entity.

Referring to FIG. 11, a process flow 1100 of an embodiment of a method of determining or verifying one or more likely industrial classifications of an entity is shown. A processor executing instructions in a software-implemented user front end prompts 1105 a user to input a website address of the customer. Responsive to receiving user input of the website address 1110, the processor causes data from the website corresponding to the web address to be obtained 1115. The obtained data may include data described in any embodiment, including data from a home page of the website and one or more additional levels, and may include only text, or text and additional data such as graphics data. The data may be tokenized 1120 employing suitable text extraction tools and techniques. The system may generate 1125 token counts from the tokenized website data. In embodiments, a listing of tokens, or words that are determined to have significance in determining industrial classification, may be employed. The obtained and processed website data, including token count data, may be structured as known in the text mining field 1130. The system may then furnish 1135 the structured data to the computerized predictive model for analysis. The model then determines 1140 one or more of the most likely industrial classifications for the customer. The computerized predictive model returns the one or more most likely industrial classifications, and may include a likelihood ranking on a numeric, verbal or graphic scale associated with each classification. The system causes the one or more industrial classifications to be displayed 1145 on the software-implemented user front end on a user-accessible device. In embodiments, the system may display two or more of the most likely industrial classifications and provide a prompt for a user to select a correct classification from the displayed classifications. The system may in an appropriate embodiment cause to display on a user interface on a user-accessible device a plurality of candidate classifications for the user, such as 2, 3, 4 or 5 candidates. The display may include likelihood ranking on a numeric, verbal, or graphic scale associated with the candidate classifications. The display may prompt 1150 the user to select one of the displayed candidate classifications via any available input scheme. The user-selected classification may be received 1155, and then provided 1160 to other systems, programs or processes, including without limitation business logic processes for determining insurance policy premiums, terms and conditions, by way of example, for further processing.

The system may be configured using software to display on a user device an option for a user to provide feedback based on the identified classifications. By way of example, the user may have an option to indicate that none of the identified candidate classifications are correct. Such a response may cause the system to store the comment for further processing for use in model development and analysis, prompt the system to commence a routine for interaction with the user to seek additional information, prompt a human user to contact the user, return the data to the model for further processing, or other actions.

Figure 12:
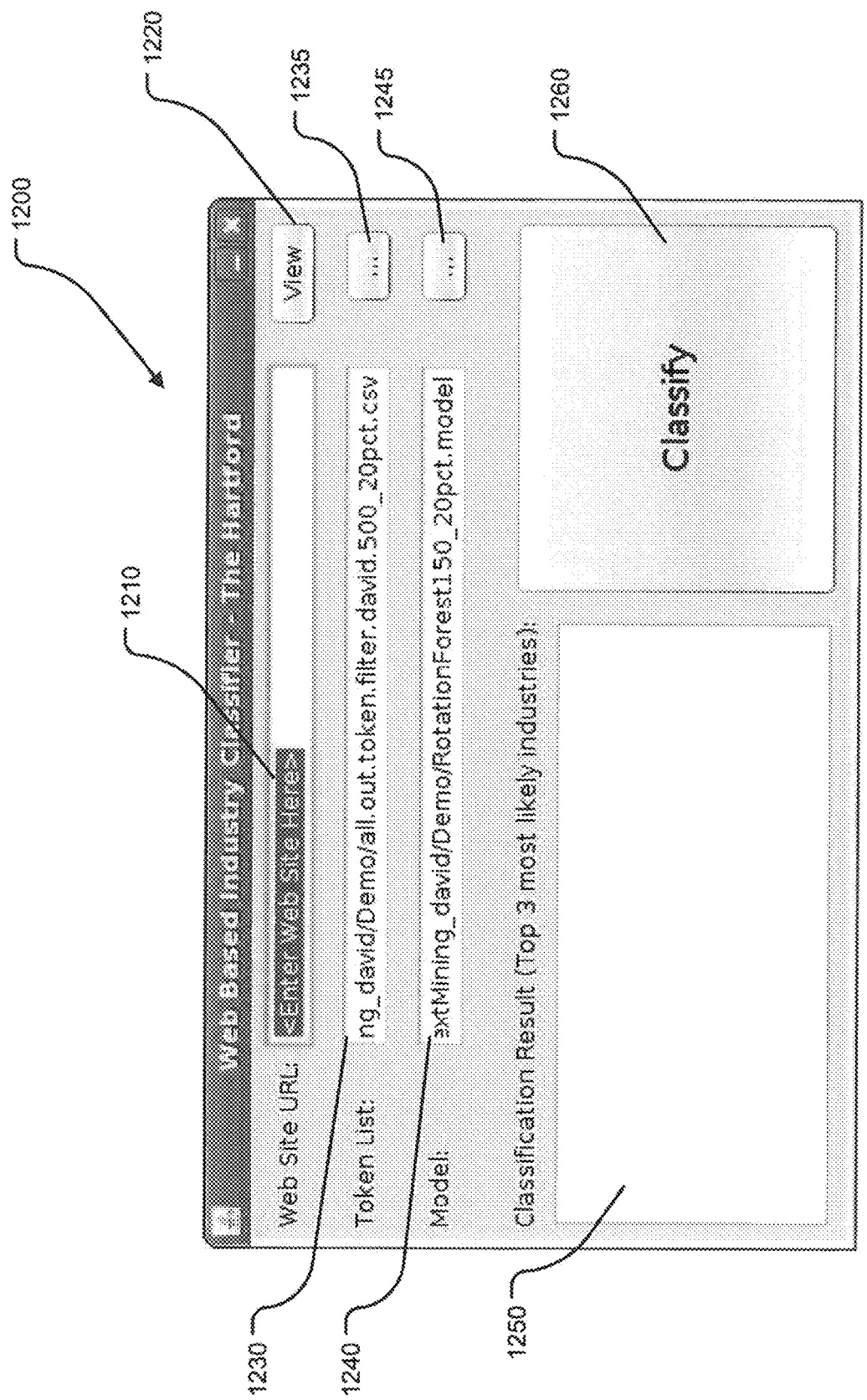
FIG. 12 shows a screen shot of a screen generated on a user device by a web-based industry classifier system.

Referring to FIG. 12, a screen shot of a screen generated on a user device by a web-based industry classifier system is shown. The web-based system may be accessible by insurance agents, entity representatives and insurance company personnel such as underwriters. In embodiments, the web-based system may only require that a user-accessible client device run a browser compatible with an insurance company or third-party provider webserver, which webserver may communicate with a system hardware server (or multiple servers) for performing data processing operations such as obtaining entity electronic resource data, tokenizing, generating token counts, structuring data, and applying a predictive model to structured data. Screen 1200 provides an input prompting a user to provide a website address for an entity 1210. An open website button 1220 causes the system to open a window displaying the target website. The screen 1200 further displays a path 1230 or other identification of a document having a list of tokens. In embodiments, an input (here, button 1235) may permit a user to browse for selection of an alternate list of tokens. Screen 1200 further displays a path or other identification of a statistical model 1240. In the displayed embodiment, the Rotation Forest statistical model is employed. The Rotation Forest statistical model is described, for example, in Rotation Forest: A New Classifier Ensemble Method, IEEE Transactions on Pattern Analysis and Machine intelligence, October 2006 (vol. 28 no. 10), pp. 1619-1630, by Juan J. Rodriguez, Ludmila I. Kuncheva, and Carlos J. Alonso (hereinafter "Rodriguez, et al."). Button 1245 permits a user to browse for and select an alternative statistical model. In embodiments, one or more of the displays and options for token lists and statistical models may be omitted. The browser based system is configured to receive a listing of most likely classifications from a statistical model and return those in window 1250. The user may then select one of the returned classifications, such as by using a pointing device or cursor to highlight one of the listed most likely classifications and selecting classify button 1260, which causes the browser to return the user selection to the system. In embodiments, confidence levels may be provided associated with the classifications. In embodiments, a percentage score summing to 100% may be provided, or a percentage score summing to a lower figure, may be provided.

In embodiments, the system may be configured to classify entities in one of the following list of industries:
  Food Processors
  Retail
  Metal Manufacturing
  Real Estate
  Educational Services
  Business and Personal Services
  Financial Services
  Technology Manufacturing
  Associations
  Printing and Publishing
  Construction
  Professional and Medical Offices
  Entertainment
  Cultural Organizations
  Technology In embodiments, the system may further classify entities into finer categories.

The classification results may be employed in business processes, executed, by way of example, by one or more business logic processors, including real-time underwriting and validation and fraud detection processes. It will be appreciated that such validation and fraud detection processes may be executed at any suitable time, including in connection with evaluation of claims.

An exemplary model may be built using approximately 20% of available data, such as 6500 websites out of over 30,000 available websites. More than one model may be implemented in a system, and a wide range of models may be implemented.

A best model based on testing has a perfect classification rate close to 70%.

Model building time increases as more data and more sophisticated models are used. LRO risk can affect model accuracy.

In demonstrations and testing, the following websites were tested and noted results achieved. In the small commercial category: A dental practice website was successfully classified in the industrial classification Professional and Medical Offices. A website of a service for recovery of lost data was successfully classified in the industrial classification Technology. A university was successfully classified in the industrial classification Education. A provider of dog training, grooming and boarding services was successfully classified in the industrial classification Business and Personal Service. A mortgage origination firm was successfully classified in the classification Financial Services. A provider of hazard and aviation obstruction lighting was classified in the classification Real Estate; this result may not be the best classification.

In the small commercial category, the system has provided classifications of Food Processors for a business that provides food products at the wholesale level, and Entertainment for a business providing audio products for use in enhancing cognitive performance; both of these results may not be the best classification.

In the large commercial category, embodiments of the system have successfully categorized a search services provider in the Technology industrial classification and an insurance company in the Financial industrial classification.

In embodiments, use of 20% of available data has achieved good results. Higher percentages of available data, such 50% or 100% of data may be employed.

In embodiments, greater numbers of keywords may be used, such as greater numbers of tokens. About 500 tokens has provided good results.

In embodiments, improved structured data before submission to the predictive model may be employed.

Computing time increases as data size and token size increase. For example, for an increase of data from 10% to 50% (5x) and an increase of keywords from 500 to 20,000 (40x), a roughly 200 times increase in complexity and possibly in computing time results.

In embodiments, more than one predictive model may be applied to entity data. The selection of the classification may be based on voting, weighting or other processes run on differing results provided by different predictive models on the same entity data. In embodiments, the predictive models may be applied iteratively to the entity data, or multiple iterations may be run using one or more predictive models, with processing between iterations including removing selected token data, restructuring the data, removing low probability industries or classifications from consideration, by way of example.

With more data, more tokens and more sophisticated models, and/or additional models, the accuracy will increase, but model building time may increase. Run time for real-time scoring will not be affected significantly once the one or more models are built.

In embodiments, error detection capabilities may be included in the system processing. By way of example, websites or other electronic resources with overall text content below a threshold, or providing token counts below a threshold, may be returned to the user as errors. The error detection processing may be implemented prior to tokenization, e.g., from comparing a character count to a threshold, after tokenization using a suitable threshold, using token counts, thus prior to submission to the one or more predictive models. The predictive models may also include error processing, such as providing a confidence value below a threshold as an error.

Figure 13:
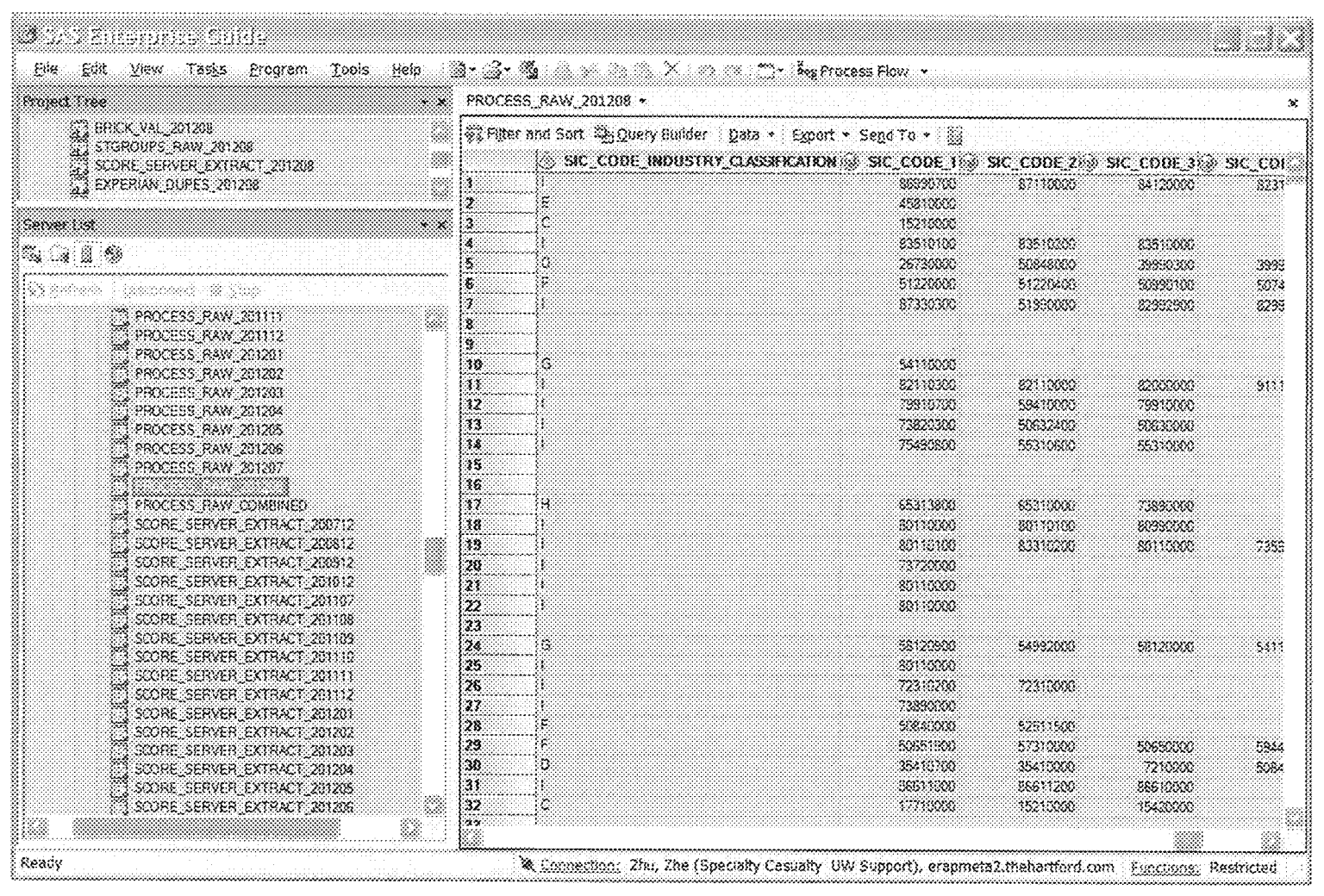

FIG. 13 shows an exemplary screen shot relating to Experian Brick Data, which provides over 40 million records with finer industry classification codes, which may be used for suitable purposes, such as model development and training.

Figure 14A:
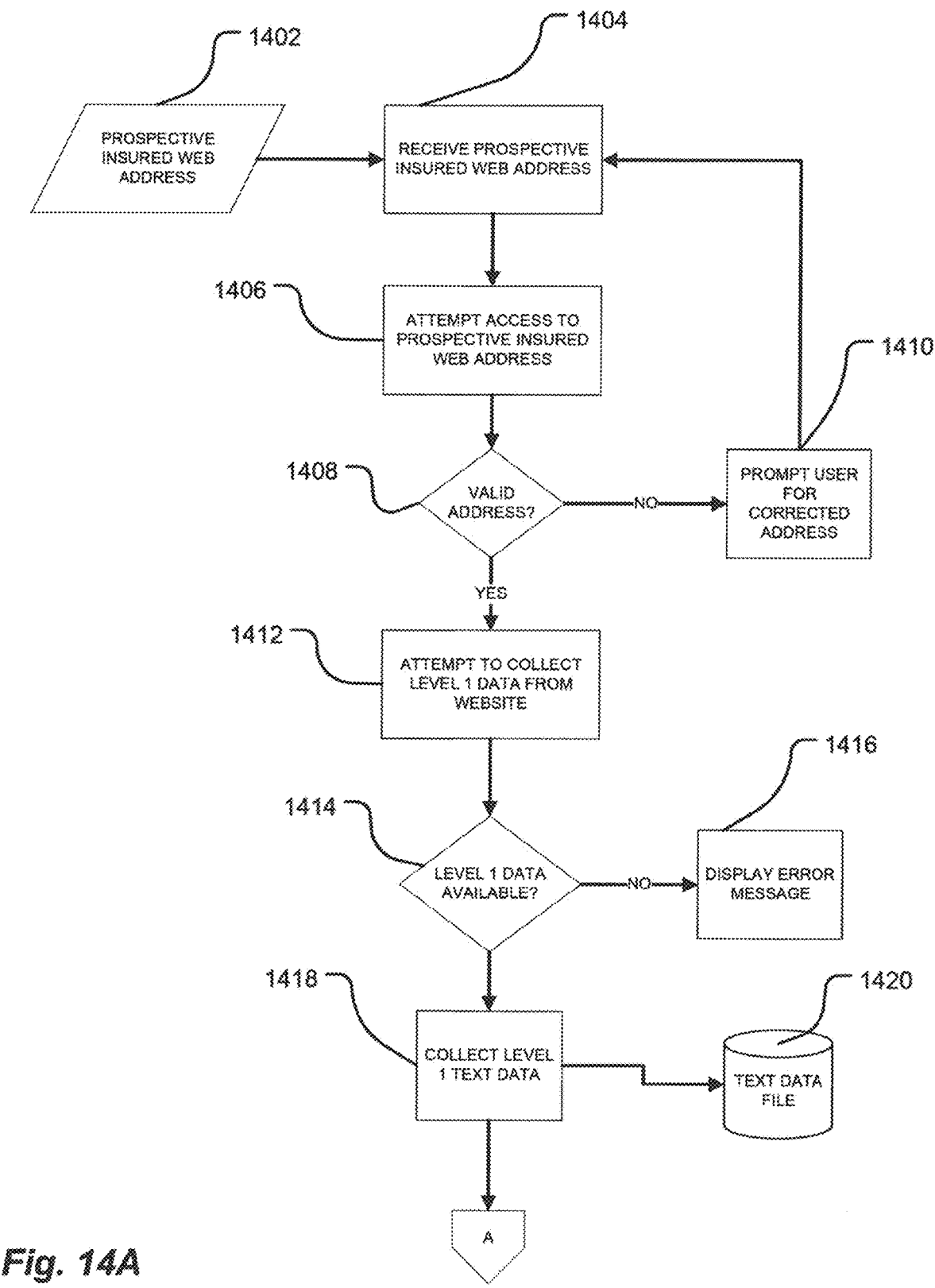
FIGS. 14A, 14B and 14C show an exemplary process flow of an embodiment of a method of determining industrial classification of an entity.
Figure 14B:
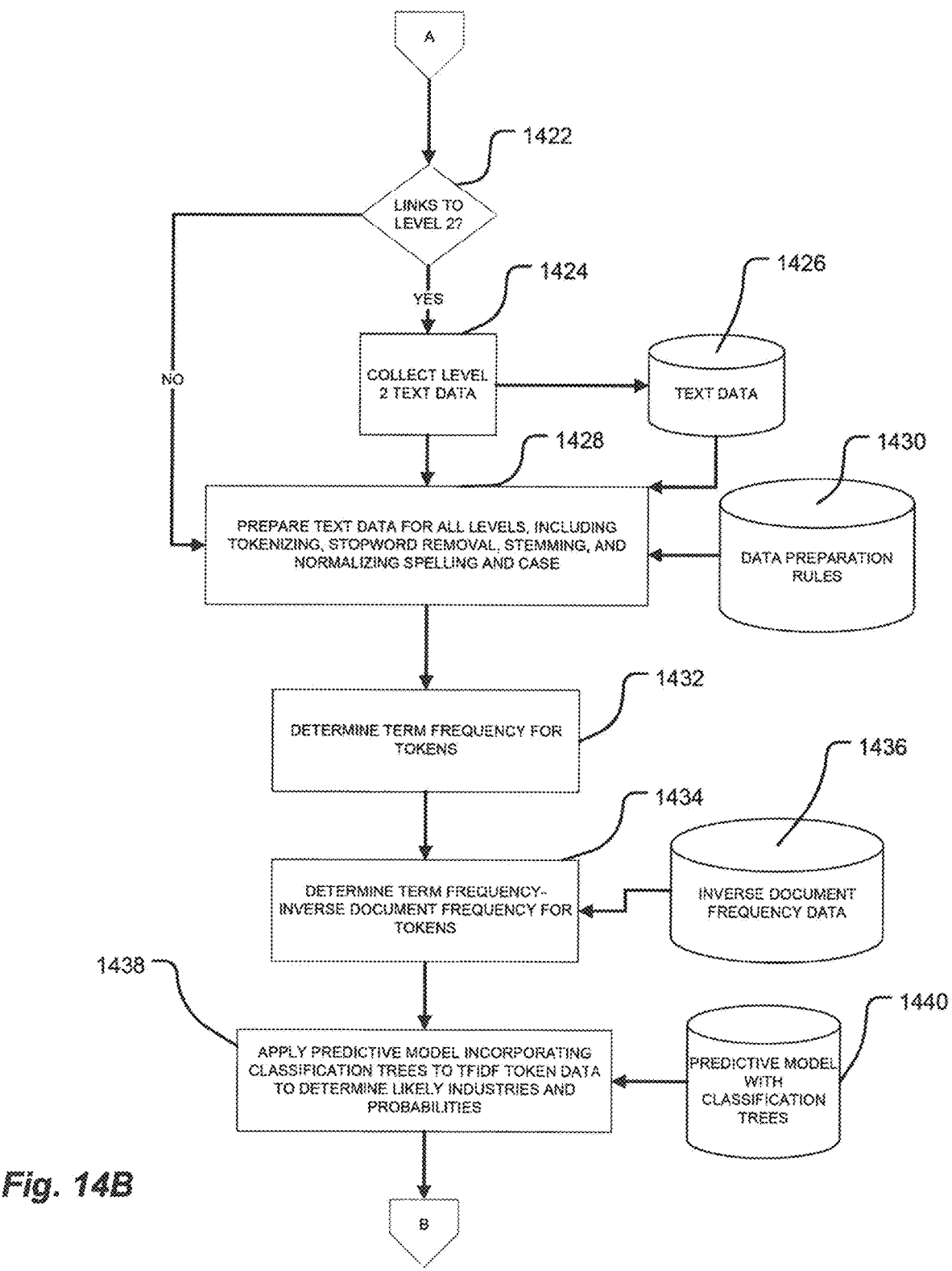
Figure 14C:
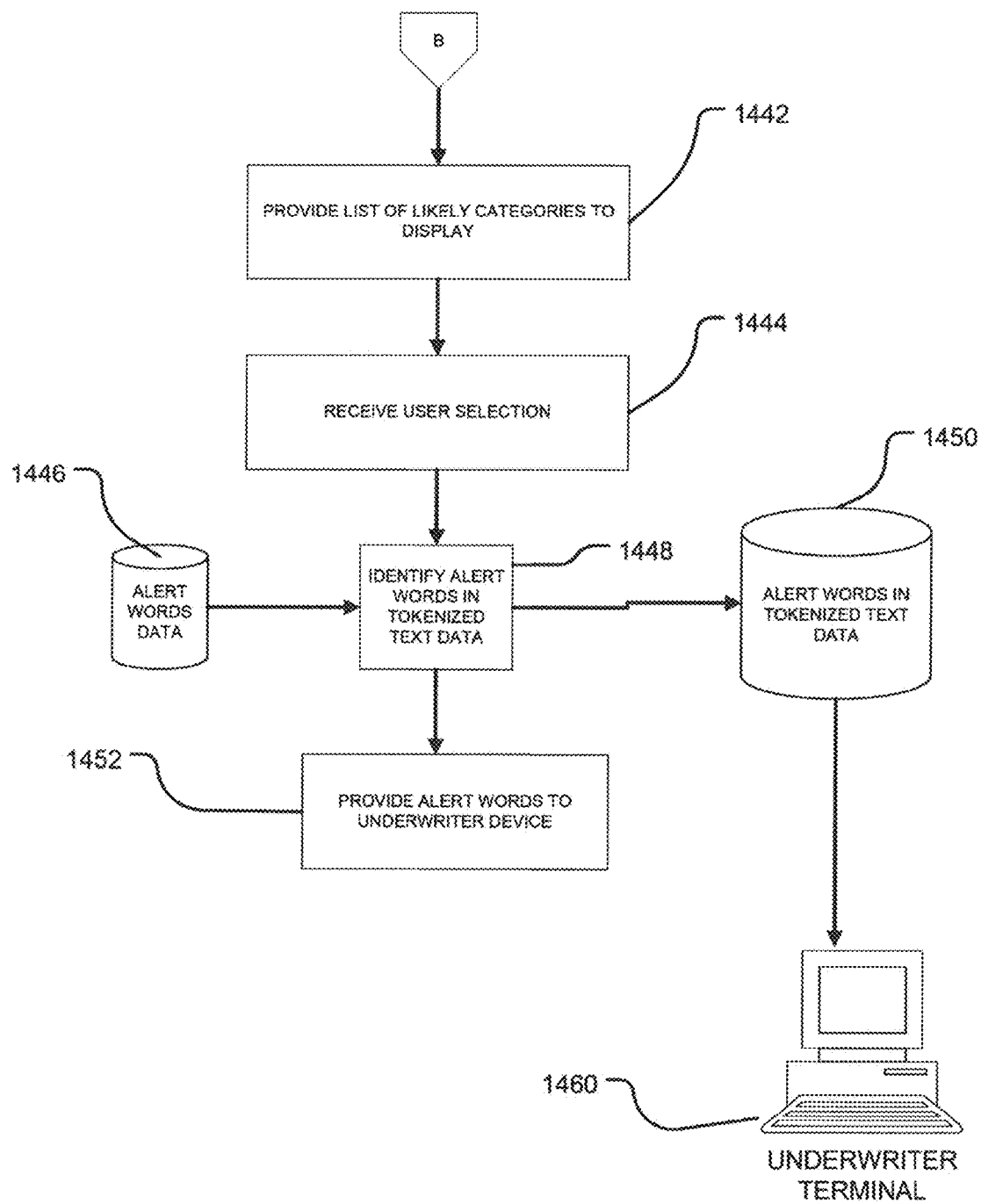

FIGS. 14A, 14B and 14C show an exemplary process flow of an embodiment of a method of determining industrial classification of an entity.

The process flow of FIGS. 14A, 14B and 14C may be performed by a suitable computer system such as the system described above with reference to FIGS. 1 and 2. In an initial step, data indicative of a website address 1402 of a prospective insured entity is received 1404. The data indicative of a website address may be a web address, or uniform resource locator (URL). In embodiments, the data may be indicative of content provided by the proposed insured in a social network, such as an address on any of the FACEBOOK, TWITTER, GOOGLE+, MYSPACE or other social networks. In embodiments, data relating to the insured entity may be obtained from any third-party data source. The third-party data sources may include in embodiments data from advertising sources, such as yellowpages.com, services providing ratings, such as Angie's List and Yelp, and other sources.

The system then attempts 1406 access to the provided prospective insured web address. The system may employ any suitable web scraping software for this purpose. This portion of the process flow may be performed by a web server distinct from a system processor. The web server may access and return to a system processor data extracted from the provided address. The system determines whether the provided address is valid. For example, there may be no content corresponding to the provided address. If the system determines that the address is not valid 1408, the process flow may proceed to a step of prompting 1410 the user for a corrected address. By way of example, the system may be configured to display indicating that the address is not valid and requesting entry of a corrected address, on a user screen display.

If the address is determined to be valid, the system may attempt 1412 to collect level 1 data from the website. This may be implemented by a web server executing web scraping or web crawling software. Level 1 data is data on a first level of a website, or a website home page or landing page. The system may evaluate whether level 1 data is available 1414, or whether sufficient data is available. For example, if the system is configured to collect only text data, and there is no more than a threshold minimum number of words of text data in Level 1, the system may display 1416 an error message indicating that the website does not have sufficient available Level 1 data available. In embodiments, the process flow may end at this point. In other embodiments, the process flow may continue with a prompt for alternative address information, for example. Similarly, if the system is configured to collect and convert to text static image data as well as text data, but the landing page of the website features data in video format, the system may be configured to provide an error message. In embodiments, the system may be configured to access static image data and video data as well as text data.

In an embodiment, if the system determines that accessing the website or other electronic resource is blocked by prohibitions on web crawling software, the system may proceed to check for user consent to website review. If consent has been obtained, then the system may proceed. If consent has not been obtained, then the system may generate a display of a consent screen having click or check approval of a consent for use of a webcrawler.

If the system determines that there is at least a threshold number of words in the level 1 data, the system proceeds with collection 1418 of the text data. The text data may be stored as at 1420 in a text data file in a data storage device. The text data may be stored without analysis in a file format including character data as obtained from the website, thereby preserving spacing and punctuation mark data as well as character data. The system may be configured to convert text data stored in image files, extracted from static image data, video, or both, to text using optical character recognition algorithms by way of example, and incorporate such converted text data as shown at 1420. In embodiments, the system may be configured to analyze sound files, using speech recognition algorithms, by way of example, and extract text data from such sound files and incorporate such extracted sound file data with text data at 1420.

Referring to FIG. 14B, the system may review 1422 the Level 1 data for links to Level 2 data. Level 2 data is the next level of web pages that are linked directly to a home page or landing page. A suitable algorithm may be employed to identify links to pages that are part of the same website maintained by the proposed insured, based on wording in the address, for example, as distinguished from links to websites not maintained by the proposed insured. If one or more Level 2 pages are identified, then the system may proceed to access and scrape text data 1424 from the Level 2 pages. Text data from Level 2 pages may be stored in a data storage device 1426 with text data from Level 1 or separately. In embodiments, more levels of the website may be accessed and the text data scraped. For example, if the number of words obtained from Level 1 and Level 2 combined is below a threshold value, then the system may access a third level of the website. In embodiments, other electronic resources, such as social media pages maintained by the proposed insured may be similarly accessed, and the system may extract text data from those other electronic resources. For example, social media addresses may be displayed on an entity website, and may be accessed from the entity website. Social media page data as well as social media feed data may be accessed. As social media feed data may be more current than website data, social media feed data may be more heavily weighted, such as by applying multipliers to token counts related to social media feed data. More recent social media feed data may be indicative of changing business areas and new risks associated with the business entity. Exemplary social media sites that may be accessed include Twitter, Facebook, Instagram and Google+.

The system may access data preparation rules 1430 and apply data preparation rules 1428 to all levels of the obtained data. The data preparation rules may include rules for tokenizing the data into individual words called tokens. "Tokenizing" refers to process of breaking a stream of text up into words, phrases, symbols, or other meaningful elements called tokens. In embodiments, tokenizing may break the text into individual words, but the tokens may include phrases or other meaningful elements in embodiments. Graphical data may be broken into tokens such as symbols and patterns recognized as particular types of images, such as images corresponding to types of products, equipment, devices and the like. Suitable image-recognition algorithms may be implemented in software for identification of items in images; the identified terms recognized by image recognition algorithms may be tokenized in the same manner as text data, by way of example.

The rules for tokenizing text may include rules that identify character strings bounded by spaces or punctuation as tokens. The tokenized data may be stored as a set of tokens. The data preparation rules may further include rules for stemming. Stemming may include modifying all words or tokens to a single part of speech, such as by removing endings such as the letter "s" and the letter strings "ing" and "ed" at the end of the words. The data preparation rules may further include rules for spelling normalization. The words may be checked against a database of words and changed to a nearest word as part of the normalization process. The rules may include capitalization normalization rules, so that any capital letters are consistently converted to lower case letters. The data preparation rules may include stop word removal rules. Stop words may be stored in a database and include words very commonly used but having little predictive value, such as conjunctions, such as "and," "but" and "or," and articles such as "the", "a" and "an." All stop words may be removed from the text data.

The resulting text data may be referred to as a tokenized data set. The system may determine 1432 term frequency for the tokens. The term frequency determination may include a count of the number of occurrences of each term in the tokenized data set. The system may then store in a file an association between each detected token and the number of occurrences of each token. This file represents the term frequency of the data.

The system may then access inverse document frequency data 1436. Inverse document frequency (IDF) data 1436 includes for each of a large number of words that may be used in websites, a value that reflects the frequency of use of the word in websites in general. Words that are frequently used in websites of different types of businesses have little predictive value and thus are weighted lower in determination of business type. For example, the term "copyright" appears in a very high percentage of websites, and thus has a low value. In an embodiment, the IDF for a term may be determined by log(total number of documents/number of documents containing the term). By way of example, for a term appearing 1000 times in a database of 10 million documents, the IDF=log(10,000,000/1,000)=4. Thus, for this relatively rarely appearing term, the term frequency value is multiplied by 4.

Each token that has a corresponding inverse document frequency value has a value assigned 1434 by multiplication of its term frequency by inverse document frequency to obtain a term frequency-inverse document frequency value (TFIDF) for each such token. The set of tokens and TFIDF values is stored in a file.

In embodiments, tokens generated based on image data and video data may be generated, and corresponding term frequency-inverse document frequency values obtained for such tokens. As discussed, such tokens may be based on image recognition algorithms to identify symbols, devices, equipment, clothing, characteristics of individuals, and other data. By way of non-limiting example, image recognition algorithms may identify images of vehicles on a web page of an appliance retailer; such identification data may be tokenized and processed to increase a likelihood that the appliance retailer has a delivery service in addition to a retail business. By way of further non-limiting example, image recognition technology may identify images of tractor-trailers on a web page of an entity stated to be a local delivery service; such image data may be tokenized and processed to increase a likelihood that the entity also provides long-distance hauling services. Similarly, images of vans and small trucks on an electronic resource of an entity stated to be a long-distance hauling service may be tokenized and processed to increase a likelihood that the entity also provides local delivery services.

The system then accesses a predictive model using classification trees 1440 stored in a memory storage device. The predictive model may use using the rotation forest technique or a predictive model using a modified version of classification trees. In some embodiments, because classification trees only split on one variable at each split in the tree, while in embodiments, the rotation forest technique uses a linear combination of variables at each splitting point. The predictive model is then applied 1438 to the TFIDF values and corresponding tokens. In embodiments, a predictive model employing classification trees may be applied to the TFIDF data to obtain a ranked listing of industrial classifications and associated probabilities that the classifications are accurate.

Figure 21:
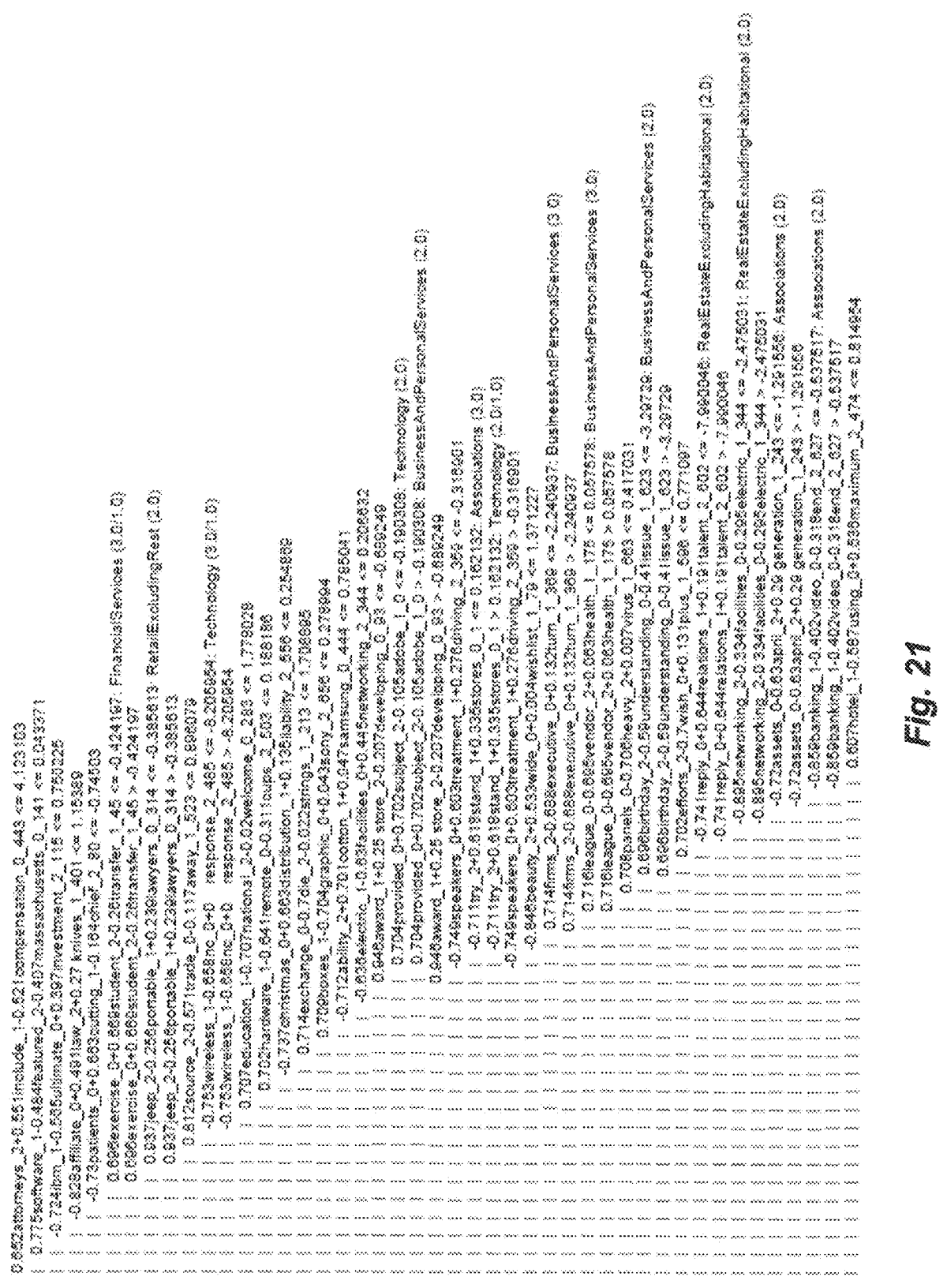

A predictive model incorporating classification trees may be accessed from memory by a system processor and applied to the TFIDF table. Classification trees include nodes connected by branches in a spreading pattern. Each node may define a binary rule for proceeding to one of two next nodes depending on a TFIDF value for a given term. Terminal nodes define two or more classifications and a confidence value associated with each classification. A predictive model of this type may have thousands of trees having in total tens of thousands or hundreds of thousands of terminal nodes. An example of a portion of a classification tree is shown in FIG. 21. Terms subject to rules and values of exemplary nodes are shown. Each token in a document that corresponds to a term in the predictive model contributes to the classification determination. The processing of each token by the classification trees is dependent on the associated TFIDF value. Thus, for two different websites, each having the same set of tokens, different classification results may be obtained from different token counts resulting in different TFIDF values operated on by the predictive model.

In the predictive model, each token and associated TFIDF value is processed through one or more trees, and the processing continues until a terminal node is reached. The results of the terminal nodes are then combined in a suitable manner to obtain a final listing of classifications and associated likelihoods.

An output of the system processor executing the predictive model includes two or more classifications and a probability value for each. The data may be provided to a web server for rendering a web page for display on a user device, such as an agent or potential customer device. The web page may display 1442 first data including the two classifications, or more than two classifications, along with second data including the associated determined probabilities of the classifications. The web page may be configured to prompt the user to select one of the classifications. The web page may be configured to provide help text to assist the user in determining a proper classification. For example, the web page may be configured to, upon a pointer device being positioned over a classification, provide a popup box or other text box with text providing more information and examples to assist in the selection of a proper classification. Examples may include text providing, for a listed classification, examples of specific businesses that are properly classified in that classification.

Upon user selection 1444 of the classification, the selection data may be provided to further insurance company processing systems. For example, entity data may be provided to an underwriter terminal or a rating system for determination of a premium. An entity file may be provided with data including address and other data.

In embodiments, if the highest likelihood or confidence level falls below a threshold, the system may attempt to access further website levels or further electronic resources, such as seeking additional social media sites, associated with the entity. Upon identification of such additional levels or electronic resources, the process of obtaining text data, tokenizing, determining the TFIDF values, and application of the predictive model, may be repeated incorporating the additional data. Alternatively, the user may be prompted to provide the classification.

The system may further be configured to apply a list of insurance risk alert words or terms 1446 to the tokenized list of terms extracted from the entity website. The insurance risk alert terms may be terms that are selected as representing insurance risk and thus a likelihood of additional underwriting review being required. The insurance risk alert terms may include terms other than tokens employed in the predictive model, or terms overlapping with the predictive model. Insurance risk alert terms may include individual words and phrases. In embodiments, insurance risk alert terms may include image recognition data, such as image recognition of radiation hazard symbols, by way of non-limiting example. Identified alert terms may be stored 1450 in a file and made accessible 1452 to an underwriter terminal 1460 or otherwise accessible to an underwriting system. The alert terms may be provided in a listing having an order based on a risk weighting, frequency rating and combinations thereof. For example, certain insurance risk alert terms, such as "asbestos" and "isotope" may be given a high risk weighting and hence provided near a top of a list of insurance risk alert terms.

In embodiments, address and other data verification may be employed using data obtained from the prospective insured website. For example, an address may be identified in the text of the website, and compared to a stored address. Address data may also be employed for verification of number of sites.

Other data extracted from the website may be analyzed for determining inaccuracy or fraud in submitted data. For example, text data may be analyzed for indications of numbers of employees, period of time in business, and other data, and compared to data input by or on behalf of the proposed insured. Discrepancies may be identified in the comparison and analysis using suitable algorithms, and provided to an underwriter terminal as a fraud warning or fraud alert message or otherwise incorporated into the insurance evaluation. For example, a fraud risk may be incorporated into a premium pricing determination by increasing a premium price, or in a term of coverage determination, by reducing a term otherwise available.

Figure 15:
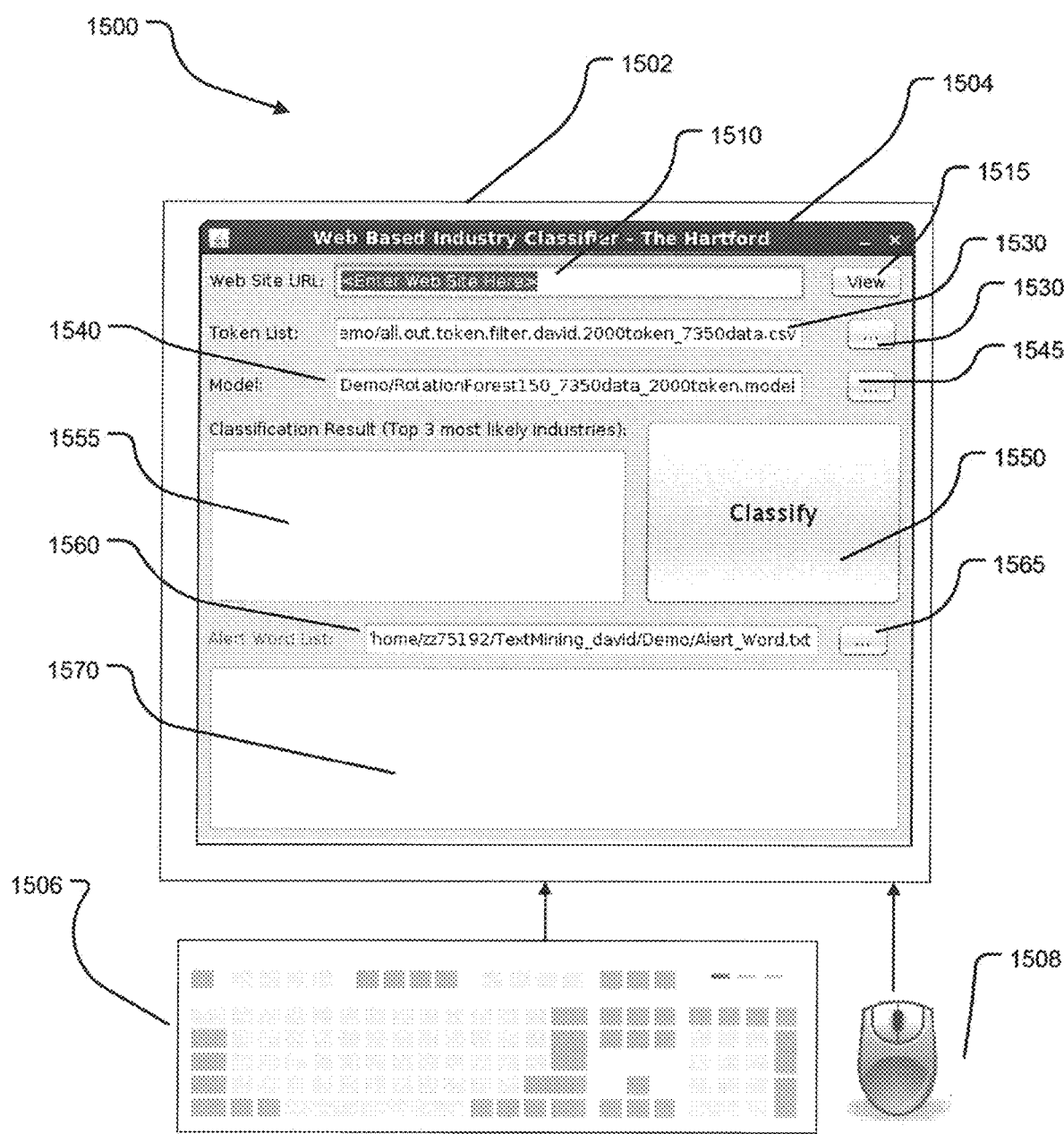
FIG. 15 shows a user device displaying a screen shot of a web interface generated by a web-based industry classifier system is shown.

Referring to FIG. 15, a user device displaying a screen shot of a web interface generated by a web-based industry classifier system is shown. The user device 1500 may be a user device of an insurance agent, an owner or other representative of an entity that is applying for insurance, or of an insurance company employee or contractors, such as an underwriter. The user device 1500 may be in communication with a web server system that generates the illustrated display, and, further in communication via the web server system with a system for determining entity classification based on obtaining entity electronic resource data, data preparation including tokenizing text data, removing stop data, generating token counts, applying token frequency data to token count data, and applying a predictive model to the token count data. The illustrated screen may be entirely browser based, or may be generated by one or more of a browser plug-in downloaded to the user device and executing together with client-side browser software, a stand-alone application downloaded or otherwise installed on the user device and executing on one or more processors of the user device. Display device 1502 shows screen 1504. Screen 1504 provides a prompt for a user to input via text input a website address for an entity 1510. User device 1500 has one or more user input devices, which in this illustration include physical keyboard 1506 and mouse 1508, but may include in embodiments any other input devices such as touch screens.

Figure 16:
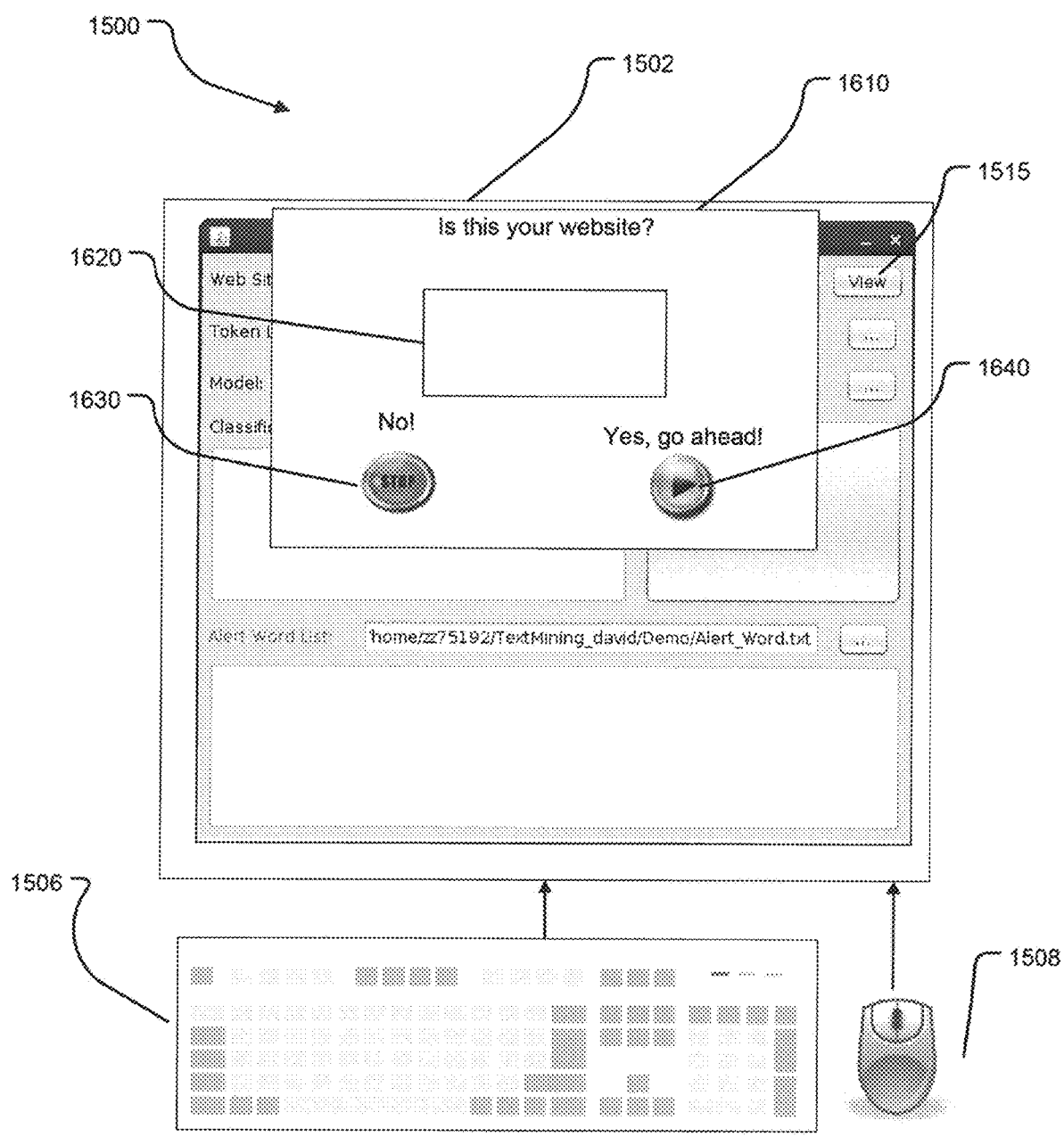
FIG. 16 shows the user device of FIG. 15 displaying an image of a selected entity website.

Screen 1504 includes a view button 1515. User selection of the view button 1515 serves as an instruction to the system to cause the client side browser or application to access the website at the entered address, and display the website, such as in a separate tab or window. In an embodiment, as shown in FIG. 16, the system is configured such that user selection of view button 1515 causes the system to overlay an image of the selected website along with a prompt to a user to indicate either that the image represents the user's website or does not represent the user's website. By way of example, as shown in FIG. 16, the system may be configured to provide a popup box over the 1610 over the screen display, the popup box 1610 including a box 1620 for display of the retrieved website. The popup box 1610 may further include a user option or button 1630 to indicate that the website is not the entity's website. Selection of user option 1630 may cause the redisplay of the screen of FIG. 15, to permit the user to correct the URL data. The popup box may include a user option or button 1640 to confirm that the website displayed in box 1620 is the entity's website. Selection of button 1640 causes the system to proceed with the process of accessing website data and determining classifications.

In embodiments, the system may be configured to, upon accessing a second level of a website, provide a display analogous to popup box 1610 to display at least a first image of the accessed second level screen and provide user options to confirm or deny that the displayed second level screen is part of the user's website. By way of example, the system may incorrectly identify a third-party website linked from a home page as part of the user's website. Data indicative of a denial may be provided to an underwriter or used to increase a fraud risk value associated with the entity; for example, a denial may in fact be associated with a location or business operation that the entity is attempting to conceal from the insurer. Similarly, an image from a third-party website or other resource, such as a review or advertising website, may be presented to the user for verification that the advertisement or reviews relate to the entity. In embodiments, two or more images from a second level screen, third-party website or other electronic resources may be displayed along with user options to confirm or deny that the displayed image relates to the entity.

The screen 1504 further displays a path 1530 or other identification of a document having a list of tokens. In embodiments, an input (here, button 1535) may permit a user to browse for selection of an alternate list of tokens. Such an option may be available in embodiments in which multiple token lists have been developed for application to entities having differing features other than classification. These features may include geographic location such as by state, region or city; entity size, by number of employees, revenue in a monthly period; and other factors. In embodiments, token list selection may be available only to a selected class of users, such as insurance company personnel, while other classes, such as entity representatives and agents, may not be able to select a token list.

Screen 1504 further displays a path or other identification of a statistical model 1540. In the displayed embodiment, the Rotation Forest statistical model is employed. Button 1545 permits a user to browse for and select an alternative statistical model. In embodiments, one or more of the displays and options for token lists and statistical models may be omitted.

Screen 1504 provides a user selection 1550, here a button labeled "classify," to permit the user to provide an instruction for the system to commence the process of accessing and analyzing entity website data to provide classifications. Screen 1504 is provided with an area 1555 for display of the determined classifications and their associated probabilities. Screen 1504 further displays at 1560 a path or other designation of a listing of insurance risk alert words to be applied to the website. Insurance risk alert words include terms that are selected for likelihood of additional underwriting review being required. In embodiments, a user may be provided with a selection of different listings of alert words. For example, multiple alert word lists may have been developed for application to entities having different characteristics, such as geographic location, entity size and other factors. Button 1565 may provide the user a selection of one of multiple such alert word lists. The user option for selection of alert word lists may be omitted in embodiments. Screen 1504 provides area 1570 for display of system-identified alert words to the user.

Figure 17:
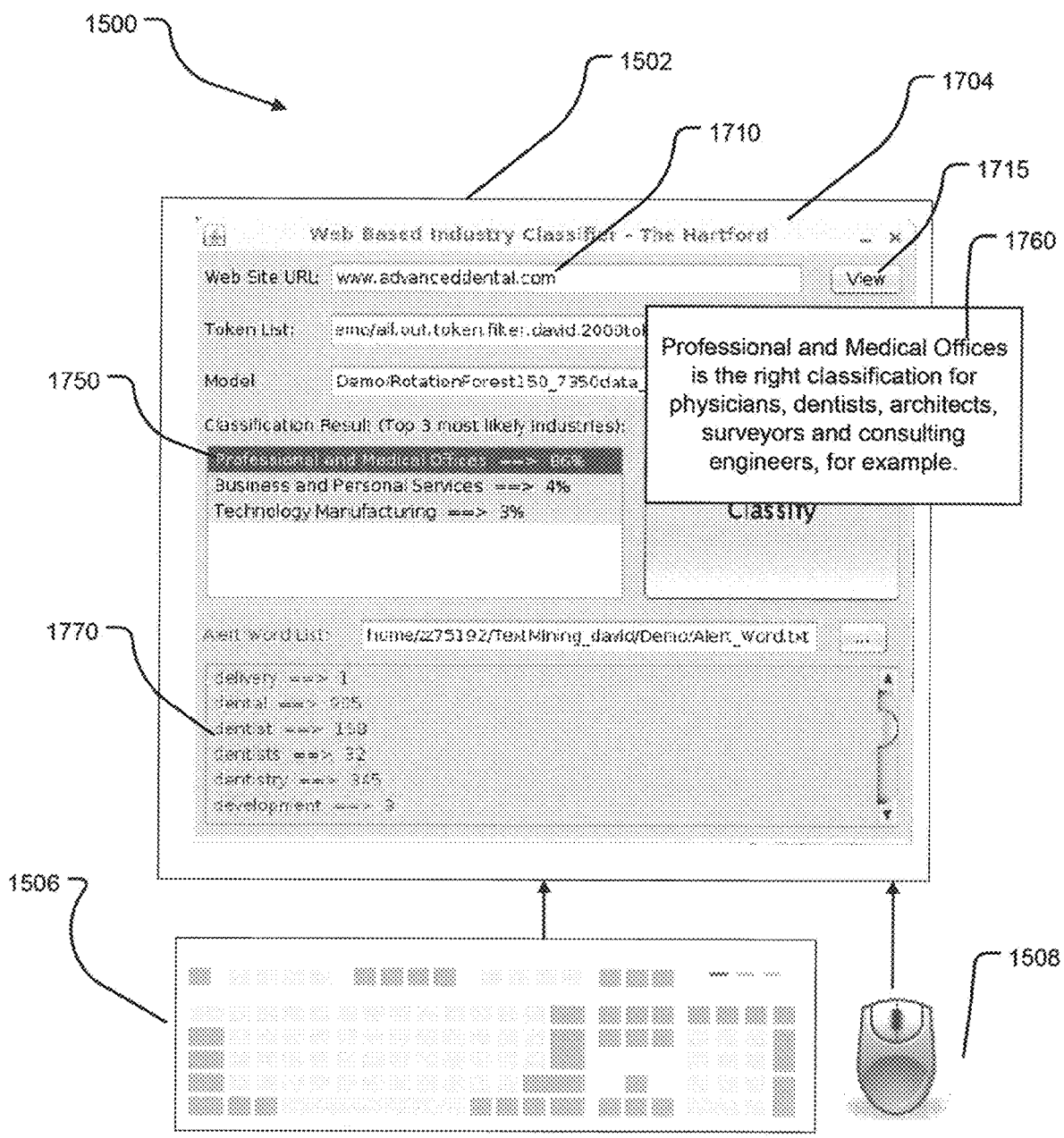
FIG. 17 shows the user device of FIG. 15 displaying a result of a web-based industry classifier system.

Referring now to FIG. 17, screen 1704 is shown displayed on display 1502 of user device 1500 after completion of determination of classifications. Screen 1704 includes on display area 1750 a listing of identified classifications and associated likelihoods, ranked in descending order of likelihood. In embodiments, more or fewer classifications may be provided, and alternative display arrangements may be provided. The system may generate popup box 1760 having explanatory text relating to one or more of the listed classifications, including text such as examples to assist in selection of a correct classification. Screen 1704 further displays in area 1770 identified alert words. Each alert word is identified with an identified number of occurrences. The alert word data is provided to an underwriting system or an underwriter for further analysis. The underwriting system may include a business logic processor configured to make an insurance evaluation of the entity. The insurance evaluation may include one or more of determining a premium, determining insurability, determining available coverages, determining coverages for recommendation or suggestion, determining a rating, and other insurance evaluations.

Figures 18, 20:
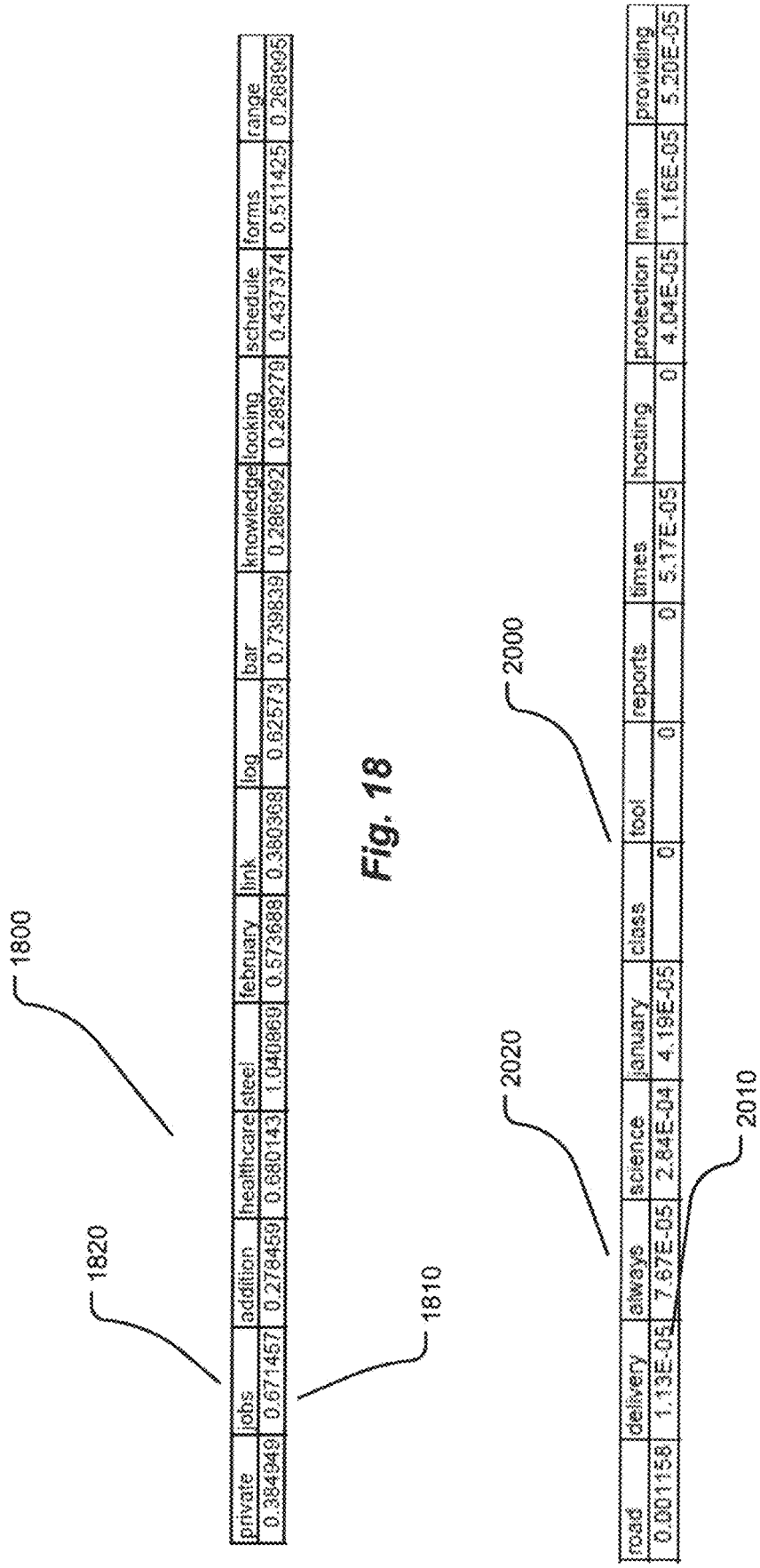
FIG. 18 shows an excerpt of a data table associating inverse document frequency values with tokens in a web-based industry classifier system.
FIG. 20 shows an excerpt of a data table associating token frequency inverse document frequency values for tokens extracted from an entity website.

Examples of data structures employed in the analysis of business websites will now be provided. Referring to FIG. 18, an excerpt of a data table 1800 is shown indicating inverse document frequency values in row 1810 associated with tokens in row 1820. As discussed above, the inverse document frequency values are applied to token frequency values to generate an input table for the predictive model. As can be seen in FIG. 18, the value associated with the term "looking" is relatively low, while the value associated with the term "steel" is relatively high.

Figure 19:
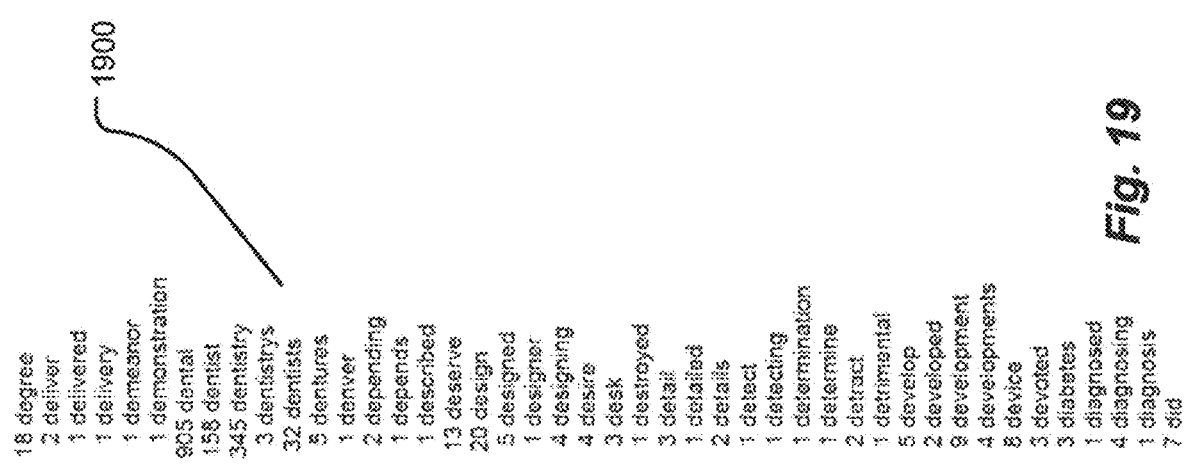

Referring to FIG. 19, an example of an excerpt of a token count 1900 from a website for a dentist's office. As may be seen, tokens relating to dentist and dentistry have very high counts.

Referring to FIG. 20, an excerpt of a data table 2000 is shown indicating exemplary token frequency-inverse document frequency values for a business. Tokens are shown in row 2020, and the values in row 2010. Certain of the tokens identified in the entity website were not identified in the inverse document frequency table and have been assigned a value of 0. Those tokens are not used by the predictive model. Other tokens have been assigned values based on their token counts and inverse document frequency values.

By way of example, the token "private" is identified in an entity website as occurring 5 times. The entity website has 37789 tokens. Accordingly, the token frequency for the term private is given by:

$$TF=5/37789=0.00013231363$$

The corresponding inverse document frequency value for the term "private" is taken from a table, such as that shown in FIG. 18, as 0.384949046682873. Accordingly, the TFIDF value for the token "private" is given by:

$$0.00013231363*0.384949046682873=0.000050934$$

The predictive model may be implemented using the rotation forest approach, as noted above. In an embodiment, the rotation forest predictive model may be built using one or more of the tools available from Waikato Environment for Knowledge Analysis (WEKA) suite of machine learning tools. These tools may be accessed at http://www.cs.waikato.ac.nz/ml/weka/. The pseudocode disclosed in Rodriguez, et al., may be employed, by way of example, in the training phase and classification phase of the rotation forest predictive model. Broadly, the rotation forest technique combines principal component analysis (PCA) with classification trees. PCA provides for orthogonal transformation to convert a set of possibly correlated variables into a set of values of linearly uncorrelated variables. Classification trees are then applied to the transformed data.

In an embodiment, 150 J48 trees (i.e. classification trees) from WEKA may be used. An example of a WEKA scheme is: weka.classifiers.meta.RotationForest-G 3-H 3-P 50-F "weka.filters.unsupervised.attribute.PrincipalComponents-R 1.0-A 5-M-1"-S 1-num-slots 40-I 150-W weka.classifiers.trees.J48 - - - C 0.25-M 2. The resulting trees provide a large number of possible paths for each token and associated TFIDF value. The trees terminate in terminal nodes having industrial classifications and associated probability values.

Referring to FIG. 21, an example of a portion of a classification tree is shown. Coefficients associated with particular tokens may be seen, as well as values related to determining classifications and likelihoods.

The generation of a predictive model may use data based on up to 20,000 tokens.

Figure 22:
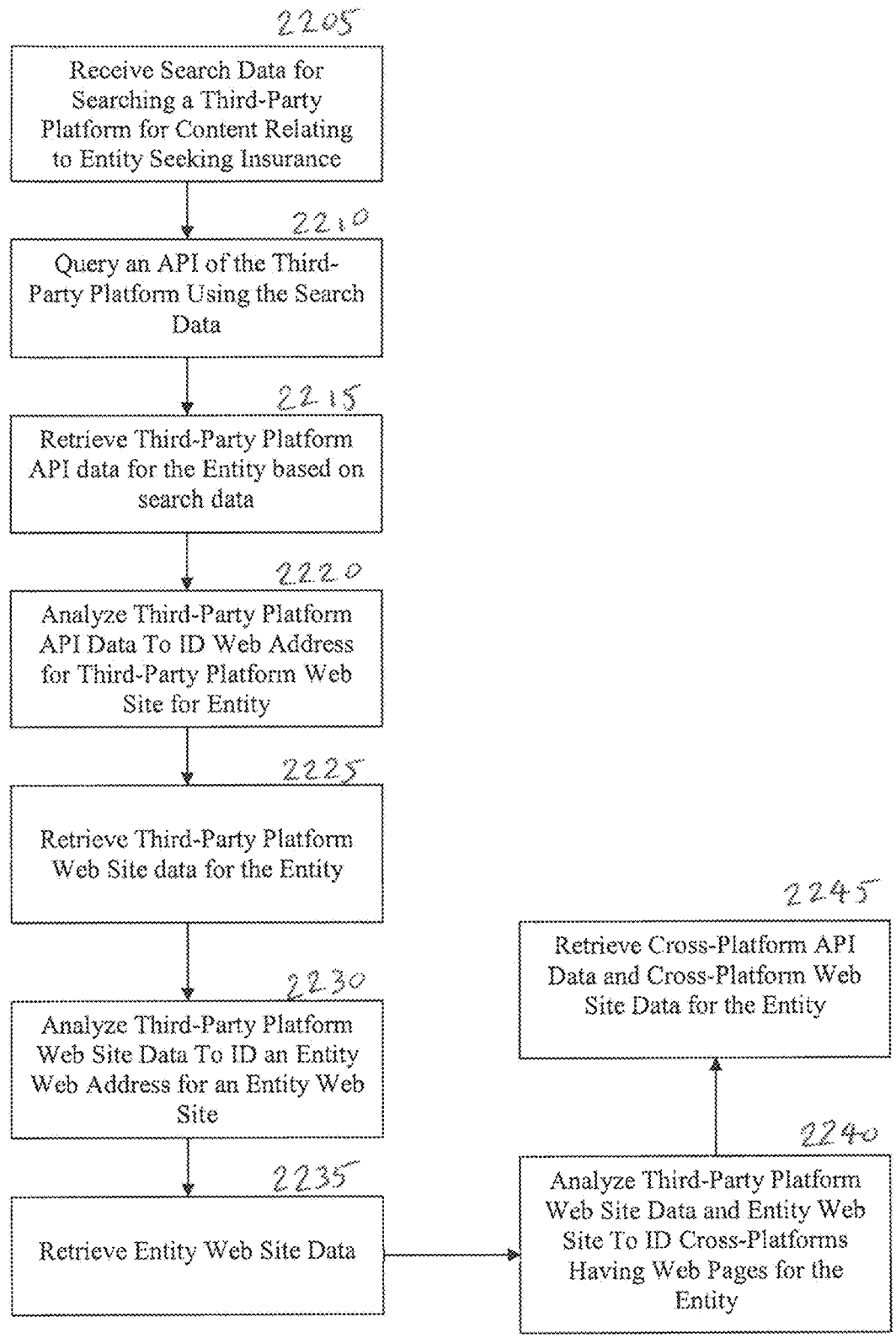
FIG. 22 shows an exemplary process flow of an embodiment of a method of retrieving data relating to an entity.

FIG. 22 is a flowchart for an alternative method for retrieving data relating to an entity seeking insurance coverage, according to an illustrative embodiment of the invention. As noted, third-party data sources may provide data generally not available in an insurance company system, such as the system 104 shown in FIG. 1. Third-party data can be obtained freely or by purchasing the data from third-party sources. The third-party data may be used for training the computerized predictive model in relation to determining a classification for an entity, or the third-party data may be analyzed for data that may be relevant to, for example, deciding whether underwriting for an entity should be handled manually or automatically, or for making an underwriting decision relating to the particular entity seeking insurance. The third-party data sources may include web pages published publicly on the Internet or secure websites that require login access. The third-party data sources may include data from advertising sources, such as yellowpages.com, services providing ratings, such as Angie's List and Yelp, and social media sources such as Facebook.com and Linkedin.com. The content processor in processing system 120 can retrieve content from electronic resources accessible via networks including the Internet from, for example, the websites of entities seeking insurance, social media pages of such entities, or electronic resources of entities that publish reviews of the entity seeking insurance. Third-party data sources may also include industrial classifications from credit information vendors, such as Experian or Dun & Bradstreet, or other third-party entities that provide industrial classifications. These or similar entities may also provide company or organization profile information for categorizing an entity or training the predictive model. As used in relation to FIGS. 22-32, a third-party is a party that is not the insurer or the entity seeking insurance coverage.

The method depicted in FIG. 22 is one embodiment for retrieving or obtaining data from third-party sources. The method 2200 comprises receiving search data for searching a third-party platform for data about a business or entity seeking insurance coverage information (block 2205), querying an interface, such as an application programming interface (API or interface) of the third-party platform, using the search data (block 2210), and then retrieving or receiving the third-party interface data, which may be structured data, from the third-party platform concerning the entity seeking coverage information (block 2215). The method 2200 may also comprise analyzing the third-party platform interface data to identify a web site address (URL) for a web page on the third-party platform for the entity seeking coverage information (block 2220) and then retrieving data on the web page on the third-party platform (i.e., the third-party platform web site data) for the entity (block 2225). In embodiments, the method 2200 may also include analyzing the third-party platform web site data for information concerning an identity of an entity web site for the entity, e.g., a web site owned by the entity (block 2230), and then retrieving the entity web site data (block 2235). In other embodiments, the method 2200 may also include analyzing the third-party platform web site data and the entity web site data to identifying cross-platforms (i.e., other platforms) that have web pages relating to the entity (block 2240), and then retrieving interface data and/or web site data from the cross-platforms (block 2245).

The method 2200 depicted in FIG. 22 may be implemented by a system as shown in FIG. 1, and in embodiments the method 2200 may be performed by the insurance company system 104 shown in FIG. 1. For obtaining data from third-party sources, the insurance company system 104 first receives search data that will be used for searching a third-party platform for data about a business or entity seeking insurance coverage information (block 2205). In an embodiment, the search data may comprise a telephone number for the entity seeking insurance coverage information, telephone number data typically being available for an entity seeking insurance because an agent in contact with the entity will usually have the entity's telephone number. In another embodiment, the search data may comprise a business address or policy address for the entity seeking insurance coverage information, which is another type of data that an insurance agent may typically have for a business or entity seeking insurance coverage. Other types of search data that may be used to search third-party platforms may include the name of the business (e.g., Main Street Garage), secondary names of the business (e.g., Al's Garage), prior name of the business (e.g., Main Street Mechanics). In an embodiment, if an interface search based on one type of search data returns no results or limited results, another type of search data may be used. An iterative process may be applied using the search data to obtain a result that best matches the entity for which information is being sought.

A third-party platform may comprise a third-party web site that typically includes information about businesses. By way of non-limiting example, Yelp, LinkedIn, and Facebook are third-party platforms that may typically include web pages for businesses. As used herein, a web page is a document available on the Internet which has an associated IP address, which is written in a human readable language such as the HyperText Markup Language, HTML. A web page as used herein does not include an interface, such as an API, that provides data in a form, such as JSON objects or XML, which is principally intended to be read by machine. As noted in relation to FIG. 1, third-party data sources include web pages published publicly on the Internet or secure websites that require login access. The third-party data sources may include data from advertising sources, such as yellowpages.com, services providing ratings, such as Angie's List and Yelp, and other sources. The content processor (processor 120) in insurance company system 104 can retrieve content from electronic resources accessible via networks including the Internet from, for example, the website of entities seeking insurance, social media pages and fees of such entities, or electronic resources of entities that publish reviews of the entity seeking insurance. Third-party data sources may also include industrial classifications from credit information vendors, such as Experian or Dun & Bradstreet, or other third-party entities that provide industrial classifications. These or similar entities may also provide company or organization profile information for categorizing an entity or training the predictive model.

The search data may be received by the insurance company system, such as the system 104, in a number of different ways. In an embodiment in which the search data comprises a telephone number, the telephone number of the entity may be input through an application on an agent terminal 102 or a customer terminal 132, such as shown in the system of FIG. 1. In another embodiment, the telephone number for an entity may be retrieved from a database or the Internet. For example, the entity's telephone number may already be in the insurance company database 116 because the entity is already insured by the insurance company (e.g., for other types of coverages or for the same type of coverage but the entity is interested in changing terms or renewal) or because the entity is saved in a database as a contact (e.g., a V-card for the entity is in the system) or potential client or insured for an agent. An agency management system may store the data, such as locally or on accessible resources such as cloud-based storage, which data may be acquired by the insurance company system by interaction with the agency management system. If the entity's telephone number is in the insurance company database 116, it may be retrieved if an individual such as an agent or underwriter provides other types of data, such as the business name of the entity, which may be used to then find the stored telephone number. The system may include or be in connection with another database or data store to supply a telephone number. For example, a system memory may store web addresses of popular telephone number websites, such as yellowpages.com, which can be searched to obtain a telephone number related to the entity. Similarly, the processing unit 120 may automatically search the Internet using, for example, Google, Bing, Yahoo!, etc. and inputting the entity's name, possibly along with other information, such as location. Such a search can return the entity's telephone number. In another embodiment, the processing unit 120 may search social networking sites, such as Facebook or LinkedIn, which may include telephone number information about the entity.

Next, a query of an API or interface of the third-party platform may be formulated, as shown in block 2210. In an embodiment in which the search data is a telephone number for an entity, the content processor may cause information to be retrieved from a third-party platform by formulating a query to retrieve the data through an API (Application Programming Interface). As will be understood, some third-party platforms make some or all of their data available through APIs. An example of a third-party interface telephone number search query is:
http://api.thirdplatform.com/phone_search?phone=775-4613112&ywsid=DEVELOPER KEY The text "7754613112" in the query indicates the phone number for the entity for which data is desired. The text "DEVELOPER KEY" represents a field where a unique developer key is placed in the query. The developer key is obtained by signing up for the third party's developer program, and is unique to each developer and allows the third party to track the use of each developer. Once the phone number search is formulated, a web browser or command line interface may be navigated to the 'address' represented by the query.

Figure 25:
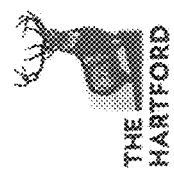
FIG. 25 shows an excerpt of a data table that may be populated with information found in the data relating to an entity.

Third-party platform interface data may typically be structured data that is in a format such as, but limited to, a JSON object (JavaScript Object Notation), an XML (Extensible Markup Language) file, or a CSV (comma-separated values) file. However, third-party platform data may also be unstructured data. The third-party platform telephone number interface query typically returns structured data as a JSON object which contains data relating to the entity associated with the telephone number for which the query was formulated (block 2215). FIG. 23 includes a portion of a sample JSON object returned in response to a telephone number query. As shown in FIG. 23, the data returned or retrieved may be unstructured or in a format in which it is difficult to understand the data. Therefore, to make the data more accessible for use by insurance system, in an embodiment the third-party content may be parsed or organized into a structure or table such as shown in FIG. 24. In an embodiment, the data from the JSON object may also or alternatively be parsed and used to populate forms saved on the insurance company database or may otherwise be parsed and structured and saved to the database. The populated forms may be forms used by insurance personnel such as underwriters, or the populated forms may be forms relating to insurance applications for an entity. As will be understood, presenting the data on forms may make the data more usable, particularly when the forms are used by an underwriter or other employee in a manual review of information concerning the entity. The data from the JSON object may also be used to verify data already in a fully or partially populated form or data table in the insurance company database. An example of a form that may be populated using JSON object data is shown in FIG. 25. The parsing and/or structuring of the data retrieved in relation to FIG. 22 may be performed as part of the retrieving and/or analyzing blocks 2215-2245, such that data received or analyzed is parsed and/or structured even if separate blocks for parsing and structuring are not shown or indicated.

When retrieving API interface data from third-party platforms, it may be recognized that the data may be structured, and that some of the third-party platforms format their data in a consistent structure or with consistent headers that enable one who is familiar with the structure or headers to identify specific pieces of data in the received API data. For example, the JSON object returned by a third-party platform API interface query typically includes a field entitled "$businesses[[1]]$mobile_url," which usually includes data representing a web site address for a web page on the third-party platform for the entity for whom the telephone query was performed. As shown in FIG. 23, the "$businesses[[1]]$mobile_url" field is associated with the data http://m.thirdplatform.com/biz/ioes-coffee-co-carson-city, which is the web address for the third-party platform's web page for Joe's Coffee Company in Carson City. Thus, the third-party platform API interface data may be analyzed to identify a web address for the third-party platform web site for the entity (block 2220). For example, a rules based analysis may be performed to identify the web address field in the API interface data. Furthermore, the third-party platform web pages for an entity (e.g., the Yelp or LinkedIn page for an entity) may have a common structure, which may facilitate web scraping of the web pages for information that may not be obtained through the API (block 2225). For example, it may be known that a third-party platform web page for an entity typically has a URL for the entity's web site (e.g., the company's direct or "first-party" web site rather than the company's page on a third-party platform) in a known area of the third-party platform web page. Thus, even when the entity's direct web site address is not typically part of the data available through an API query, the address for an entity's web site may be obtained by scraping the information (such as by the web scraping techniques discussed in relation to FIG. 3) from the third-party platform's web page for the entity, once the third-party platform's web page for the entity is identified from the JSON object (block 2230). Then the data from the entity's web page may be retrieved by web scraping or other techniques (block 2235). Any combination of techniques for web scraping, such as text grepping, HTTP programming, DOM parsing, HTML parsing, or use of web scraping software, may be used to retrieve web content.

In an embodiment, a query formulated for a third-party platform API interface may return more than one result. For example, the interface query may be formulated to search for an entity that is a dentist, John Dentist, based on the entity's address at 413 PARK AVE, NEW YORK, N.Y.:
http://api.thirdplatform.com/business_review_
search?term=john%20dentist%20dds&location=
413%20park%20ave%20new%20york%2A%20NY&
ywsid=Developer_key The query includes fields representative of the address: "413," "park," "ave," "new," "york," and "N.Y." The text "DEVELOPER KEY" is the field where a unique developer key is placed in the query, as previously described. FIG. 26 includes a sample JSON object returned in response to the address query. FIG. 27 shows the JSON object of FIG. 26 parsed into a readable structure. FIG. 27 includes a "$businesses[[1]]$distance" field which is used because multiple results were obtained in response to the address query. In this example, the data for the business distance field represents a selection of the business closest to the address, which filters out the other results obtained for the address.

A third-party platform or web page for an entity, such as a Yelp page or a LinkedIn page for the entity, or the entity's web site (i.e., the web site owned by the entity) may also have links to other third-party web sites or platforms related to the entity, such as a LinkedIn page for the entity or a Facebook page for the entity. Platforms, including cross-platforms, may include one or more business directories, such as Yellow Pages directors, services that provide ratings, such as Angie's List, social media sites such as LinkedIn, Facebook and Google+, and other resources. Platform data, including third-party platform and cross-platform data may include, in embodiments, social media feed data of the entity, social media references to or mentions of the entity, and other social media data relating to the entity. Links to other third-party platforms from a third-party platform or from the entity's web page may be described as cross-platform linking. The insurance computer system 104 may be configured to analyze the third-party platform API data, third-party platform web page data, and the entity's web page data to identify cross-platform links within those data sources (block 2240), thereby recognizing and using cross-platform synergy by using the data from a third-party site or platform and identifying other third-party sites or platforms from which data relating to the entity may then be retrieved.

As will be understood, different third-party web sites or platforms may typically have different types of information for an entity. For example, the API data for a Yelp page for an entity may typically have data for the entity such as: Name of the business/entity, phone number, business category, location, customer reviews, number of reviews, average review score, hours of business, if the Yelp page for the business has been claimed by the owner of the business, and a link to the business's direct web site, if one exists. The API data for a Facebook.com page for an entity may typically have data for the entity such as: Hours of operation, contact number, attire, business category, company overview, description, and number of likes for the entity. The API data for a LinkedIn page for an entity may typically have data for the entity such as: Number of employees, Company web site address, Company type (e.g., Public/Private/NGO/Non-profit, etc.), Company Status (e.g., Operating/Subsidiary/Acquired, etc.), Company Industry (e.g., Accountants, Aviation, etc.), Company handle for its Twitter account, Company location(s), and Company email domain(s). While there may be some overlap in the data available at different third-party platforms, there may also be information on a platform that is not on other platforms. Furthermore, where there is an overlap in data, the overlap may be used to identify inconsistencies. Accordingly, it may be useful to receive or obtain data from more than one type of third-party platform.

In block 2240, the content processor analyzes the saved third-party API interface data for the entity (e.g., the Yelp JSON object) and the entity's web site and identifies cross-platforms such as third-party web sites that may have information relating to the entity. For example, a Yelp web page for an entity may have Facebook.com and LinkedIn addresses or a link for a web page for the entity on those platforms. Likewise, a Facebook.com page for an entity may have Yelp or LinkedIn addresses or links for the entity. As will be understood, each platform may not have links to all of the other platforms that have information about the entity, therefore it may be helpful to obtain and analyze content from as many platforms as possible to obtain as much information about the entity as possible. For example, a Yelp web page for an entity may include a link to a Facebook.com page for the entity, and then the Facebook.com page for the entity may include a link for the LinkedIn page for the entity. It may be desirable to retrieve and analyze information from a number of different platforms, and the process of identifying and retrieving information from third-party platforms such as shown in blocks 2240 and 2245 in FIG. 22 may comprise an iterative process.

After an additional platform or platforms relating to the entity has been identified, the content from the identified platforms may be retrieved, as shown in block 2245 of FIG. 22. For third-party platforms that make data available through an API, the system may be configured to generate requests to obtain the API interface data for the entity. In addition or alternatively, data may be obtained from the third-party platforms through web scraping. For example, while the platform Yelp makes some data available through the Yelp API, other data, such as user reviews of the entity, in some cases are not available through the API and therefore may only be obtained through web scraping. The content that is retrieved from cross-platform third-party web pages may comprise text, images, videos, animation, or any other website content. The content may be published on the website using HTML, SVG, Java applets, Adobe Flash, Adobe Shockwave, Microsoft Silverlight, or other web formats or applications. The content processor is configured for retrieving the website content in some or all of the aforementioned formats or any other format. A content processor (which may be a part of the insurance computer system 104 of FIG. 1 or part of a computer system such as shown in FIG. 2) may be further configured to convert or organize the content to a format suitable for other uses, such as for use with the computerized predictive model as necessary, according to, for example, the methods described above.

The content processor may parse the information received from the identified cross-platform web sites. In an embodiment the content processor may have the capability to parse the information, or the content processor may be linked to resources that have the capability to parse the information. The content processor may extract and manipulate data from text (e.g., in reviews of an entity), images, or other formats delivered through HTML, SVG, Java applets, Adobe FLASH, Adobe SHOCKWAVE, Microsoft SILVERLIGHT, or other web formats or applications. In another embodiment, the content processor, or a resource available to the content processor, may be configured to convert text data stored in image files, extracted from static image data, video, or both, to text using optical character recognition algorithms by way of example, and incorporate such converted text data. In embodiments, the system may be configured to analyze sound files, using speech recognition algorithms, by way of example, and extract text data from such sound files and incorporate such extracted sound file data with text data.

In an embodiment, parsing of the third-party data may also include filtering the third-party data to extract key words, and may also include counting and assigning counts and frequencies or ratios to the key words. For example, in an embodiment, the content processor may filter stop words, such as articles or prepositions, from the third-party data so that only terms that are likely to contain important information are retained. The content processor may, in an embodiment, only retain words of a certain part of speech, such as nouns and/or verbs, which further reduces the number of third-party data words. The remaining words may be reduced to their stem, base, or root form using a stemming algorithm. Additional processing of the third-party data may include correcting spelling errors, identifying synonyms of words, performing coreference resolution, and performing relationship extraction.

In an embodiment, the data from the third-party sites or platforms may also or alternatively be parsed or organized and used to populate forms saved on the insurance company database or may otherwise be saved to the database. The data from the third-party sites may also be used to verify data already in a fully or partially populated form in the insurance company database. An example of a form that may be populated using data from third-party platforms is shown in FIG. 28. The form shown in FIG. 28 includes a number of additional fields to the form shown in FIG. 25. As shown, the form may include fields for different categories of terms or phrases found in the data from the third-party sites, such as "alert" terms or phrases (2810), terms and phrases related to a potentially "uninsurable" entity (2820), and terms or phrases that may indicate that the entity requires "additional coverage" (2830). The "alert," "uninsurable," and "additional coverage" terms and phrases are merely exemplary and alternative or additional categories may be included on the form. For example, in an embodiment, uninsurable terms may be handled under the alert terms category. By way of further example, a category for "manual review required" terms and phrases may also be included on the form.

As noted in relation to FIG. 14C, insurance risk "alert" terms may be terms that are selected as representing insurance risk and thus a likelihood of additional underwriting review being required. The insurance risk alert terms may include individual words and phrases. In an embodiment, insurance risk alert terms may include image recognition data, such as image recognition of "We Deliver" signs, by way of non-limiting example. As shown in relation to FIG. 14C, identified alert terms may be stored 1450 in a file and made accessible 1452 to an underwriter terminal 1460 or otherwise accessible to an underwriting system. The alert terms may be provided in a listing having an order based on a risk weighting, frequency rating and combinations thereof. For example, certain insurance risk alert terms, such as "delivery" and "live music" may be given a higher risk weighting and hence provided in a list of insurance risk alert terms. The alert terms may also be used in the SIC determination.

Terms and phrases related to an "uninsurable" category may be terms that are selected as representing a high level of insurance risk that may render an entity uninsurable. In an embodiment, the presence of a term or phrase in the uninsurable category may cause the application for the entity to be deemed uninsurable without additional manual review. In another embodiment, the presence of a term or phrase in the uninsurable category may cause the application for the entity to be routed for manual review with information concerning the identified uninsurable term or phrase. The insurance uninsurable terms may include individual words and phrases, and in embodiments the uninsurable terms may include image recognition data, such as image recognition of radiation hazard symbols, by way of non-limiting example. Like the alert terms shown in FIG. 14C, identified uninsurable terms may be stored 1450 in a file and made accessible 1452 to an underwriter terminal 1460 or otherwise accessible to an underwriting system. The uninsurable terms may be provided in a listing having an order based on a risk weighting, frequency rating and combinations thereof. For example, in an embodiment certain insurance risk alert terms such as "asbestos" and "isotope" may be given a high risk weighting and hence provided near a top of a list of insurance risk alert terms.

Terms and phrases relating to "additional coverage" terms and phrases may be terms that are selected as representing the need for coverage other than the coverage inquired about by the entity. In an embodiment, the presence of a term or phrase in the additional coverage category may cause the application for the entity to be processed as normal to determine a classification for the entity and then an underwriting decision for the entity, but with a flag indicating that a manual review for additional coverage is required. In another embodiment, the presence of a term or phrase in the additional coverage category may cause the application for the entity to be routed directly for manual review with information concerning the identified additional coverage term or phrase. Like the alert terms shown in FIG. 14C, additional coverage terms may also be stored 1450 in a file and made accessible 1452 to an underwriter terminal 1460 or otherwise accessible to an underwriting system. The additional coverage terms may be provided in a listing having an order based on a risk weighting, frequency rating and combinations thereof. For example, in an embodiment an additional coverage term such as "delivery" may indicate that an entity requires automobile insurance as well as the operations and premises coverage about which the entity inquired. Additional coverage may indicate that one or more additional policies, such as automotive insurance or flood insurance, may be appropriate, or that one or more riders, such as an electronic data rider to a business policy, may be appropriate.

In an embodiment, alert terms and phrases and/or uninsurable terms and phrases may differ according to the type of business of the entity seeking insurance information. For example, when the business seeking information is a medical radiology practice, the term "radiation" may not be considered an alert word, while the term "radiation" may be an alert word in relation to a property damage remediation business. In an embodiment, the insurance company system may be provide a display as shown and discussed in relation to FIG. 15, which allows a user to select from different listings of alert words. For example, multiple alert word lists may have been developed for application to entities having different characteristics, such as geographic location, entity size and other factors. Button 1565 may provide the user a selection of one of multiple such alert word lists. The user option for selection of alert word lists may be omitted in embodiments. Screen 1504 provides area 1570 for display of system-identified alert words to the user.

Figure 29:
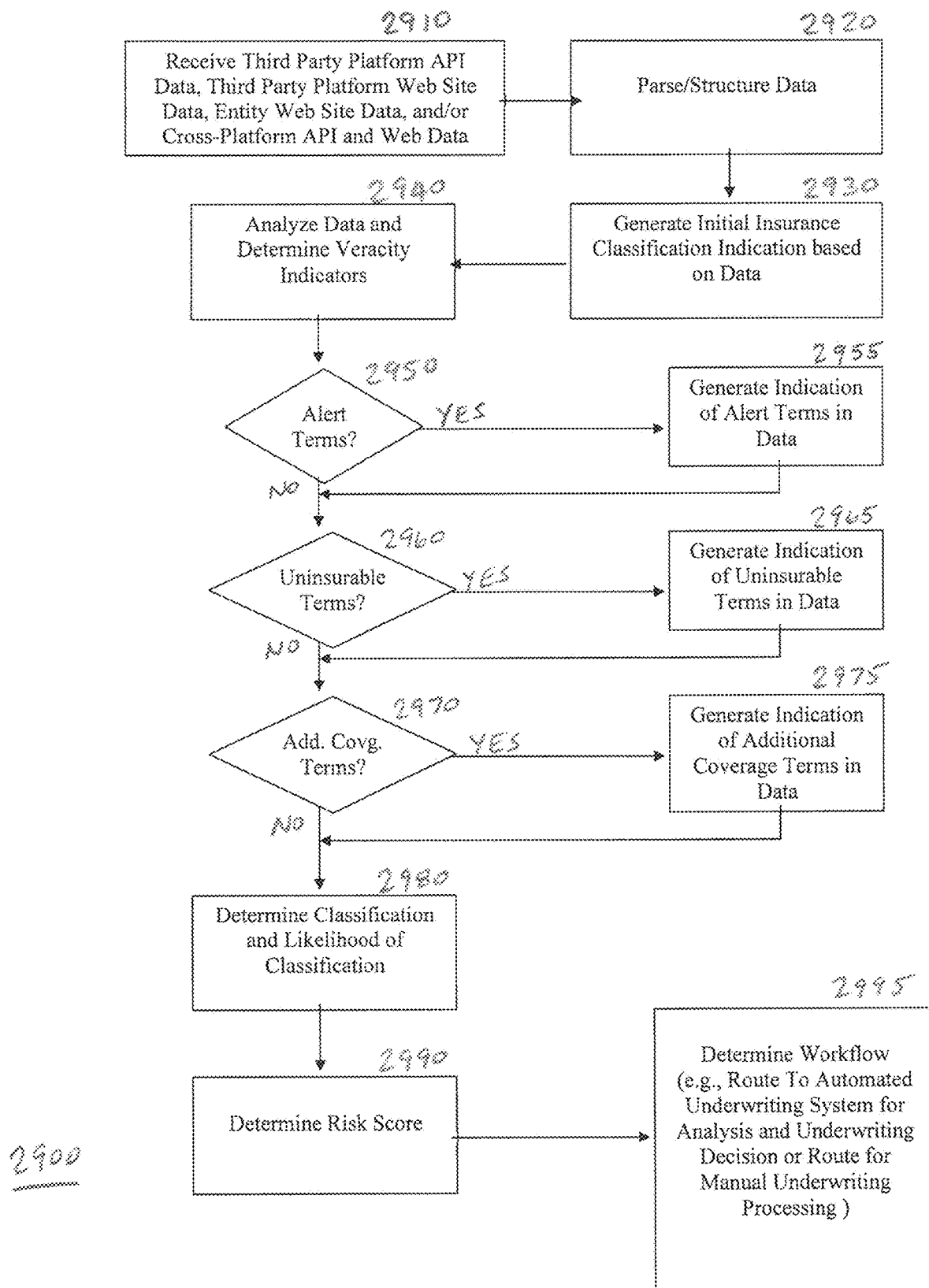
FIG. 29 shows an exemplary process flow of an embodiment of a method of determining industrial classification of an entity.

FIG. 29 depicts an embodiment of a method 2900 for processing the data about an entity retrieved from third-party platforms or sites to determine a classification for the entity. The method may begin at block 2910 with retrieving or receiving data relating to the entity. The data may comprise third-party platform API and web site data, cross-platform API interface data and web site data, entity web site data, and/or insurance application data for the entity, and may be obtained by the process depicted in the embodiment of FIG. 22 or by other methods. At block 2920, the data may be parsed and/or structured, and at block 2930 an initial insurance classification indication may be generated or determined based on the data received in block 2910. At block 2940, the data may be analyzed to determine veracity indicators in relation to data. In an embodiment in which the entity has provided data for an insurance application, the insurance application data may also be analyzed when determining veracity indicators. The data may also be compared to alert terms or phrases (block 2950), and if any such terms or phrases are identified, an indicator of the alert term (alert term indicator) is generated (block 2955), so that the presence of the alert term may be considered by an underwriter. The data may also be compared or analyzed for uninsurable terms or phrases (block 2960), and if any such terms or phrases are identified, an indicator of the uninsurable term is generated (block 2965), so that the presence of the uninsurable term may be considered by an underwriter. At block 2970, the data may be compared or analyzed for terms or phrases relating to additional coverage that may be needed by an entity, and if any such terms or phrases are identified, an indicator of the additional coverage term is generated (block 2975), so that the presence of the additional coverage term may be considered by an underwriter. In an embodiment, if alert, uninsurable, or additional coverage terms are identified in the data, the data and indicators may be routed automatically to an underwriter computer for manual processing. In the embodiment shown in FIG. 29, a classification for the entity may be determined based on the data at block 2980, even if indicators were generated. A risk score may be determined for the entity based on the classification for the entity, the data, and the veracity indicators at block 2970. At block 2990, the veracity indicators, classification, risk score, and data may be routed to an automated underwriting system for analysis and the determination of an underwriting decision.

As noted, the method may begin at block 2910 with receiving the third-party API interface and web site data, the cross-platform API interface data and web site data, and the entity web site data that was retrieved in the method depicted in FIG. 22. In an embodiment, the data may be retrieved for an entity seeking insurance information from third-party platforms or web sites through an API and/or by scraping web pages for content, as shown in relation to FIG. 22. The data may also include the data from an application for insurance completed by the entity. While the method of FIG. 29 depicts retrieving or receiving data from a variety of different third-party platforms, and also the entity web site and possibly an application for insurance, it will be understood that the system may be configured to retrieve data from more or fewer sources or categories of sources. Accordingly, in an embodiment the method may be configured to only retrieve interface data from one third-party platform, while in another embodiment, the method may be configured to retrieve both interface and web page data from one third-party platform. In other embodiments, the method may be configured to retrieve interface data from certain third-party platforms and web page data from certain third-party platforms, or the method may be configured only to retrieve interface data from multiple third-party platforms, or only retrieve web page data from multiple third-party platforms.

At block 2920, the received data may be parsed and/or structured. While block 2920 is shown as a separate block in FIG. 29, the parsing and/or structuring may be performed as part of the receiving data step 2910, or as part of the retrieving and/or analyzing blocks 2215-2245 of FIG. 22, such that data received or analyzed is parsed and/or structured even if a separate step for parsing and structuring is not shown or indicated. As noted in relation to FIG. 22, the content processor may parse the information received from the identified cross-platform web sites. In an embodiment the content processor may have the capability to parse the information, or the content processor may be linked to resources that have the capability to parse the information. The content processor may extract and manipulate data from text (e.g., in reviews of an entity), images, or other formats delivered through HTML, SVG, Java applets, Adobe FLASH, Adobe SHOCKWAVE, Microsoft SILVERLIGHT, or other web formats or applications. The parsing of the third-party data may also include filtering the third-party data to extract key words. For example, in an embodiment, the content processor may filter stop words, such as articles or prepositions, from the third-party data so that only terms that are likely to contain important information are retained. The content processor may, in an embodiment, only retain words of a certain part of speech, such as nouns and/or verbs, which further reduces the number of third-party data words. The remaining words may be reduced to their stem, base, or root form using a stemming algorithm. Additional processing of the third-party data may include correcting spelling errors, identifying synonyms of words, performing coreference resolution, and performing relationship extraction. In an embodiment, once the words have been processed, they may be counted and assigned word frequencies or ratios.

In an embodiment, parsing and structuring of the data at block 2920 may include a process that incorporates aspects of the tokenization process described in relation to FIGS. 14B and 14C. As discussed in relation to FIGS. 14B and 14C, the data received from the third-party platforms (and/or the entity web site and/or application data) may be tokenized using data preparation rules by applying the data preparation rules to the obtained data. The data preparation rules may include rules for tokenizing the data into individual words called tokens. "Tokenizing" refers to a process of breaking a stream of text up into words, phrases, symbols, or other meaningful elements called tokens. In embodiments, tokenizing may break the text into individual words, but the tokens may include phrases or other meaningful elements in embodiments. The data may be tokenized employing suitable text extraction tools and techniques. The insurance system 104 may generate token counts from the tokenized website data (block 2930). In embodiments, a listing of tokens, or words that are determined to have significance in determining industrial classification, may be employed. The obtained and processed website data, including token count data, may be structured as known in the text mining field. As discussed in relation to FIG. 14, inverse document frequency (IDF) data techniques may be used to generate token count data for the tokenized data. In embodiments, the tokenized data may also be used to determine a classification for the entity using a predictive model, as discussed in relation to FIG. 3. In other embodiments, the tokenized data may be used to determine a classification for an entity using rule based methods.

At block 2930, an initial insurance classification indication is generated or determined based on the received data. In embodiments, the initial insurance classification indication is generated based upon classification-like data that is received from one or more of the third-party platforms. For example, the third-party interface data and/or web page data for an entity will typically include an informal classification of an entity, such as classifying the entity as a "Restaurant." Similarly, the LinkedIn interface data and/or web page data for an entity may typically include an informal classification of an entity, such as "Law Practice." This initial classification may provide a useful starting point for a more detailed determination of the classification because it at least provides a classification that is presumably "in-the-ballpark" of the actual industry of the entity, which is helpful given the vast number of different types of industries in which an entity can potentially be classified. In other embodiments, an initial classification may not be provided by the third-party platforms, but an initial classification may nevertheless be generated or determined based upon analysis, such as by application of one or more rules to the words and phrases used to describe the entity in reviews of the entity or elsewhere in the data for the entity obtained from a third-party platform. For example, if the third-party platform does not have a classification for an entity, but the third-party platform includes reviews for the entity which include the phrases "good food" and "tasty burger," an initial classification for the entity as a "restaurant" may be made. In other embodiments, an initial classification for an entity may be made based on data received from an entity or agent regarding the entity, which will be in the application data received from the entity, if an application has been started or completed for the entity.

Veracity indicators relating to the data about the entity may be determined in block 2940. As noted, current methods for aligning entities with appropriate industry classifications are error prone, and an initial classification for an entity may not provide an accurate classification for the entity. In some cases, the operations of an entity are varied, and information relating to less risky operations of the entity are received when an insurance quote is being determined. In other cases, information received relating to an entity's operations are too general for assigning an accurate risk factor. For large and established companies, a third-party data vendor may supply an industrial classification, or an industrial classification may be provided by an agent, but for new or small companies, third-party vendors may not have an industrial classification available. In these cases, the burden of classifying the industry falls onto the entity itself or the agent. The assigned industrial classification selected by the agent or entity may be incorrect or inadequate. In some instances, an agent may assign a less risky industrial classification to an entity to obtain a lower cost premium for the entity, in order to secure the entity's insurance account. Insurance companies produce hundreds of thousands of insurance quotes per year, and it has been virtually impossible for insurance companies to verify the accuracy of industrial classifications received from agents, insureds, and third-party vendors for each entity they develop a quote for.

As noted, an initial industrial classification assigned to an entity may not accurately represent the entity's operation, leading to economic consequences for the insurance company. For example, an entity that performs custodial services may also employ a team to perform repairs. The activities and consequences involved in repairing equipment or facilities, from repairing hand rails to plumbing repairs, are much riskier than custodial activities in an office. Furthermore, the entity may be liable for injuries that occur as a result of a faulty repair of a handrail, or property damage that may occur as a result of a faulty plumbing repair. While the entity may be truthfully classified as a custodial service, if the entity is paying an insurance premium that has been determined for a custodial service without taking into account the repair service aspect of the business, the insurer of the custodial service runs the risk of the custodial service incurring greater losses than were expected or insured. In cases like this, the insurance company may still be contractually bound to cover the losses under the policy.

The use of veracity indicators may enable an insurance company to ensure that the data upon which the initial classifications are based is accurate, which may reduce the insurance company's risk in relation to misclassified entities. In an embodiment, a veracity indicator may comprise a flag placed for, or in relation to, an item of data received in an insurance application, in which the flag is indicative of a veracity of the data to which the flag relates. In an embodiment, flags may be placed only on the data whose veracity is in question, while in another embodiment flags representing different degrees or levels of veracity may be placed for, or in relation to, all data in the application. In another embodiment, a veracity indicator may also or alternatively comprise a veracity score that is determined based on a comparison of the data to data received for the entity in an insurance application. The veracity indicator may be a passive indicator that alerts an underwriter to a need to investigate the veracity of certain data in an application for insurance for an entity. Alternatively, the veracity indicator may be an active factor that is used in a multivariate formula for determining the classification and/or the risk factor for the entity. In an embodiment, the veracity indicator may be an active factor that is used in determining the likelihood a determined classification applies to the entity seeking insurance.

In an embodiment, a veracity indicator may be determined based on the application of rules to the data. For example, an initial classification for an entity may be based on insurance application data indicating that the business is a restaurant. However, third-party platform API or web page data may indicate that the hours of operation of the business are from 8 PM to 3 AM, which may be indicative of the business being a bar instead of, or in addition to, a restaurant. A rule may be defined that compares the closing time for a business that has represented that it is a restaurant to a known closing time for a typical restaurant, such as 11 PM. If application of the rule determines that the closing time for the entity does not match the closing time for a typical restaurant, the rule may generate an indicator that the representation is a restaurant has a low level veracity.

In another embodiment, a veracity indicator may be generated based on a number of reviews that are associated with the business on the third-party platform. For example, an entity seeking insurance may represent that they are a restaurant that has been operating for 10 years at the same location. For such a business, it would be expected that there would be reviews for the restaurant on third party platforms, and perhaps a minimum number of reviews based on the years of operation. If the entity does not have the minimum number of reviews, or any reviews at all, a veracity indicator may be generated corresponding to a low veracity for the representation that the restaurant has been operating for 10 years. The number of reviews that an entity may be expected to have may also depend on the type of business in which the entity engages. Thus, a business such as a restaurant is expected to have a sizeable number of customers who may provide reviews, while a business such as a software company may not have any reviews, as software companies typically receive reviews on the basis of their individual products, not for the company as a whole. In an embodiment, the weight given to individual reviews for a company may vary. For example, when a reviewer writes a review for an entity on a third-party platform, it is typically possible to obtain all of the reviews written by the reviewer on the third-party platform for all entities. If all of the reviews written by the reviewer have a negative sentiment, and the review for the entity seeking insurance is negative, the review for the entity may be given less weight. Similarly, if all of the reviews written by the reviewer have a positive sentiment, and the review for the entity seeking insurance is positive, the review for the entity may be given less weight. Where a reviewer has written both positive and negative sentiment reviews, their review of the entity may be given more weight, whether it is positive or negative. Thus, veracity of the reviewers may be taken into account when determining a veracity indicator for the entity based on reviews.

A veracity indicator may also be generated in relation to whether the third-party platform web page for an entity has been acknowledged or "claimed" by the business. For example, a third-party platform web page for an entity may typically be created by the third-party platform, and not the entity itself. Because of this, the third-party platform page for an entity may have incomplete or incorrect information about the entity, such as incorrect hours of operation. However, a third-party platform page may be "claimed" by an entity, which entity may then work with third-party platform to correct incorrect information on the entity's third-party platform web page. Alternatively a third-party platform page may not be claimed, in which case it may be presumed that the entity has not corrected incorrect information on the third-party platform page. Based on the foregoing, third-party platform web pages that have been claimed may be given a higher veracity score or rating than third-party platform web pages that have not been claimed.

A veracity score may also be determined in relation to data received or retrieved concerning the entity, and in an embodiment may be determined by a multivariate formula. For example, an initial classification may be determined for an entity indicating that the entity is a restaurant. A veracity score may be determined using a multivariate formula to determine the veracity of that initial classification. In an embodiment, such a formula may be written as:

$$V = w_{(i,r)}R + w_{(i,q)}Q + w_{(i,t)}T - w_c C$$

The veracity value V, prior to normalization, may be determined in an embodiment using the foregoing formula. In this formula, each factor is preceded by a weighting factor w. The factors are:

R—number of reviews
Q—quality of reviews
T—time in business
C—contradictory information factor.

The weighting factors w for the factors R, Q and T are industry-specific. Thus, a number of reviews may be given a high weighting for an industry in which relatively few reviews are typical, such as in the business to business context, but a lower value for the restaurant industry. The quality of reviews factor, which itself is based on factors such as number of other reviews by the reviewers, may be weighted more highly in an industry in which quality of reviews differs significantly among reviewers. The weighting factor for time in business may vary according to industry. In an industry with relatively little turnover, time in business may be weighted highly. The contradictory information factor reduces the veracity value. The contradictory information factor may be based on a number of items of contradictory information between various items accessed, such as items from interfaces of different platforms. In this embodiment, the weighting factor for contradictory items of information is industry-independent, but may be industry-dependent in other industries. Those of skill in the art may determine the weighting factors based on review of sampled test data from various industries, by way of example.

In blocks 2950 to 2970, the data is assessed to determine if it contains terms or phrases for which indicators should be generated. As noted in relation to FIG. 28, when the third-party data is parsed, a form may be populated that includes fields for insurance risk "alert" terms. In an embodiment, the form may be populated with alert terms as part of the parsing process, and then the determination as to whether alert terms or phrases were found in the data is performed in block 2950 based on whether that field was populated during parsing. In another embodiment, parsing does not identify the alert terms or populate a form with alert terms. Rather, the alert terms are searched for in the data as part of the analysis of the data performed by block 2950. In another embodiment, the method also includes tokenization, and the alert terms are identified in relation to the tokenization process. In any of the described embodiments, if the content processor determines that the data contains alert terms, an indicator is generated for the alert terms at block 2955.

In block 2960, a determination may be made concerning whether the third-party saved data contains terms and phrases related to an "uninsurable" category of entities. The terms may relate to entities that represent a high level of insurance risk that may render an entity uninsurable. In an embodiment, the presence of a term or phrase in the data that is in the uninsurable category may cause the application for the entity to be deemed uninsurable without additional manual review. In the embodiment shown in FIG. 29, the presence of a term or phrase in the uninsurable category may cause generation of an indicator relating to the uninsurable term. As noted, the insurance uninsurable terms may include individual words and phrases, and in embodiments the uninsurable terms may include image recognition data, such as image recognition of radiation hazard symbols, by way of non-limiting example. In an embodiment certain insurance risk alert terms such as "asbestos" and "isotope" may be given a high risk weighting and hence provided near a top of a list of insurance risk uninsurable terms.

In block 2970, a determination may be made concerning whether the third-party saved data contains terms and phrases related to "additional coverage" terms and phrases, which may be terms that are selected as representing the need for coverage other than the coverage inquired about by the entity. In the embodiment shown in process 2900, the presence of a term or phrase in the additional coverage category may cause the generation of an indicator of the additional coverage terms or phrases in the data at block 2975. In another embodiment, the presence of a term or phrase in the additional coverage category may cause the application for the entity to be routed directly for manual review with information concerning the identified additional coverage term or phrase. As noted, the insurance "additional coverage" terms may include individual words and phrases, and in embodiments the uninsurable terms may include image recognition data, such as image recognition of radiation hazard symbols, by way of non-limiting example. In an embodiment an example of an additional coverage term is "delivery," which may indicate that an entity requires automobile insurance as well as the operations and premises coverage about which the entity inquired.

A final or detailed classification for the entity may be determined at block 2960, and a risk score may be determined for the entity at block 2970. The classification for the entity may be determined using a predictive model as discussed in relation to FIG. 3. In an embodiment the predictive model may be the same model disclosed in relation to FIG. 3, or it may be a similar but different predictive model that, in embodiments, is trained using the types of data found in third-party platforms such as Facebook.com, Yelp, and LinkedIn, and may, in embodiments, be trained to factor into its model the veracity indicators determined at block 2940. As discussed in relation to FIG. 12, statistical models such as the Rotation Forest statistical model may be used to determined one or more industrial classifications for the entity. As discussed in relation to FIG.

3, the computerized predictive model is trained on a set of training data before it is used to classify an entity. Training data may include any website that includes information about an entity with a known industrial classification and/or employees of that entity may be used as training data. The computerized predictive model may analyze tokenized data and outputs one or more of the most likely industrial classifications for the entity. The computerized predictive model may also return a likelihood ranking on a numeric, verbal or graphic scale associated with each classification.

As noted in relation to FIG. 3, the classification determined by the computerized predictive model may be a standardized classification code, such as a NAICS, SIC, or ICB code. Depending on available data and desired resolution, the computerized predictive model may return industry, supersector, sector, or subsector classifications. The computerized predictive model may first select one or more industries, then select one or more supersectors within the selected industries, and so forth, collecting additional data to achieve more specific classifications. The likelihood ranking for the industrial classification may be a confidence level or likelihood, indicating how well a particular industrial classification describes the entity. The computerized predictive model may also return an estimation error. In an embodiment, the computerized predictive model may, when determining a classification, discount or devalue data deemed to have low veracity in relation to the determination of veracity indicators in block 2940.

In another embodiment, the classification for the entity may be determined at block 2960 using a rules-based analysis of the data, in addition to or in place of a predictive model based analysis of the data. In an embodiment, rules based analysis may begin with the initial classification generated at block 2930. Rules may then be applied which determine whether the classification description is consistent with the textual data, photo data, and reviews on the third-party platform web page, and whether the data includes additional information that may provide for a more detailed classification of the entity. For example, a set of rules may be defined for entities that are restaurants. The rules may include rules relating to comparing the closing time of the restaurant to a threshold time, rules determining whether the terms "alcohol" or "beer" are found in the data, and rules determining whether the terms "live music" or whether photos of musicians are in the data for the entity. Based on this data, the classification description can be refined, and in embodiments different weights may be associated with different rules. For example, the rule for closing time may trigger classification of the restaurant as a bar if the closing time is after midnight, and the rule may be defined as having a high weight when determining the classification of the entity. Based on data that the entity closes at 3 AM, the original classification of the restaurant may be refined to bar/restaurant. Rules that may be applied to different types of entities may also be defined.

At block 2990, an insurance risk score may be determined. The insurance risk score may be determined based on the classification made in block 2980. In embodiments, the insurance risk may be further based on additional information related to the entity, for example and without limitation, the company size, a geographic region in which the company operates, materials used or stored by the company, or the business cycle of the entity, all of which may be information included in third-party platform data, the entity web site data, and/or the insurance application data received about the entity. In an embodiment, materials used or stored by an entity based on the type of business the entity is engaged in, may be looked up in a table. For example, the table may list materials used and stored by entities according to the classification of the entity.

In an embodiment, block 2960 for determining a classification for an entity may determine that additional data is needed before a classification may be determined. Blocks 404-412 of FIG. 4 depict a process that may be used to obtain additional data needed to make a classification determination. As shown in FIG. 4, additional data may be obtained from the entity, from a third-party, or from web sites. The process depicted by blocks 404-412 includes a loop for obtaining data related to the entity from the entity (step 404), a third-party (step 406), and websites (steps 408 and 410). Once it has been determined that no more additional data is needed (decision 412), the classification for the entity may be determined at block 2980.

In an embodiment, the classification model may output more than one classification for an entity, and a business logic processor may calculate an aggregate risk rating for the entity. The business logic processor may be part of the insurance computer system 104, or part of a computer as shown in FIG. 2. The insurance risks associated with the industrial classifications may be weighted by the confidence level or likelihood of each industrial classification and summed. Alternatively, the insurance risks may be weighted according to the rankings of the confidence level. There may be a set lower threshold of confidence of likelihood below which industrial classifications are not considered. In other implementations, the insurance risk is simply the insurance risk of the entity that has the highest insurance risk, or alternatively the insurance risk of the most likely industrial classification. The insurance risk may depend on the type of coverage sought. In this case, each industrial classification may have different insurance risks for different types of coverage.

After a classification and risk score are determined in blocks 2980 and 2990, an insurance workflow may be determined in block 2995. For example, the workflow may encompass determining whether (a) an automated underwriting analysis should be performed for the entity, (b) an automated underwriting analysis should be performed for the entity followed by a manual review of the results, (c) a manual underwriting process should be performed in relation to the entity's insurance needs, or (d) additional information is needed prior to commencement of an underwriting process. In an embodiment, the determination may be based on the classification and likelihood of classification determined in block 2980, and/or the veracity indicators determined in block 2940, the alert term indicators (if any) determined in block 2955, the uninsurable indicators (if any) determined in block 2965, and the additional coverage indicators (if any) determined in block 2975. For example, in an embodiment, a rule may be defined that causes a determination to be made that a manual underwriting process should be performed if there are any alert, uninsurable, or additional coverage indicators. In another embodiment, a rule may be defined that causes a determination to be made that an automatic underwriting process should be performed if there are any alert, uninsurable, or additional coverage indicators, but that a manual review of a premium determined by the underwriting system should be performed. In other embodiments, a rule may be defined that causes an automatic underwriting workflow to be performed if there are no alert, uninsurable, or additional coverage indicators.

The workflow determination may also depend on the classification and likelihood of classification determined in block 2980. For example, a rule may be defined that causes an automatic underwriting process to be performed if the likelihood of classification is greater than a threshold percentage, such as 60%. A rule may also be defined that causes an automatic underwriting process to be performed, but with a manual review after the process if the likelihood of classification is less than a threshold percentage, such as 60%. As noted, the system may generate more than one classification for an entity, with a likelihood of classification associated with each classification. A rule may be defined that causes a manual underwriting process to be performed if more than one classification was generated for an entity. Alternatively, a rule may be defined that causes an automatic underwriting process to be performed based on the classification with the highest likelihood of classification, but with a manual review after the processing. The system is therefore highly configurable to apply a workflow depending on the classification, likelihood of classification, and the indicators determined for the entity.

Figure 30:
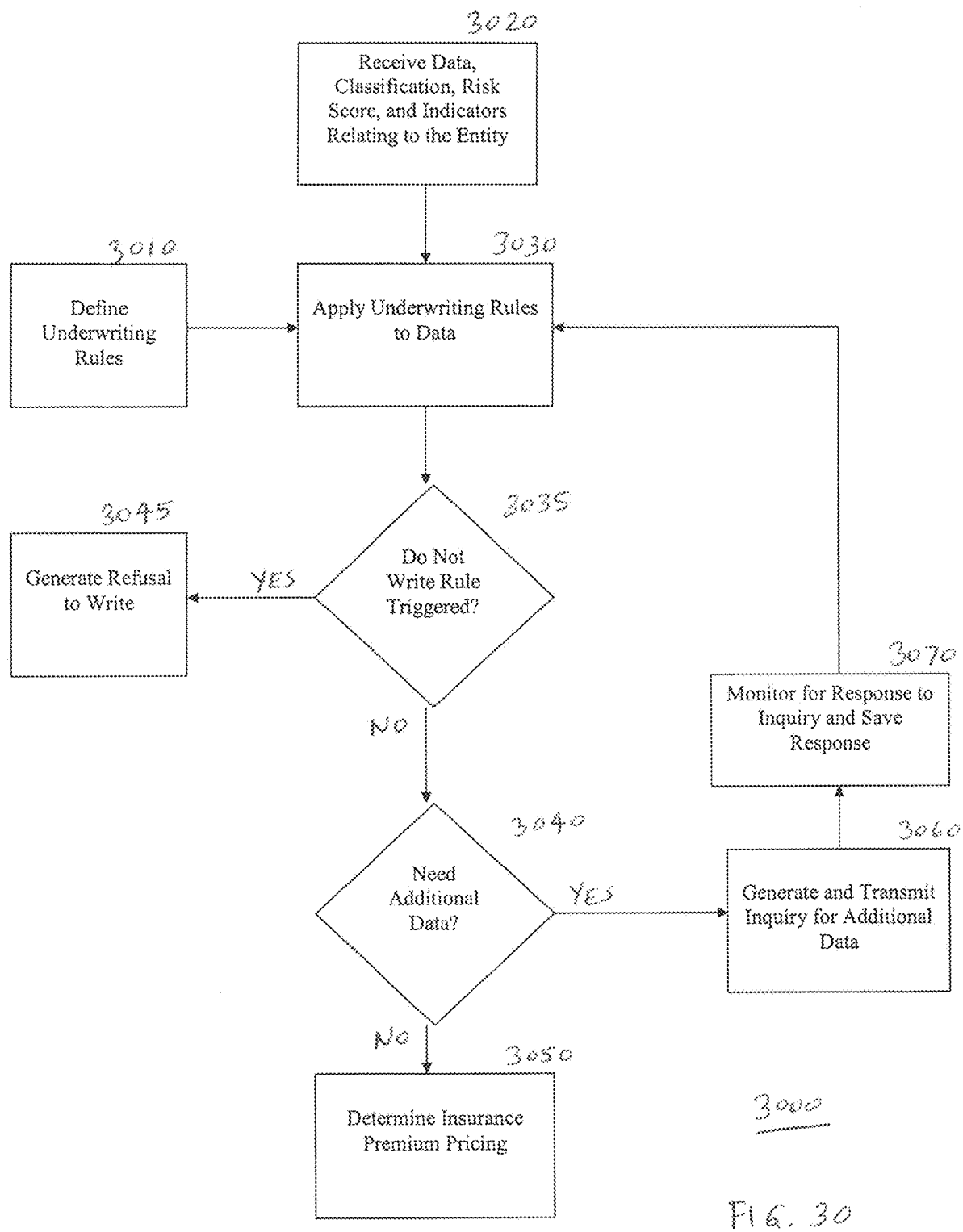
FIG. 30 shows an exemplary process flow of an embodiment of a method of applying underwriting rules to data relating to an entity.

An automatic underwriting process that may be applied is shown in FIG. 30. After a classification and risk score are determined in blocks 2980 and 2990, a workflow determination may be made that an automatic underwriting process should be applied. In this embodiment, the classification(s), risk score, raw or parsed (or even tokenized) data, and indicators may be routed to a computerized underwriting system for analysis. The indicators determined in blocks 2940-2970 may also be routed to the underwriter computer, and any forms populated using the data relating to the entity may be routed to the underwriter computer. In embodiments, the raw data may also be routed to the computerized underwriting system, in addition to parsed data. In another embodiment, hyperlinks to web pages relating to the entity (e.g., the entities' web pages and third-party platform web pages for the entity) may also be transmitted to the underwriter computer so that the underwriter may access the source data for the saved data. In some instances, such as in relation to reviews of an entity that may have been posted on a third-party platform, the entire review rather than parsed or tokenized terms from the review may give the underwriter better or more complete information concerning an entity. In an embodiment, the computerized underwriting system may determine whether an offer for insurance is to be made to an entity, and may also determine an insurance premium that will be set for coverage of the entity.

The method 3000 for automated underwriting of insurance coverage for the entity depicted in FIG. 30 may be performed by an underwriter computer 130, which may be a third-party underwriter as shown in FIG. 1, or an underwriter at the insurance company. The underwriter computer may include the elements shown in the exemplary computing device of FIG. 2, such as processors, storage devices, communication devices, and memory. At block 3010, predefined underwriting rules are accessed for the automated system that may be triggered by data relating to or about an entity seeking insurance coverage. In an embodiment, the underwriting rules may include rules that are triggered when certain risks associated with the entity are identified in the third-party data or the insurance application that are risks the insurance company does not want assume. When such a rule is triggered, a decision is generated to not offer coverage (e.g., a refusal to write) to the entity through blocks 3035 and 3045. For example, an insurance company may not want to provide coverage to entities that are open 24 hours a day, because experience with such entities is that they are associated with an unacceptable number of accidents and claims. An underwriting rule may be defined that provides that when the third-party data or the application data includes data that indicates the entity is open 24 hours a day, a "do not write" output is generated by block 3045. By way of further example, an underwriting rule may be defined that is triggered when the third-party data or the application data includes data indicating that a shop sells electronic cigarettes, which are a new product that may present a risk for which the insurance company does not want to provide coverage.

In another embodiment, the underwriting rules may be defined that identify certain risks associated with an entity which may warrant a higher premium for providing coverage to the entity. For example, an insurance company may recognize that restaurants that offer food delivery services may have liability risks associated with the delivery service that restaurants that do not offer delivery do not incur. An underwriting rule may be defined that is triggered when the third-party data or the application data includes data that indicates the entity is a restaurant that provides delivery services, which causes a higher premium to be determined that takes into account the risks associated with delivery is warranted. Third-party data that may indicate that a restaurant offers delivery services may include data on the restaurant's web page, the restaurant's Yelp page, or restaurant's facebook.com page that it offers delivery services. In an embodiment, the data indicating that the entity offers delivery services may not be found on the usual sites where such information might be expected to be found, such as on the restaurant's web page. Instead, the third-party data that indicates that a restaurant offers delivery services is a sign in the window of the restaurant that indicates "We deliver." Such a sign may be identified based on an OCR processing of an image of the restaurant on facebook.com or another site (e.g., a Google street view image of the restaurant).

An insurance company may define rules for the types of risk it wants to identify in the third-party data or the application data, which the insurance company wishes to account for in the premium pricing. For example, an insurance company may define a rule that is triggered when the data indicates that a custodial business also performs repair services, because of the recognition that the repair work may present additional risk to the insurance company. When the rule is triggered, an appropriate increase in premium is associated with the entity, which may depend on the nature of the repair services offered by the custodial business. For example, repair services that comprise plumbing and electrical repairs may warrant a higher premium than minor cosmetic repair services such as touch up painting. In another example, an insurance company may define a rule that is triggered when the data indicates that a professional office is located in a building which includes residential apartments, because of the recognition that residential apartments include risks such as kitchen fires that may present additional risk when providing coverage for the professional office. When the rule is triggered, an appropriate increase in premium is associated with the entity, which may depend on the number of residential apartments in the building in which the professional office is located. In another representative example, an underwriting rule may be defined that is triggered when the data indicates that the entity is a bar and that live music is offered at the entity. When the rule is triggered, an appropriate increase in premium may be associated with the entity because of experience indicating higher losses in bars that offer live music. The increase may depend on the number of live music events at the entity per year and the number of people that can be accommodated at the live events.

In other embodiments, underwriting rules may be defined that take into account data that may lower the potential to the insurance company, and which may warrant lower premium pricing. For example, an underwriting rule may be defined that is triggered when data is identified in the third-party data or the application data that indicates that the entity is a seasonal business that is only open for part of the year. When the rule is triggered, a reduction in the premium may be associated with the entity to account for the reduced risk when the entity is not operating.

After underwriting rules are defined or created (block 3010), they may be saved to an underwriting data storage device so that they may be used in the underwriting process 3000. At block 3030, the underwriting rules may be applied to the data relating to the entity such as the tokenized data, the classification determined for the entity, and the risk score determined for the entity. Application of the underwriting rules to the data may trigger a search for additional information needed to determine a premium, as shown in block 3040. For example, as noted, an underwriting rule may be defined that is triggered when it is determined from the data that the entity is a seasonal business. In order for the premium adjustment to be determined, in an embodiment the months of operation need to be determined. If it is determined in block 3040 that the received data includes the needed information, the automated underwriting process may continue to block 3050 where the premium for the entity may be determined. If it is determined in block 3040 that the third-party data and the application data do not include the needed information, then a determination is made that additional information is needed. An inquiry may be generated to obtain the needed information at block 3060. In an embodiment, the inquiry may be generated and transmitted to an insurance agent computer or underwriter computer for follow up by an insurance agent or underwriter. In another embodiment, the inquiry may be generated and transmitted directly to the entity. Monitoring may be performed at block 3070 to determine if a response to the inquiry is received. Once a response is received, the underwriting rules are applied to the data, including the data in the response, and another determination is made at block 3040 as to whether the process has all of the information needed to determine a premium. If, for example, the response received to an inquiry generated in block 3060 does not contain all of the needed information, application of the underwriting rules in block 3030 will include a determination that additional information is still needed, and another inquiry is generated at block 3060. If a determination is made at block 3040 that the response to the inquiry included all of the requested information, a determination may be made that additional data is not needed and the process may continue to block 3050 to determine the premium.

The data obtained from an agent, underwriter, or an entity in response to the query of block 3060 may be received in a computer-readable format. For example, a representative of the entity, the insurance agent, or an underwriter may enter text, select radio buttons, select a position on a number line, choose a response from a drop-down menu, or use any other form of graphical user input in a response to questions or requests from a computer application. The representative, agent, or underwriter may answer questions over a telephone or into a microphone and his voice processed with voice recognition software. Any other form of user input may be used. An exemplary application for data collection is discussed below in relation to FIGS. 5 and 6.

The industrial classification, the data (raw, parsed, tokenized), other application information, such as the entity's name, contact information, size, location(s), type of insurance sought, any industry-specific information, and information relating to the underwriting rules triggered in block 3030 is then sent to a processor (such as a business logic processor) of the underwriting computer system for setting the price of an insurance premium in block 3050. As discussed in relation to block 420 of FIG. 4, which also discloses setting premium pricing, the price and/or coverage are set based on risks associated with the industrial classification and any other characteristics of the entity. Once an offer of insurance is generated by the business logic processor, the offer may be delivered to the entity via the agent or computer application. At this point, the representative of the entity can purchase the quote, save the quote for a later decision, request a revised quote, or turn down the quote. In other embodiments, the underwriting computer system may be configured to have a number of workflow options, such as generating a quote, routing the quote to an underwriter with one or more recommendations for manual review, or refusing to provide a quote for the entity. The underwriting computer system may generate one or more insurance pricing recommendations which may be adjusted or overridden by an underwriter, or an underwriter may determine one or more insurance determinations without a computer-generated recommendation. An underwriter may be an employee of an insurance company otherwise affiliated with or in a third-party arrangement with the insurance company.

The method 3000 may be used not only to evaluate an entity applying for a new insurance policy, but also to reevaluate the industrial classification of a current policy holder. From time to time, particularly when an entity's policy is up for renewal, the insurance company may reevaluate the premium pricing using method 3000. The insurance company may use an abbreviated but similar method since it may not be necessary to retrieve and/or confirm all of the information for an existing customer.

In an embodiment, the method 3000 may be used in relation to generating proactive quotations for entities. A proactive quotation for insurance coverage may be generated that is initiated by the insurance company rather than the entity. The insurance company may retrieve third-party platform data about an entity for whom the insurance company wants to provide insurance coverage, such as by the method 2200 disclosed in FIG. 22. The insurance company may use that third-party platform data to determine a classification for the entity, such as by the method disclosed in FIG. 29. The determined classification and the data may then be used to determine premium pricing for the entity, such as by the method disclosed in FIG. 30. A quotation for the entity may be generated based on the determined premium pricing for the entity, and transmitted to the entity. The transmission may be electronic, or may be by other methods such as mail. However, the quotation may be contingent on confirmation of one or more pieces of data that were used to determine one or both of the classification or the premium pricing for the entity.

Figure 31:
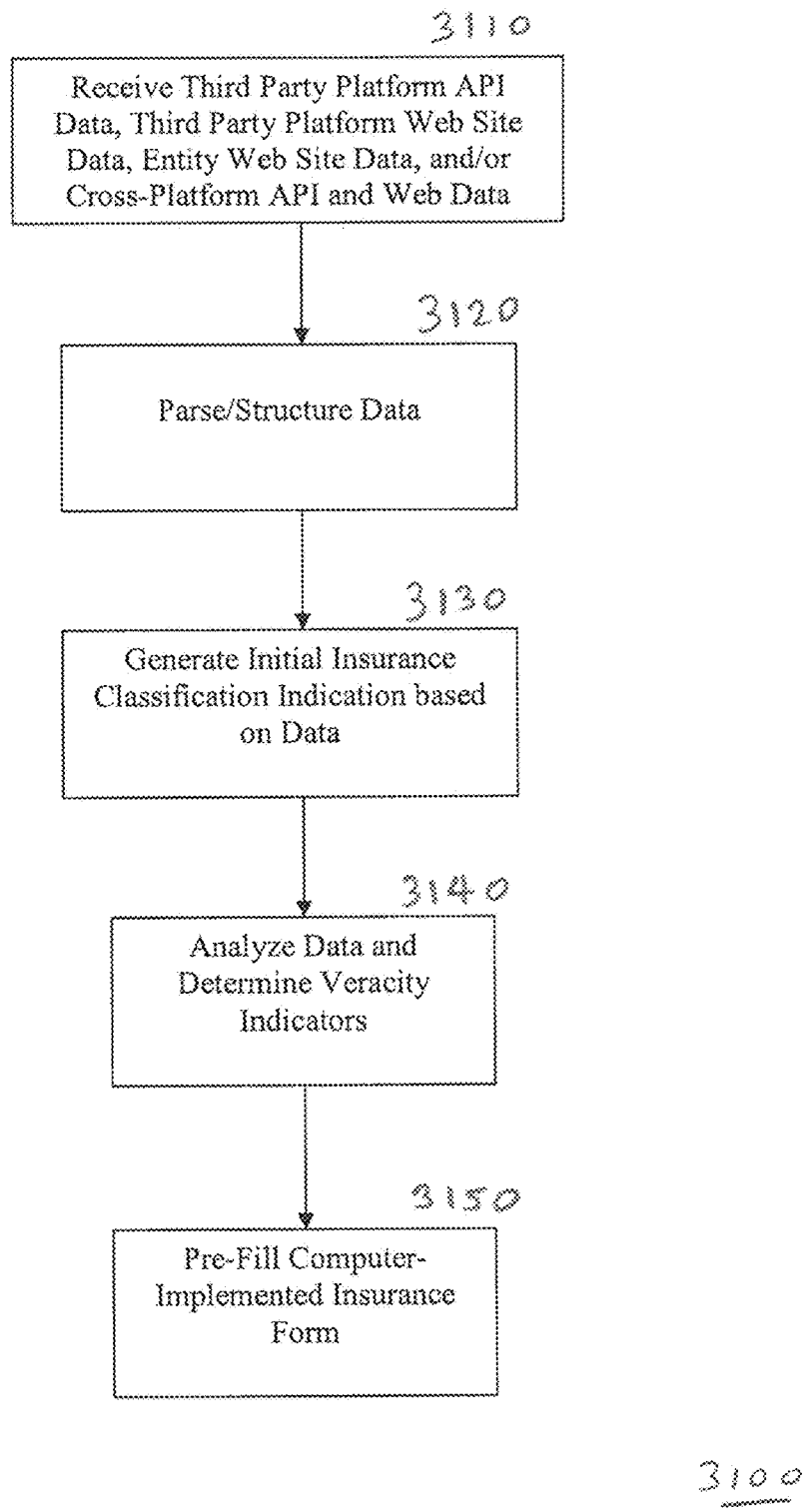
FIG. 31 shows an exemplary process flow of an embodiment of a method of pre-filling or pre-populating data fields in an insurance form for an entity.

FIG. 31 depicts an embodiment of a method 3000 for processing the data about an entity retrieved from third-party platforms or sites to pre-fill or pre-populate computer-implemented insurance forms for the entity. Typically, an application for insurance for an entity may be completed by an insurance agent for the entity, or by the entity directly, such as in an on-line application for insurance or request for a quote. The method may begin at block 3110 with retrieving data relating to the entity. The data may comprise third-party platform API interface and web site data, cross-platform interface API data and web site data, entity web site data, and/or entity data input by the entity or an agent, and may be obtained by the process depicted in the embodiment of FIG. 22 or by other methods. At block 3120, the data may be parsed and/or structured, and at block 3130 an initial insurance classification indication may be generated or determined based on the data received in block 3110. In an embodiment, the received data may also be analyzed to determine veracity indicators 3140, as discussed in relation to FIG. 29. In the embodiment shown in FIG. 31, at block 3150, data fields for an insurance form for the entity are pre-filled or pre-populated using the data received in block 3110.

In an embodiment, the system may be configured so that the pre-filling can be performed in real time, such that data retrieved for use for pre-filling is retrieved within a time period of less than 1 second, or less than 10 seconds, after receipt of applicant data such as a telephone number. When the system is configured for real-time pre-filling, blocks 3110-3150 may be performed while the entity or an agent is completing an application for insurance or for a pre-quote for insurance. Once a commercial insurance application is launched, the entity or agent may interact with the commercial insurance application (such as through a user-device like a computer or smart phone) and enter initial data about the entity (i.e., entity data input) such as the entity's name, phone number, and/or business address on a user-accessible device. The system may use one or more of the initial pieces of data input by the entity or agent as search data to obtain third-party platform interface and/or web page data about the entity, such as by the method 2200 of FIG. 22. This search may occur after the receipt of the data, such as the phone number, which may be used for a search, and results may be received at block 3110. Then the data may be parsed and/or structured at block 3120, an initial classification determined at block 3130, veracity indicators determined at block 3140, and then pre-filling at block 3150. In an embodiment, the initial classification may be used to pre-fill a classification field in the insurance form. The veracity indicators may be used to determine whether certain data should be used for pre-population purposes, or whether it is not of sufficient veracity. For example, the third-party data may include data from one source indicating that the number of employees for the entity is 1 and data from a second source indicating that the number of employees is 1000. A rule may be defined that generates a veracity indicator if the number of employees data varies by more than a threshold, such as 10. Accordingly, such data conflicts would cause a veracity indicator to be generated for that data, and the data would not be used to pre-populate a field in the insurance form. In another embodiment, a veracity indicator can comprise a score, and data for the computer-implemented form that has a veracity indicator score value below a threshold is not used to pre-populate a field in the form. Alternatively, in an embodiment, data for the computer-implemented form that has a veracity indicator score value below a threshold value may be used to pre-populate a field in the form system of claim 30, but with an alert or indication on the display to the entity or agent that the data may be inaccurate, and/or to check the information in that field with particular attention.

In alternative embodiments, either one or both of blocks 3130 and 3140 may not be performed as part of the pre-fill process, and pre-filling may occur after the data received in block 3110 is parsed/structured in block 3120. At block 3150, the system may intelligently pre-fill portions or gaps in data to proceed with the commercial insurance quotation, such as pre-filling one or more data fields on an insurance form. For example, the system may intelligently pre-fill an address data field, an entity/business name data field, a data field for the number of employees, a data field indicative of a number of years the entity has been operating, a number of locations data field, and a number of vehicles owned/used by the entity data field.

In an embodiment, method 3100 may also include determining if the data includes one or more of alert terms, uninsured terms, or additional coverage terms. In an embodiment, if the method determines that no alert terms are found in the data, a policy may be issued for the entity. The system may forward entity data to an insurance company policy generating computer system for issuing of a policy, generation of policy documents, and delivery of policy documents to issue a policy. The system may send data to an insurance company billing system for generation and dispatch of one or more premium bills.

The availability of the pre-fill function may serve as an incentive to agents to use the correct information on applications for insurance or other insurance forms. The completion of insurance forms such as applications may be time-consuming for agents, requiring that numerous items of information be requested from applicants. Because of this, it has been found that incorrect data is sometimes entered for certain fields to avoid having to search for information about a potential client. For example, in many applications for insurance, it has been observed that the telephone number entered for an entity is the telephone number for the insurance agency preparing the application for the entity, rather than the actual telephone number for the entity. This typically occurs because the agency's telephone number is one that the agent has memorized and can enter quickly, while the entity's telephone number is one for which the agent would have to search either his or her files or the internet. The availability of the pre-fill function, which can populate many fields of the application for the agent once the agent has obtained and entered just one piece of data such as the telephone number, or just a few data items such as the business name, approximate street address, and zip code, can therefore result in more accurate information in the application.

In an embodiment, the system may be configured to determine if the agent has input "agency" data rather than "entity" data for a field. For example, an agency will typically have to log into the insurance company web site to input a form, and the log in data will indicate which insurance agency is entering information. Data relating to the name, address, agents, and phone numbers may be stored within one or more databases in relation to the agency, and compared to data input by the agent into a form to determine if the agent is inputting agency data rather than entity data. If the determination is made that the agent is inputting agency data (such as the agency telephone number) rather than entity data (the entity's phone number), a display may be generated for viewing by the agent, indicating that the pre-fill function will not operate because agency data was input into the form. In embodiments, the specific agency data that was input, such as the telephone number, may be identified in the display, such as an indication that "The phone number for the agency was entered for the entity phone number." In an embodiment, if a determination is made that agency data is input, the pre-fill function may not pre-populate any data fields (i.e., pre-fill none of the data fields) on the form. In another embodiment, the system may still pre-populate fields (based on other data entered for the entity, such as the entity's address), but may still generate an indication that the telephone number data entered was agency data.

In another embodiment, the initial data used as search data to obtain third-party platform data about the entity, such as by the method 2200 of FIG. 22, may be based on an IP address of the entity submitting initial entity data. As will be understood, when an entity is accessing an insurance form on an insurance company web site, the data the entity inputs is transmitted via a communications network such as the internet from the entity's computer to the insurance company system. That data includes the IP address of the computer on which the data was input by the entity. That IP address will be present in any data transmitted by the entity to the insurance company, and may be used to location more information about the entity in real time, such as by the method 2200 of FIG. 22. In an embodiment, the IP address may be checked against the known IP addresses of entities, which may be saved on a database on the insurance computer or which may be identified using a program on the internet that matches IP addresses to entities. Once the entity is identified from the IP address, information about the entity such as its name or telephone number may be used as search data to perform API interface queries to receive API interface data about the entity. That data may then be used to implement the pre-fill block 3150 of FIG. 30.

Figure 32:
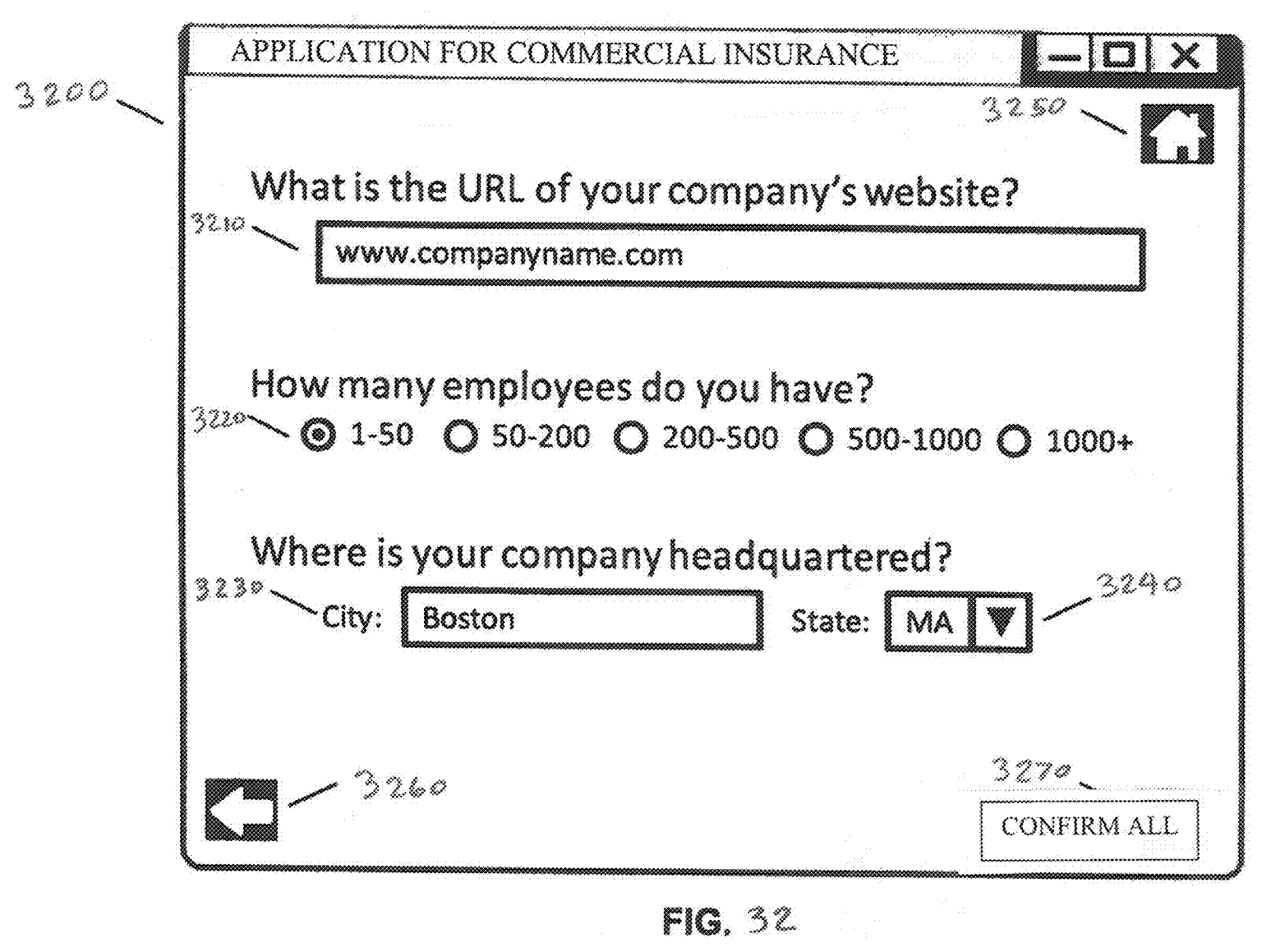

FIG. 32 depicts a graphical user interface 3200 of a computer application for obtaining data for an insurance form in relation to an entity, according to an illustrative embodiment of the invention. The graphical user interface 3200 is configured to receive information relating to an entity. In an embodiment, a representative of an entity can enter information about the entity, or so an agent can ask questions to the representative and fill in the answers. In another embodiment, the data for one or more of the data fields in the interface 3200 may be populated or pre-filled based upon third-party data received by the system in relation to the entity.

By way of example, a first entry screen (not shown) of the computer application may typically include basic information on the entity, e.g. name, phone number, representative name, representative address, and representative email address. In an embodiment, one or more of the pieces of basic information (e.g., the telephone number of the entity), may then be used to obtain third-party data about the entity such as by process 2900 shown in FIG. 29. The basic information such as the phone number is requested early, allowing the third-party data requests to run in the background while the user is answering questions.

Graphical user interface 3200 may be a suitable second entry screen on the computer-implemented insurance form such as the application for insurance shown in FIG. 5. In an embodiment, one or more (or all) of the various data fields, pull down menus, and radio buttons are pre-filled or pre-populated, for text data fields, or pre-selected, for radio buttons or pull down menus based on data received by the system. For example, the graphical user interface 3200 includes a text box 3210 for the entity's website address. When the entity's website address was obtained in the third-party data, that field may be pre-filled or pre-populated. The graphical user interface 3200 may also include fields related to the size and the location of the company. In an embodiment, the interface may include radio buttons 3220 relating to the size of the company, and the relevant radio button may be pre-selected based on the third-party data received by the system. If the radio button for 1000+ employees is preselected, a later screen may ask the same question with larger answer choices. A data field for the "city" information such as shown in 3230 may be pre-filled based on third-party data, and the "state" data field shown in field 3240 may be preselected for MA (Massachusetts) based on the third-party data. A Home button 3250, a Back button 3260, and a Confirm All button 3270 are used for navigation within the application. Home button 3250 returns the user to a home screen, Back button 3260 returns the user to a previous entry screen, and Confirm All button 3270 moves the user to the next entry screen. In an embodiment, clicking on the Home button 3250 may automatically save the responses so that the agent and/or representative may return to the application. Alternatively, the computer application may include a separate save function. In embodiments, the user is permitted to go back to previous entry screens to change answers, and the user can move ahead without answering all of the questions on an entry screen.

The Confirm All button 3270 may be used by an agent or entity to confirm the accuracy of one or more pre-filled data fields. The Confirm All button may be an icon, prompt, or other display generated by the insurance company system processor and may be transmitted to a user-accessible device for display on the user-accessible device as an accuracy confirmation selection, so that an agent or entity can select the button (or other graphical display used for the selection) and confirm the accuracy of the one or more pre-filled data fields. In an embodiment, the accuracy selection button may comprise a prompt for the entity or agent to separately confirm individual pieces of data. In an embodiment, one or more computer processors may, responsive to receipt of the accuracy confirmation selection by the agent or the entity, generate, based at least in part on the pre-filled one or more data fields, an insurance quote for the entity.

As will be understood, the conventional quotation (or pre-quotation) process is severely antiquated and many times very manual and cumbersome. Insurance agents these days have to manually key in the bulk of business data such as the business name, address, driver names, driver addresses, Vehicle Identification Number (VIN) and then manually access motor vehicle reports data and other pieces of information essential to the quoting process. These manual processes are extremely time consuming and prone to user error. Accordingly, pre-populating or pre-filling data fields in relation to insurance forms may expedite and automate the quotation process for agents as well as the corresponding customers.

Other types of ensemble classification models, such as bagging, boosting, and random forest may be employed in embodiments. Other classification model types, such as naïve Bayesian models, Bayesian network models, K-Nearest neighbor models and support vector machines, as well as classification trees not using the rotation forest or random forest technique may be employed.

In embodiments, the computerized predictive model may operate in real time, so that results are returned in real time to system users, such as insurance agents and underwriters and other insurance company personnel, within minutes of user initiation of the process. In embodiments, the system may be configured to perform classification determination using the predictive model in batch mode.

Steps of the methods performed herein may be performed in the order described in embodiments, or in other order, or with additional steps or with omission of one or more steps.

The methods described herein may be executed by one or more computer processors in communication with one or more data storage devices, display devices, user input devices, communication devices and other hardware devices. Such hardware devices may be co-located or location at more than physical location. In embodiments, cloud-based computing techniques, in which processing, communication and/or data storage are performed by use of third-party processing, communication and/or data storage resources of third parties may be employed for one or more steps in the processes described herein.

Variations, modifications, and other implementations of what is described may be employed without departing from the spirit and scope of the disclosure. More specifically, any of the method and system features described above or incorporated by reference may be combined with any other suitable method, system, or device feature disclosed herein or incorporated by reference, and is within the scope of the contemplated systems and methods described herein. The systems and methods may be embodied in other specific forms without departing from the spirit or essential characteristics thereof. The foregoing embodiments are therefore to be considered in all respects illustrative, rather than limiting of the systems and methods described herein.

What is claimed is:

1. A computer system for processing data in connection with data submissions on forms comprising:
    one or more data storage devices configured to store entity data for an entity and agency data corresponding to agencies having access to the computerized system;
    one or more computer processors in communication with the one or more data storage devices;
    a communications device in communication with the one or more computer processors and the one or more data storage devices; and
    a memory, coupled to the one or more computer processors, storing program instructions which, when executed by the one or more computer processors, cause the one or more computer processors to:
        receive entity data input at a user-accessible device in relation to data fields of a computer-implemented form;
        determine whether the received entity data in relation to the computer-implemented form comprises the agency data relating to an agency associated with the entity;
        responsive to a determination that the received entity data comprises the agency data, generate a display indicating that a pre-fill function will not operate because the agency data was input into the computer-implemented form, wherein none of the data fields of the computer-implemented form relating to the entity is pre-filled; and
        responsive to a determination that the received entity data does not comprise the agency data:
            query an interface of a third-party platform based on the received entity data;
            responsive to the query, receive third-party platform interface data from the third-party platform;
            analyze the third-party platform interface data to determine a web site address for a web page on the third-party platform relating to the entity;
            retrieve third-party platform web site data from the web page on the third-party platform indicative of content related to the entity;
            pre-fill one or more data fields of the computer-implemented form relating to the entity based at least in part on at least one of the third-party platform interface data and the third-party platform web site data; and
            output for display on the user-accessible device the form including the pre-filled one or more data fields.

2. The computer system of claim 1, wherein the memory further stores instructions that, when executed, cause the one or more computer processors to:
    determine, based on the third-party platform interface data and the third-party platform web site data, an initial classification for the entity; and
    determine, based on the third-party platform interface data and the third-party platform web site data, veracity indicators;
    wherein the pre-fill of the computer-implemented form is further based on the initial classification and the veracity indicators.

3. The computer system of claim 2, wherein the memory further stores further instructions that, when executed, cause the one or more computer processors to display a warning indicator for the pre-filled data fields of the computer-implemented form that were filled with data having a veracity indicator below a threshold value.

4. The computer system of claim 1, wherein the memory further stores instructions that, when executed, cause the one or more computer processors to:
    output an accuracy confirmation prompt for display on the user-accessible device which is selectable by a user to confirm an accuracy of the pre-filled one or more data fields; and
    responsive to receipt of a selection to confirm the accuracy of the pre-filled one or more data fields by the user, generate, based at least in part on the pre-filled one or more data fields, a risk coverage policy quotation for the entity.

5. The computer system of claim 1, wherein the memory further store instructions that, when executed, cause the one or more computer processors to:
    output an inaccuracy confirmation selection for display on the user-accessible device which is selectable by a user to confirm an inaccuracy of the pre-filled one or more data fields; and
    responsive to receipt of the inaccuracy confirmation selection by the user, output for display an indication requesting the user to correct the inaccurate pre-filled one or more data fields.

6. The computer system of claim 1, wherein the memory further stores instructions that, when executed, cause the one or more computer processors to:
    determine if at least one of the third-party platform interface data and the third-party platform web site data contains one or more alert terms;
    responsive to a determination that at least one of the third-party platform interface data and the third-party platform web site data contains one or more of the alert terms, transmit by the communications device an indication of the determined one or more alert terms to an underwriting computer with the first data indicative of at least one industrial classification associated with the entity; and
    responsive to a determination that neither of the third-party platform interface data and the third-party platform web site data contains one or more of the alert terms:
        determine risk coverage pricing for the entity; and
        generate a risk coverage policy for the entity based on the determined risk coverage pricing for the entity.

7. The computer system of claim 1, wherein the memory further stores instructions that, when executed, cause the one or more computer processors to:
    analyze the third-party platform web site data and identify the web site address for the entity's web site;

responsive to identification of the entity's web site, retrieve entity web site data indicative of content related to the entity from the entity's web site;

analyze one or both of the third-party platform web site data and the entity web site data and identify cross-platforms having web pages relating to the entity; and responsive to identification of one or more cross-platforms having web pages relating to the entity, retrieve, from the one or more cross-platforms having the web pages relating to the entity, at least one of cross-platform interface data and cross-platform web site data relating to the entity;

wherein the pre-fill of the one or more data fields of the computer-implemented form relating to the entity is further based at least in part on at least one of the cross-platform interface data and the cross-platform web site data.

8. The computer system of claim 7, wherein the third-party platform comprises one or more of a third-party business directory and a third party review site based on the entity data.

9. A computer-implemented method for processing data in connection with data submissions, comprising:

receiving, by one or more computer processors, entity data, for an entity, input at a user-accessible device in relation to data fields of a computer-implemented form;

determining, by the one or more computer processors, whether the received entity data, input in relation to the computer-implemented form, comprises stored agency data relating to an agency associated with the entity;

responsive to a determination that the received entity data comprises the agency data, generating by the one or more computer processors, a display indicating that a pre-fill function will not operate because the agency data was input into the computer-implemented form, wherein pre-filling one or more data fields of the computer-implemented form comprises filling none of the data fields of the computer-implemented form; and responsive to a determination that the received entity data does not comprise the agency data:

querying by a communications device an interface of a third-party platform based on the received entity data;

responsive to the querying, receiving, by the one or more computer processors, third-party platform interface data from the third-party platform;

analyzing, by the one or more computer processors, the third-party platform interface data to determine a web site address for a web page on the third-party platform relating to the entity;

retrieving, by the one or more computer processors, third-party platform web site data from the web page on the third-party platform indicative of content related to the entity;

pre-filling, by the one or more computer processors, one or more data fields of the computer-implemented form relating to the entity based at least in part on at least one of the third-party platform interface data and the third-party platform web site data; and outputting for display on the user-accessible device the form including the pre-filled one or more data fields.

10. The computer-implemented of claim 9, further comprising:

determining, based on at least one of the third-party platform interface data and the third-party platform web site data, an initial classification for the entity; and determining, based on the third-party platform interface data and the third-party platform web site data, veracity indicators;

wherein the pre-filling of the computer-implemented form is further based on the initial classification and the veracity indicators.

11. The computer-implemented of claim 10, further comprising:

displaying a warning indicator for the pre-filled data fields of the computer-implemented form that were filled with data having a veracity indicator below a threshold value.

12. The computer-implemented of claim 9, further comprising:

outputting, by the one or more computer processors, an accuracy confirmation selection for display on the user-accessible device which is selectable by a user to confirm an accuracy of the pre-filled one or more data fields; and responsive to receipt of the accuracy confirmation selection via the display, generating, based at least in part on the pre-filled one or more data fields, a risk coverage policy quote for the entity.

13. The computer-implemented of claim 12, further comprising:

outputting an inaccuracy confirmation selection for display on the user-accessible device which is selectable by a user to confirm an inaccuracy of the pre-filled one or more data fields; and responsive to receipt of the inaccuracy confirmation selection via the user-accessible device, outputting for display an indication requesting the agent or the entity to correct the inaccurate pre-filled one or more data fields.

14. The computer-implemented of claim 9, further comprising:

wherein the pre-fill of the one or more data fields of the computer-implemented form relating to the entity is further based at least in part on at least one of the third-party platform interface data and the third-party platform web site data.

15. The computer-implemented of claim 9, further comprising:

determining if at least one of the third-party platform interface data and the third-party platform web site data contain one or more alert terms;

responsive to a determination that at least one of the third-party platform interface data and the third-party platform web site data contains one or more of the alert terms, transmitting by the communications device an indication of the determined one or more alert terms to an underwriting computer with the first data indicative of at least one industrial classification associated with the entity; and responsive to a determination that neither of the third-party platform interface data and the third-party platform web site data contains one or more of the alert terms:

determining risk coverage pricing for the entity; and generating a risk coverage policy for the entity based on the determined coverage pricing for the entity.

16. The computer-implemented of claim 9, further comprising:

analyzing, by the one or more computer processors, the third-party platform web site data and identify the web site address for the entity's web site;

responsive to identification of the entity's web site, retrieving entity web site data indicative of content related to the entity from the entity's web site;

analyzing, by the one or more computer processors, one or both of the third-party platform web site data and the entity web site data and identifying one or more cross-platforms having web pages relating to the entity; and responsive to identification of one or more cross-platforms having web pages relating to the entity, retrieving, from the one or more cross-platforms having the web pages relating to the entity, cross-platform interface data and cross-platform web site data relating to the entity.

* * * * *